United States Patent
Ohtani

(10) Patent No.: US 7,219,030 B2
(45) Date of Patent: May 15, 2007

(54) CONNECTION TEST METHOD AND INFORMATION PROCESSING APPARATUS PERFORMING SAME

(75) Inventor: Yohko Ohtani, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 10/788,313

(22) Filed: Mar. 1, 2004

(65) Prior Publication Data

US 2004/0186679 A1    Sep. 23, 2004

(30) Foreign Application Priority Data

| Mar. 3, 2003 | (JP) | ............................. 2003-056166 |
| Mar. 3, 2003 | (JP) | ............................. 2003-056167 |
| Feb. 13, 2004 | (JP) | ............................. 2003-036820 |
| Feb. 13, 2004 | (JP) | ............................. 2004-036821 |

(51) Int. Cl.
*G06F 19/00* (2006.01)

(52) U.S. Cl. ...................... 702/122; 717/127

(58) Field of Classification Search ............... 702/119, 702/122–123, 182–183, 186–188; 714/53, 714/55; 717/124, 127, 171
See application file for complete search history.

(56) References Cited

U.S. PATENT DOCUMENTS

| 4,191,956 | A | * | 3/1980 | Groothuis ................... 345/634 |
| 5,623,598 | A | * | 4/1997 | Voigt et al. ................... 714/47 |
| 5,907,491 | A | * | 5/1999 | Canada et al. ............... 700/108 |
| 6,286,045 | B1 | * | 9/2001 | Griffiths et al. ............. 709/224 |
| 6,289,378 | B1 | * | 9/2001 | Meyer et al. ................ 709/223 |
| 6,363,421 | B2 | * | 3/2002 | Barker et al. ................ 709/223 |
| 6,530,082 | B1 | * | 3/2003 | Del Sesto et al. .............. 725/9 |
| 6,799,147 | B1 | * | 9/2004 | Balasubramanian et al. ..... 702/186 |

FOREIGN PATENT DOCUMENTS

JP    2002-84383    3/2002

* cited by examiner

*Primary Examiner*—Marc S. Hoff
*Assistant Examiner*—Mary Catherine Baran
(74) *Attorney, Agent, or Firm*—Oblon, Spivak, McClelland, Maier & Neustadt, P.C.

(57) ABSTRACT

A method for an information processing apparatus to test a connection to an information storage server from which the information processing apparatus obtains information is disclosed. The method includes the steps of (a) receiving a request for a connection test using connection information for establishing the connection to the information storage server from a screen on which at least part of the connection information is entered; (b) testing the connection to the information storage server based on the request for the connection test; and (c) outputting the result of the connection test.

44 Claims, 57 Drawing Sheets

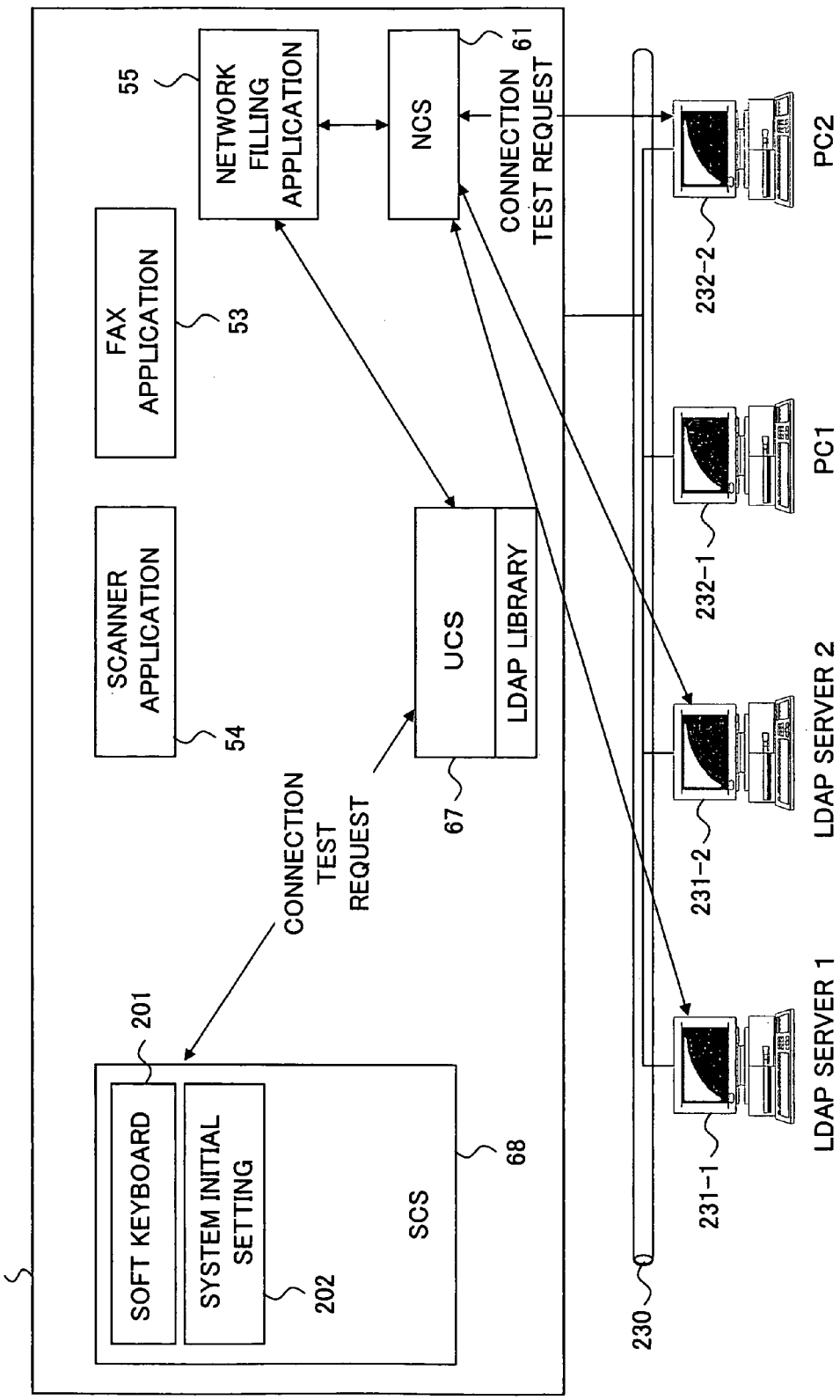

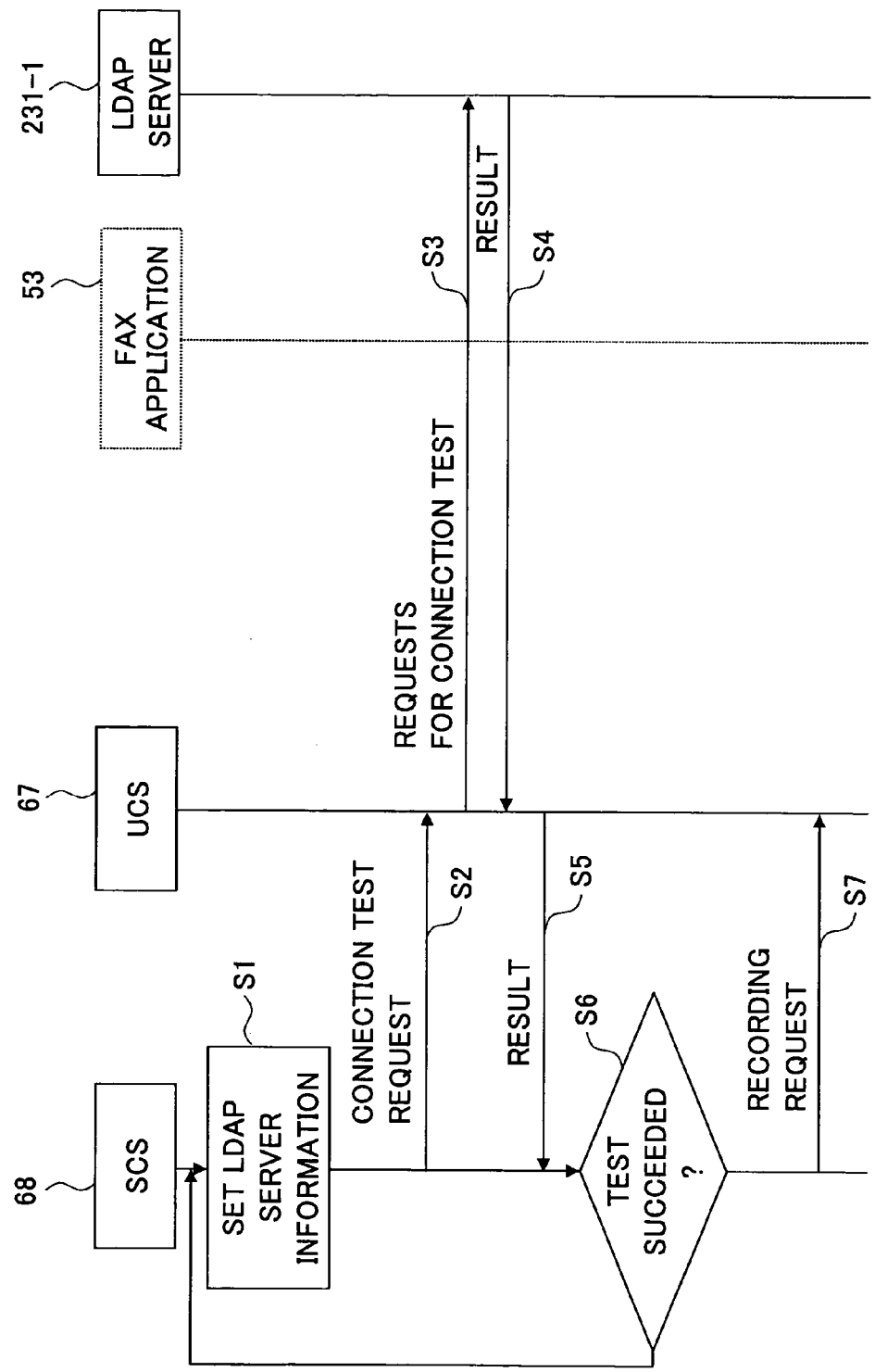

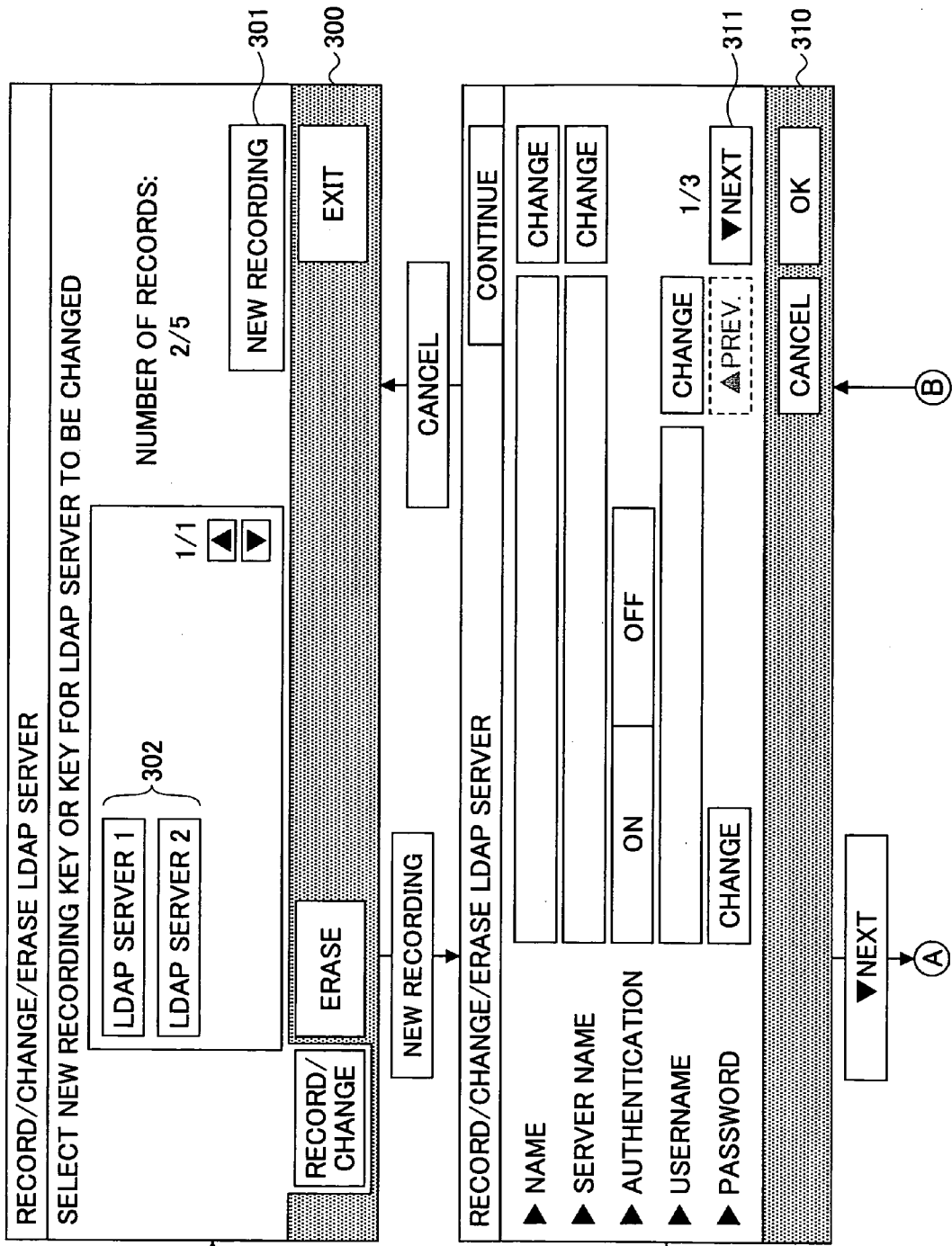

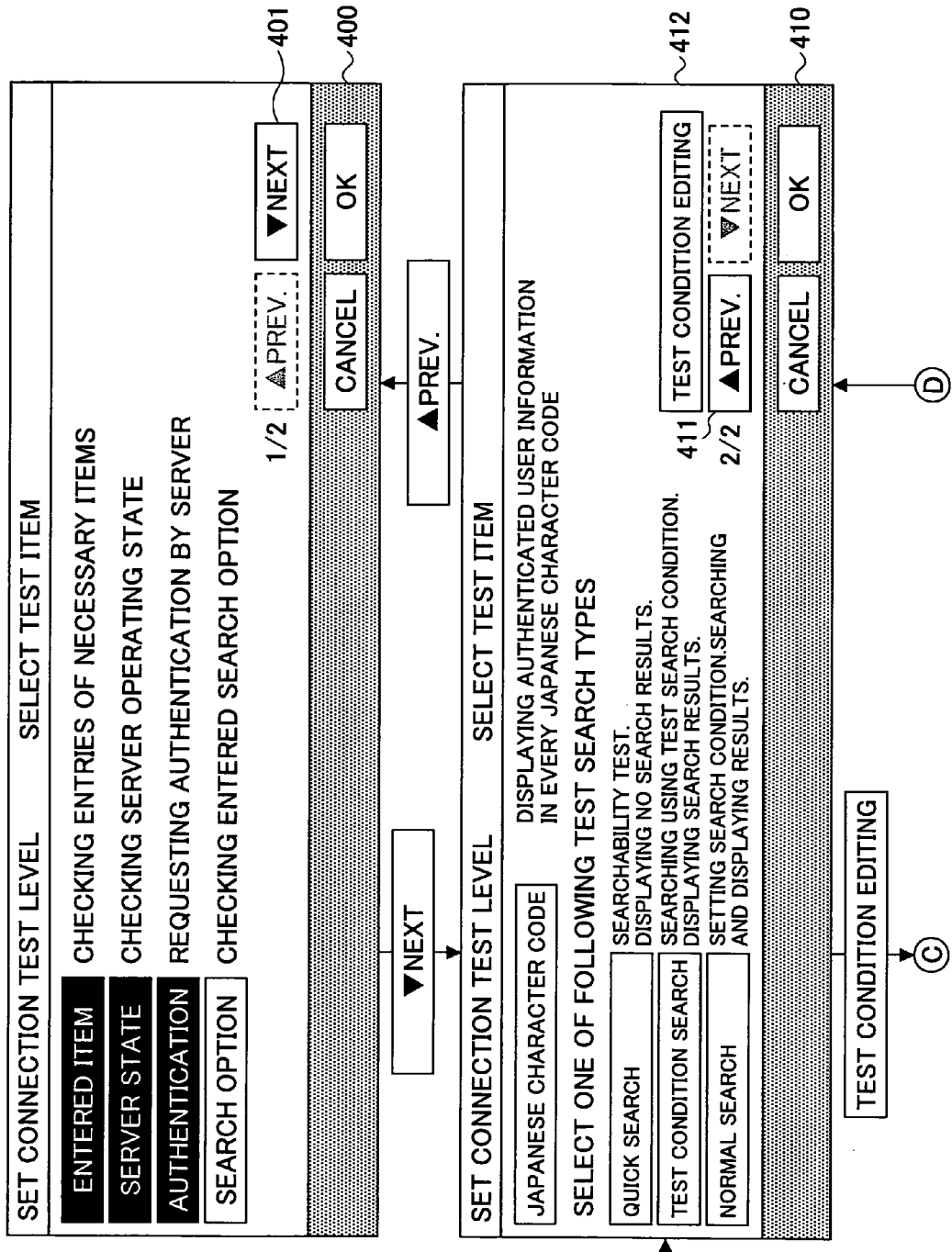

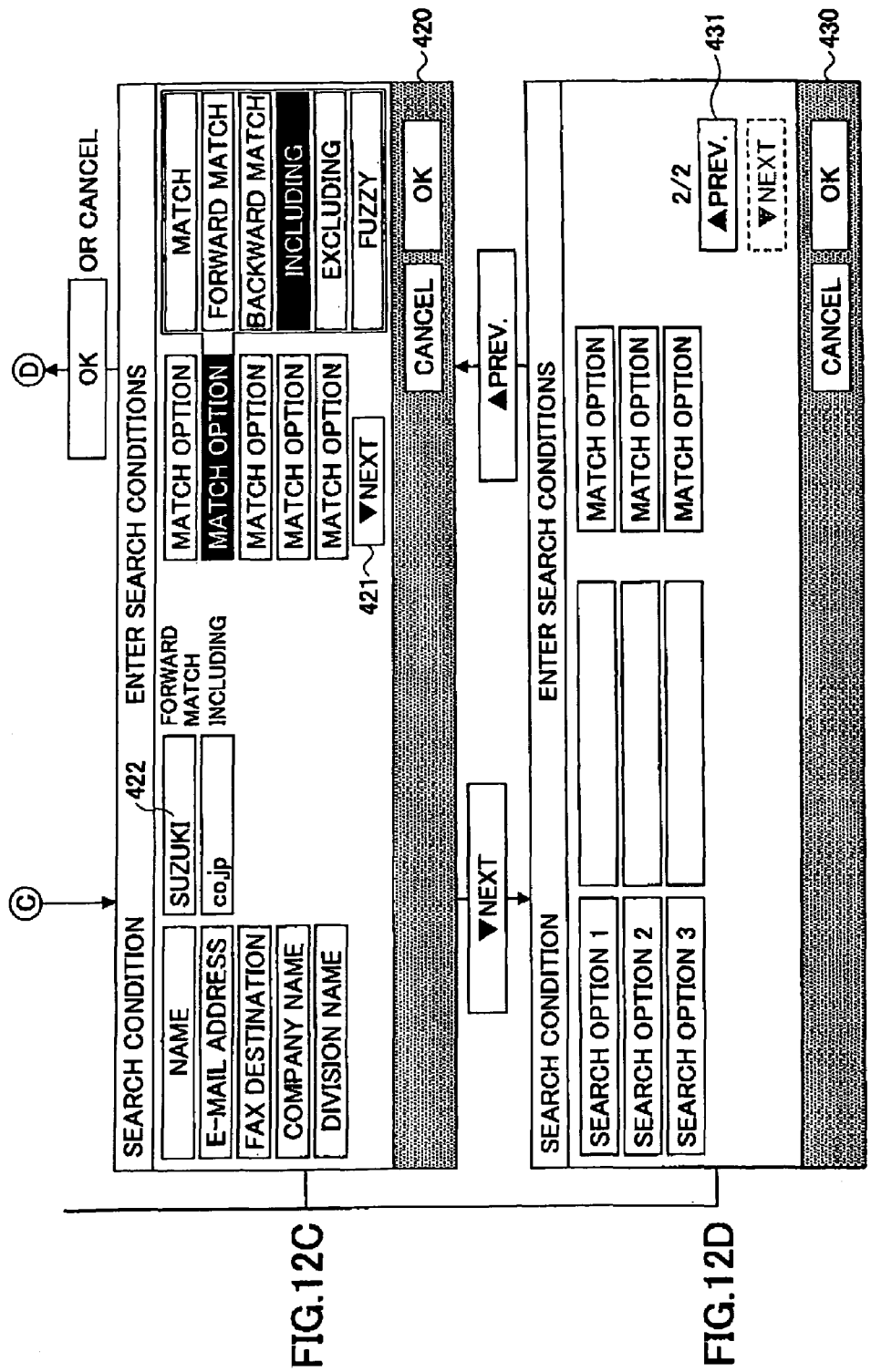

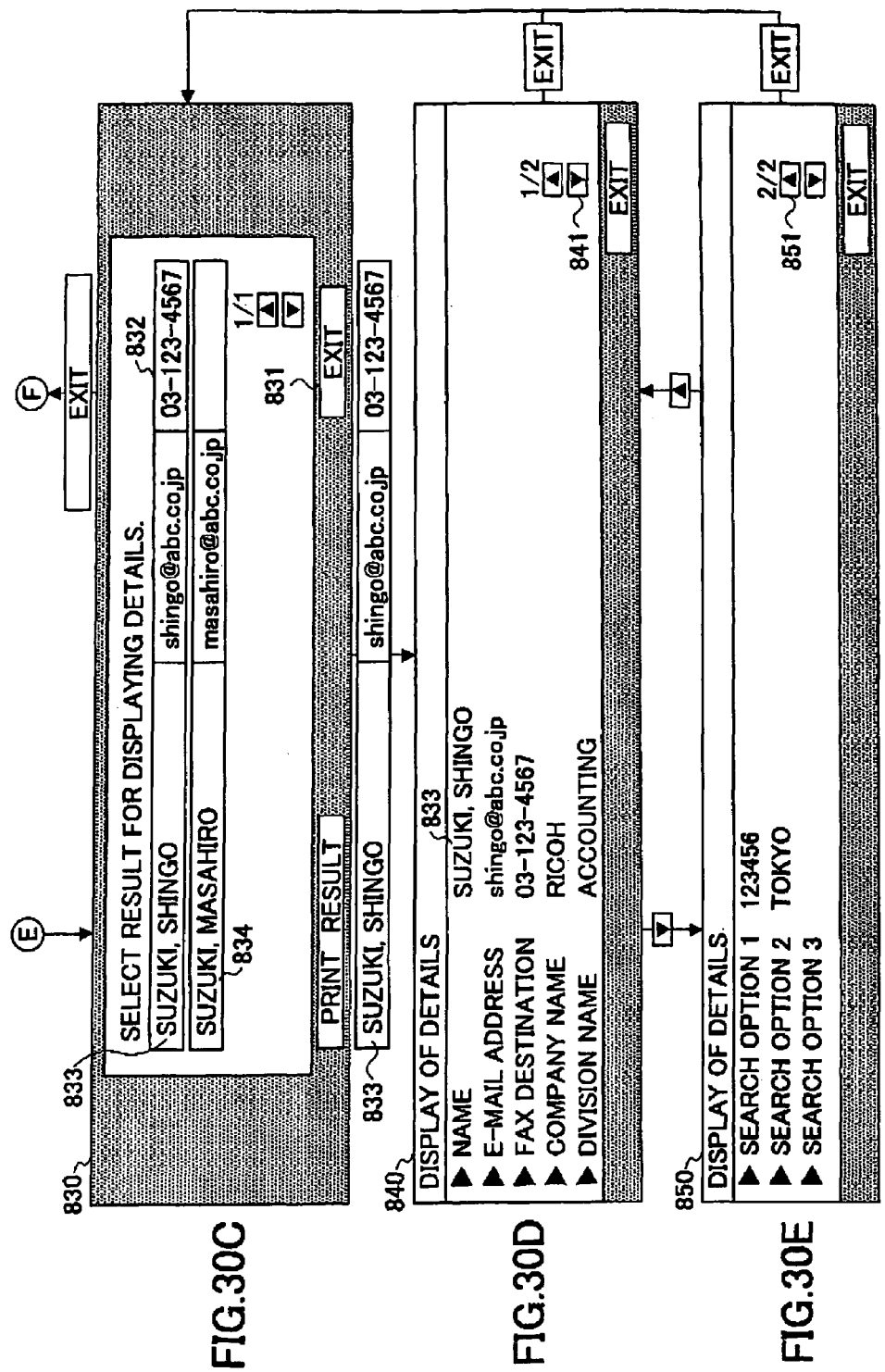

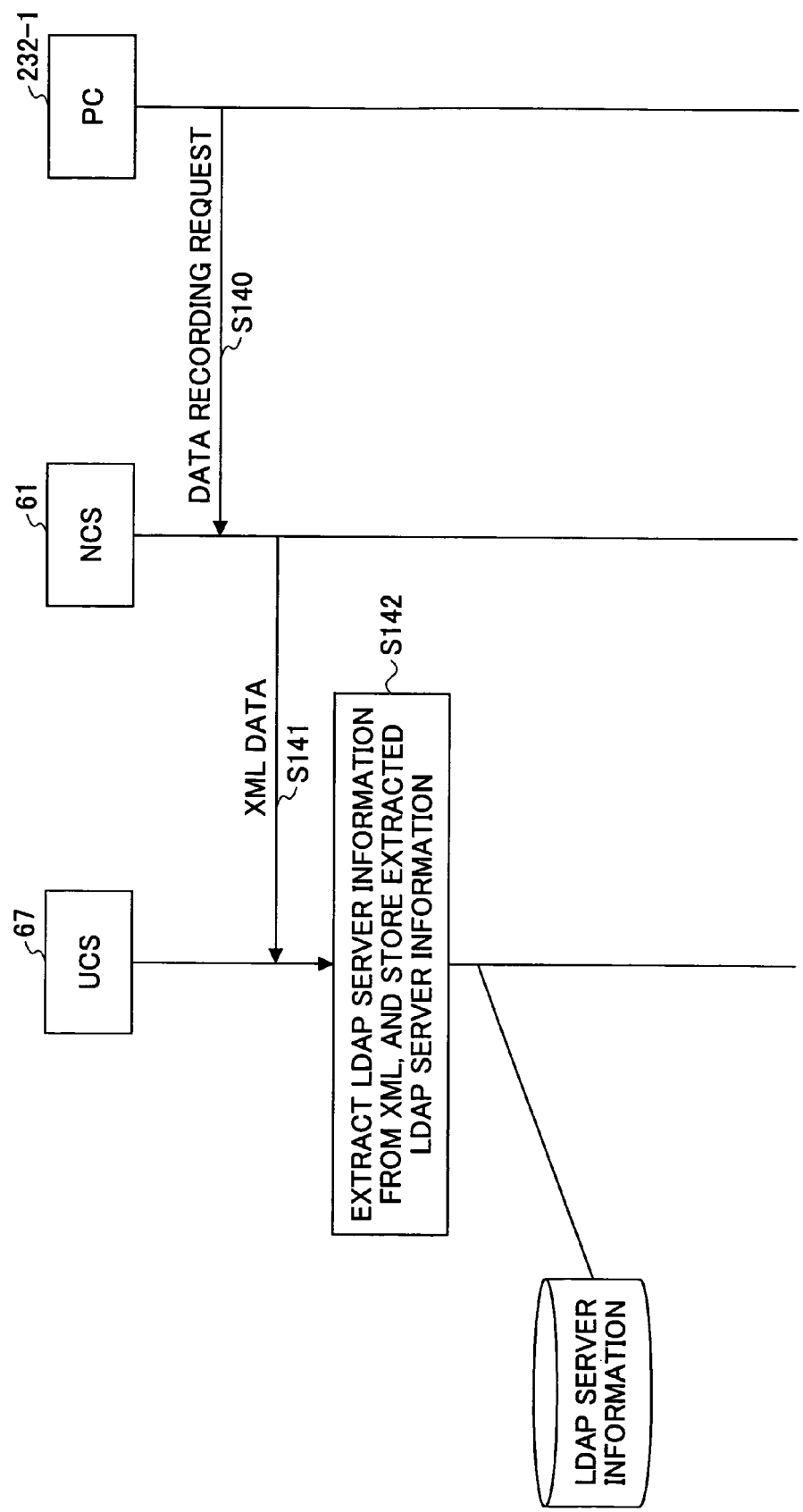

FIG.43

```
<LDAP SERVER INFORMATION>
    <ID>1</ID>
    <NAME INFORMATION>
        <CODE>38</CODE>
        <NAME>LDAP SERVER 1</NAME>
    </NAME INFORMATION>
    <SERVER NAME INFORMATION>
        <CODE>38</CODE>
        <SERVER NAME>111.222.333.444</SERVER NAME>
    </SERVER NAME INFORMATION>
    <SEARCH START POSITION INFORMATION>
        <CODE>38</CODE>
        <SEARCH START POSITION>ou=PF,o=RICOH</SEARCH START POSITION>
    </SEARCH START POSITION INFORMATION>
    <PORT>389</PORT>
    <AUTHENTICATION SETTING>2</AUTHENTICATION SETTING>
    . . . . .
</LDAP SERVER INFORMATION>
```

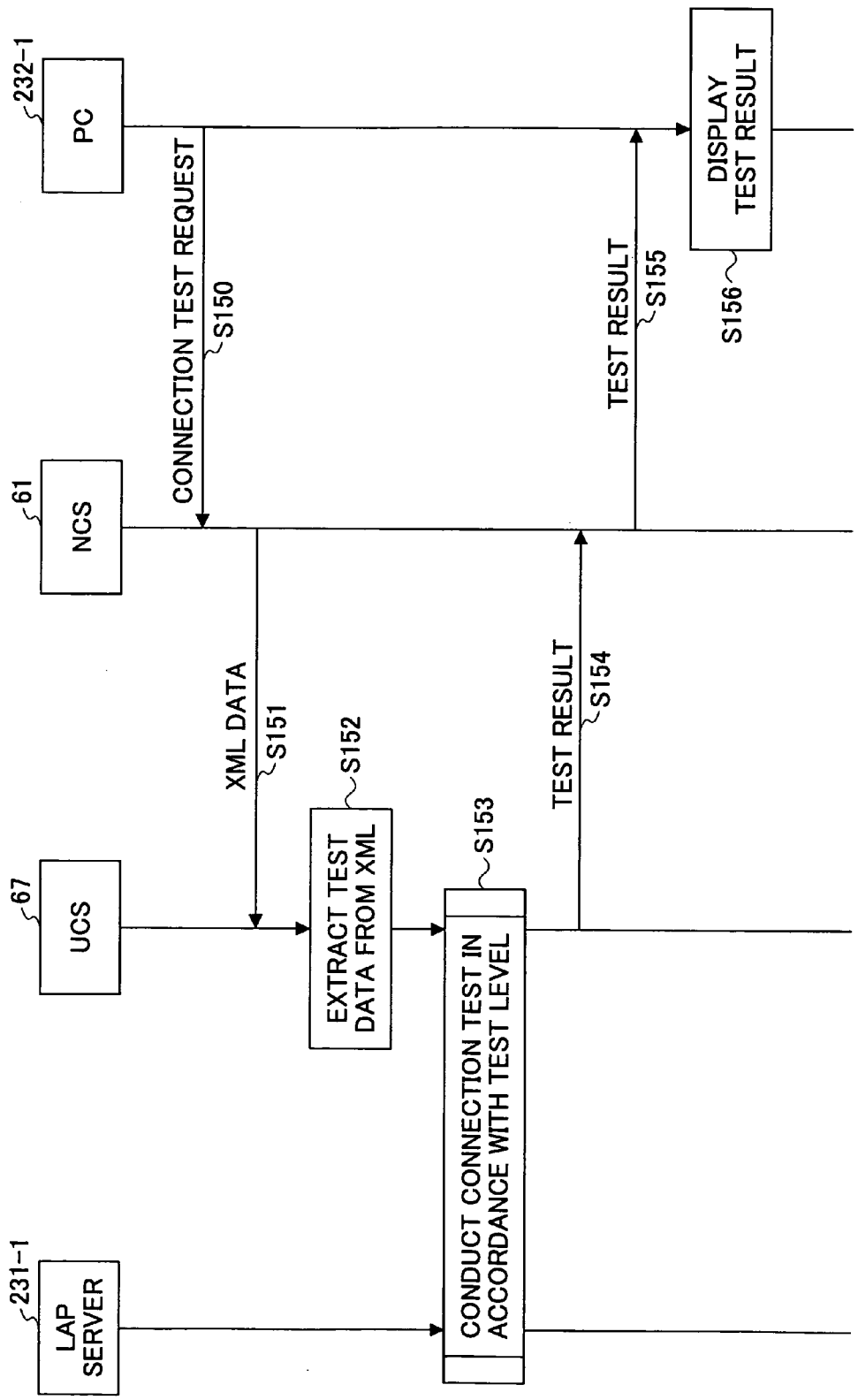

FIG.45

```
<LDAP CONNECTION TEST REQUEST>
  <TEST INFORMATION>
    <TEST LEVEL>4</TEST LEVEL>
    <QUICK SEARCH CONDITION>
      <FILTER>(mail=*)</FILTER>
        . . . . .
    </QUICK SEARCH CONDITION>
      . . . . .
  </TEST INFORMATION>
  <LDAP SERVER INFORMATION>
    <ID>1</ID>
    <NAME INFORMATION>
      <CODE>38</CODE>
      <NAME>LDAP SERVER 1</NAME>
    </NAME INFORMATION>
    <SERVER NAME INFORMATION>
      <CODE>38</CODE>
      <SERVER NAME>111.222.333.444</SERVER NAME>
    </SERVER NAME INFORMATION>
    <SEARCH START POSITION INFORMATION>
      <CODE>38</CODE>
      <SEARCH START POSITION>ou=PF,o=RICOH</SEARCH START POSITION>
    </SEARCH START POSITION INFORMATION>
    <PORT>389</PORT>
    <AUTHENTICATION SETTING>2</AUTHENTICATION SETTING>
      . . . . .
  </LDAP SERVER INFORMATION>
</LDAP CONNECTION TEST REQUEST>
```

FIG.47

| | |
|---|---|
| <TEST RESULTS> | |
| •ENTERED ITEM | : ALL NECESSARY ITEMS HAVE BEEN ENTERED. |
| •SERVER STATE | : SERVER IS IN OPERATION. |
| •AUTHENTICATION | : AUTHENTICATED WITH USER ID" cn=harada,ou=keiri,o=ricoh". |
| •SEARCH OPTION | : SEARCH OPTION 1 "telephoneNumber" |
| |   SEARCH OPTION 2 "givenName" |
| |   SEARCH OPTION 3 "title" |
| |   SEARCH CAN BE CONDUCTED WITH ANY SEARCH OPTION. |
| •SEARCH | : TWO HITS HAVE BEEN RETURNED AS A RESULT OF SEARCHING WITH FOLLOWING SEARCH CONDITIONS. |
| |   ─SEARCH CONDITIONS─ 422 |
| |   NAME (cn) = SUZUKI* |
| |   E-MAIL ADDRESS (mail) = *co.jp* |
| |   ─RETRIEVED NAMES (cn)─ |
| |   SUZUKI, SHINGO 833 |
| |   SUZUKI, MASAHIRO 834 |
| •JAPANESE CHARACTER CODE | : NAME (cn) OF AUTHENTICATED USER IS AS FOLLOWS IN JAPANESE CHARACTER CODES. |
| |   UTF-8    HARADA, HIDETO 903 |
| |   SJFT_JIS  KUKANATOSUISOHE |
| |   ECU_JP   ¥μ¥?¥?⅛? |
| |   JIS       .![AA? "?¡ |

FIG.48

```
<DETAILED SEARCH RESULTS>
—NO.1————————————————————
NAME                SUZUKI, SHINGO ——833
E-MAIL ADDRESS      shingo@abc.co.jp
FAX DESTINATION     03-123-4567
COMPANY NAME        RICOH
DIVISION NAME       PERSONNEL
TELEPHONE NO.       03-987-6543
FIRST NAME          SHINGO
TITLE               MANAGER <DETAILED SEARCH RESULTS>
—NO.2————————————————————
NAME                SUZUKI, MASAHIRO ——834
E-MAIL ADDRESS      masahiro@abc.co.jp
FAX DESTINATION
COMPANY NAME        RICOH
DIVISION NAME       PRODUCTION
TELEPHONE NO.       03-3213-3213
FIRST NAME          MASAHIRO
TITLE
```

CONNECTION TEST METHOD AND INFORMATION PROCESSING APPARATUS PERFORMING SAME

BACKGROUND OF THE INVENTION

1. Field of the Invention

The present invention relates generally to connection test methods and information processing apparatuses performing such connection methods, and more particularly to a connection test method for testing connection to an information storage server shared by one or more information processing apparatuses, an information processing apparatus and an image-forming apparatus performing the connection test method, and a recording medium storing a program for causing a computer to execute the connection test method.

2. Description of the Related Art

Information processing apparatuses such as personal computers perform a variety of information processing by executing one or more software programs corresponding to respective information processing operations. Such information processing apparatuses are connected to, for instance, other computers via a network, and distribute information using a distribution function. Most information processing apparatuses with a distribution function contain preset address data such as e-mail addresses as user information.

Image-forming apparatuses, as example applications of information processing apparatuses, contain the functions of apparatuses such as a printer, a copier, a facsimile machine, and a scanner in a single housing. The image-forming apparatuses have a display part, a printing part, and an image-capturing part provided in the housing. Further, the image-forming apparatuses have four types of software corresponding to a printer, a copier, a facsimile machine, and a scanner provided in the housing, and operate as a printer, a copier, a facsimile machine or a scanner by switching the types of software.

For instance, Japanese Laid-Open Patent Application No. 2002-84383 discloses such an image-forming apparatus (hereinafter referred to as a multi-function apparatus). Most of such multi-function apparatuses have address data such as e-mail addresses or facsimile numbers used by a scanner or a facsimile machine preset therein as user information.

The user information may be set in an information processing apparatus or a multi-function apparatus through, for instance, the input device of the information processing apparatus or the operations panel of the multi-function apparatus. Alternatively, the user information may be set in an information processing apparatus or a multi-function apparatus from a client connected via a network to the information processing apparatus or the multi-function apparatus.

It takes time and effort, however, to set the user information in the information processing apparatuses or multi-function apparatuses. Further, if a user possesses a plurality of information processing apparatuses or multi-function apparatuses, the user has to set the user information apparatus by apparatus.

Accordingly, in the case of the conventional information processing apparatuses or multi-function apparatuses, the setting of user information, which takes time and effort, should be performed apparatus by apparatus so that the copier and scanner functions of the multi-function apparatuses or the distribution functions of the information processing apparatuses using the user information can be utilized.

On the other hand, many companies have come to manage the user information in information storage servers, the user information being used by the distribution functions of the information processing apparatuses or the scanner and facsimile functions of the multi-function apparatuses. Accordingly, an increasing number of users desire to use the user information managed in the information storage servers in the information processing apparatuses or multi-function apparatuses.

However, connection information for connecting the information processing apparatuses or multi-function apparatuses to the information storage servers should be set in the information processing apparatuses or multi-function apparatuses so that the information processing apparatuses or multi-function apparatuses can use the user information managed in the information storage servers. The connection information is often composed of many items, some of which permit no mistake in characters to establish connection with the information storage servers.

Accordingly, it is necessary to set the connection information composed of many items with accuracy in the conventional information processing apparatuses or multi-function apparatuses in order to use the user information managed in the information storage servers.

In the case of determining the accuracy of the set connection information, a user makes an attempt to establish connection with an information storage server using the connection information after the connection information is set. However, a screen for setting the connection information is often different from a screen for attempting connection with the information storage server using the set connection information. This causes a problem in that the accuracy of the set connection information cannot be determined easily.

SUMMARY OF THE INVENTION

Accordingly, it is a general object of the present invention to provide a connection test method and an information processing apparatus in which the above-described disadvantage is eliminated.

A more specific object of the present invention is to provide a connection test method that can easily determine the accuracy of connection information for establishing connection with an information storage server while entering the connection information, an information processing apparatus and an image-forming apparatus performing the connection test method, and a recording medium storing a program for causing a computer to execute the connection test method.

The above objects of the present invention are achieved by a method for an information processing apparatus to test a connection to an information storage server from which the information processing apparatus obtains information, the information storage server being used in common by one or more information processing apparatuses, the method including the steps of: (a) receiving a request for a connection test using connection information for establishing the connection to the information storage server from a screen on which at least part of the connection information is entered; (b) testing the connection to the information storage server based on the request for the connection test; and (c) outputting a result of the connection test.

The above objects of the present invention are also achieved by a computer-readable recording medium storing a program for causing a computer to execute a method for an information processing apparatus to test a connection to an information storage server from which the information processing apparatus obtains information, the information storage server being used in common by a plurality of information processing apparatuses, the method including the steps of: (a) receiving a request for a connection test using connection information for establishing the connection to the information storage server from a screen on which at least part of the connection information is entered; (b) testing the connection to the information storage server based on the request for the connection test; and (c) outputting a result of the connection test.

The above objects of the present invention are also achieved by an information processing apparatus obtaining information from an information storage server used in common by one or more information processing apparatus, including: a connection test request receiving part receiving a request for a connection test using connection information for establishing connection to the information storage server from a screen on which at least part of the connection information is entered; a connection test conducting part testing the connection to the information storage server based on the request for the connection test; and a connection test result outputting part outputting a result of the connection test.

The above objects of the present invention are also achieved by a method for an image-forming apparatus to test a connection to an information storage server used in common by one or more image-forming apparatuses or information processing apparatuses, the image-forming apparatus including a hardware resource used in image formation, one or more programs performing processing related to the image formation, and a platform managing use of the hardware resource by the one or more programs, the method including the steps of: (a) receiving a request for a connection test using connection information for establishing the connection to the information storage server from a screen on which at least part of the connection information is entered; (b) testing the connection to the information storage server using the connection information based on the request for the connection test; and (c) outputting a result of the connection test.

The above objects of the present invention are also achieved by a computer-readable recording medium storing a program for causing a computer to execute a method for an image-forming apparatus to test a connection to an information storage server used in common by one or more image-forming apparatuses or information processing apparatuses, the image-forming apparatus including a hardware resource used in image formation, one or more programs performing processing related to the image formation, and a platform managing use of the hardware resource by the one or more programs, the method including the steps of: (a) receiving a request for a connection test using connection information for establishing the connection to the information storage server from a screen on which at least part of the connection information is entered; (b) testing the connection to the information storage server using the connection information based on the request for the connection test; and (c) outputting a result of the connection test.

The above objects of the present invention are further achieved by an image-forming apparatus including a hardware resource used in image formation, one or more programs performing processing related to the image formation, and a platform managing use of the hardware resource by the one or more programs, the image-forming apparatus including: a connection test request receiving part receiving a request for a connection test using connection information for establishing connection to an information storage server from a screen on which at least part of the connection information is entered, the information storage server being used in common by one or more image-forming apparatuses or information processing apparatuses; a connection test conducting part testing the connection to the information storage server using the connection information based on the request for the connection test; and a connection test result outputting part outputting a result of the connection test.

According to the present invention, a request for a connection test using connection information for establishing connection to an information storage server can be made from a screen for entering the connection information. Accordingly, the accuracy of the entered connection information can be determined quickly and easily. As a result, according to the present invention, the connection to the information storage server can be established with the accurate connection information, so that information stored in the information storage server can be obtained.

BRIEF DESCRIPTION OF THE DRAWINGS

Other objects, features and advantages of the present invention will become more apparent from the following detailed description when read in conjunction with the accompanying drawings, in which:

FIG. 9 is a diagram for illustrating a request for a connection test according to the first embodiment of the present invention;

FIG. 10 is a sequence diagram showing a relationship between the recording of LDAP server information and the conducting of a connection test according to the first embodiment of the present invention;

FIGS. 11A through 11D are image diagrams showing example LDAP server information recording screens according to the first embodiment of the present invention;

FIGS. 12A through 12D are image diagrams showing example test level setting screens according to the first embodiment of the present invention;

FIGS. 30A through 30E are image diagrams for illustrating a screen displayed on the operations panel in the case of conducting the connection test with one of the connection test items "QUICK SEARCH," "TEST CONDITION SEARCH," and "NORMAL SEARCH" being selected according to the first embodiment of the present invention;

FIG. 42 is a sequence diagram showing a case of recording LDAP server information based on an instruction from the screen of a client according to the first embodiment of the present invention;

FIG. 43 is an image diagram showing XML data employed in recording the LDAP server information according to the first embodiment of the present invention;

FIG. 44 is a sequence diagram showing a case of conducting a connection test based on an instruction from the screen of the client according to the first embodiment of the present invention;

FIG. 45 is an image diagram showing XML data employed in conducting the connection test according to the first embodiment of the present invention;

FIG. 47 is a diagram showing an example output in the case of conducting the connection test with a plurality of connection test items being selected according to the first embodiment of the present invention;

FIG. 48 is a diagram showing an example output of the details of the result of the connection test according to the first embodiment of the present invention;

DETAILED DESCRIPTION OF THE PREFERRED EMBODIMENTS

A description is given below, with reference to the accompanying drawings, of embodiments of the present invention.

Figure 1:
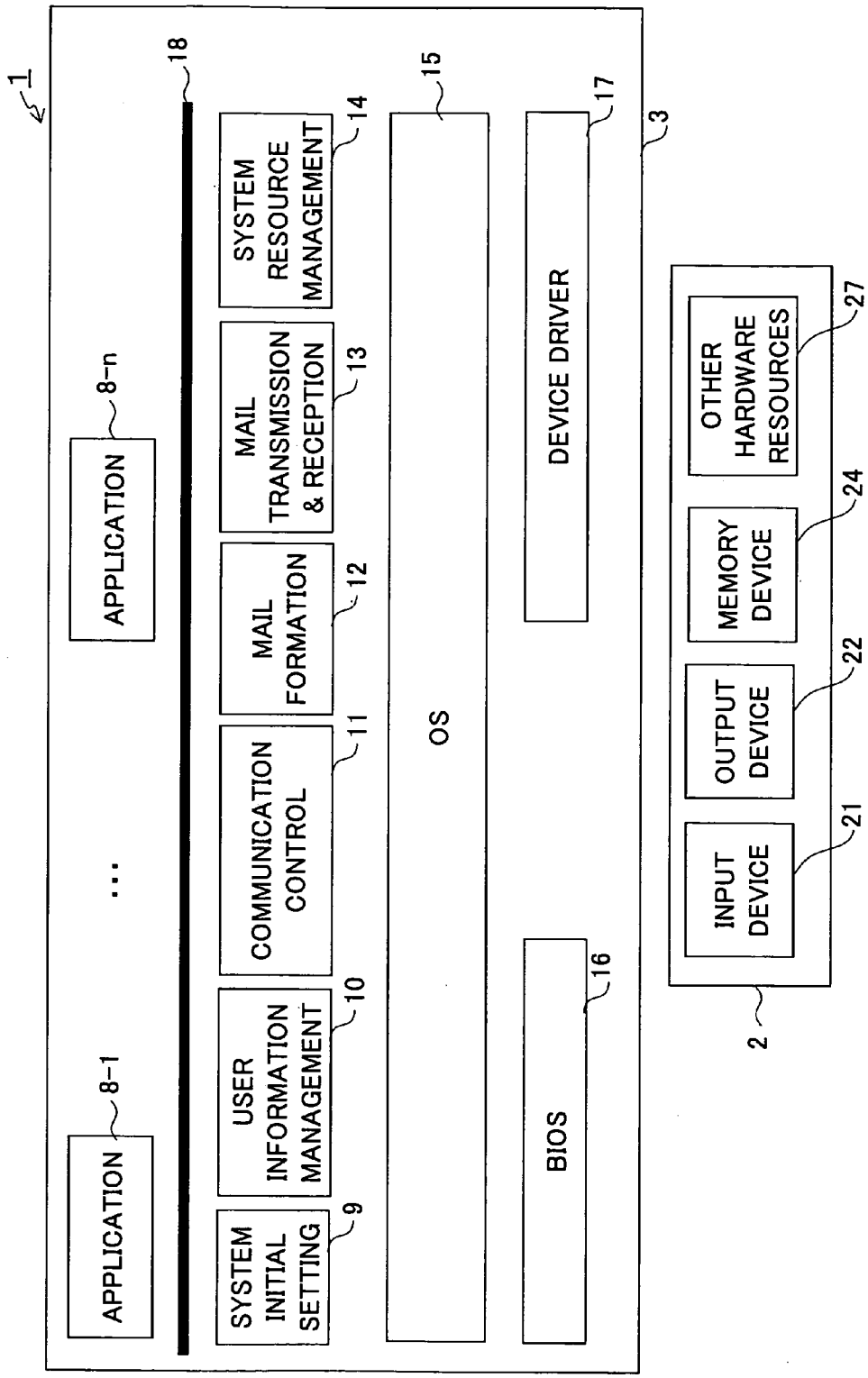
FIG. 1 is block diagram showing an information processing apparatus according to the present invention.

FIG. 1 is block diagram showing an information processing apparatus 1 according to the present invention. The information processing apparatus 1 includes a hardware resource 2 and a software group 3. The hardware resource 2 includes an input device 21, an output device 22, a memory device 24, and other hardware resources 27. The software group 3 includes applications 8-1 through 8-*n*, a system initial setting part 9, a user information management part 10, a communication control part 11, a mail formation part 12, a mail transmission and reception part 13, a system resource management part 14, an OS 15 such as UNIX®, a BIOS 16, and a device driver 17.

When the information processing apparatus 1 is turned on, the information processing apparatus 1 reads out the program of the OS 15 from a secondary storage device included in, for instance, the other hardware resources 27. Then, the information processing apparatus 1 transfers the program to the memory device 24, and activates the program. Further, the information processing apparatus 1, at the time of being turned on or by an activation instruction from an operator, reads out the programs of the applications 8-1 through 8-*n*, transfers the programs to the memory device 24, and activates the programs.

The applications 8-1 through 8-*n* cause the information processing apparatus 1 to perform a variety of information processing. The BIOS 16 is a program controlling the hardware resource 2. The device driver 17 is a program managing peripheral devices included in the hardware resource 2. A detailed description is given below of the system initial setting part 9, the user information management part 10, the communication control part 11, the mail formation part 12, the mail transmission and reception part 13, and the system resource management part 14.

The OS 15 controls the software programs of the applications 8-1 through 8-*n*, the system initial setting part 9, the user information management part 10, the communication control part 11, the mail formation part 12, the mail transmission and reception part 13, and the system resource management part 14 in parallel as processes. Further, the OS 15 makes a request to the hardware resource 2 using the BIOS 16 and the device driver 17.

The applications 8-1 through 8-*n* transmit requests, using an API (application program interface) 18, to the system initial setting part 9, the user information management part 10, the communication control part 11, the mail formation part 12, the mail transmission and reception part 13, the system resource management part 14, or the OS 15. The API 18 is used to transmit the requests from the applications 8-1 through 8-*n* to the system initial setting part 9, the user information management part 10, the communication control part 11, the mail formation part 12, the mail transmission and reception part 13, the system resource management part 14, or the OS 15 according to a predefined function.

Figure 2:
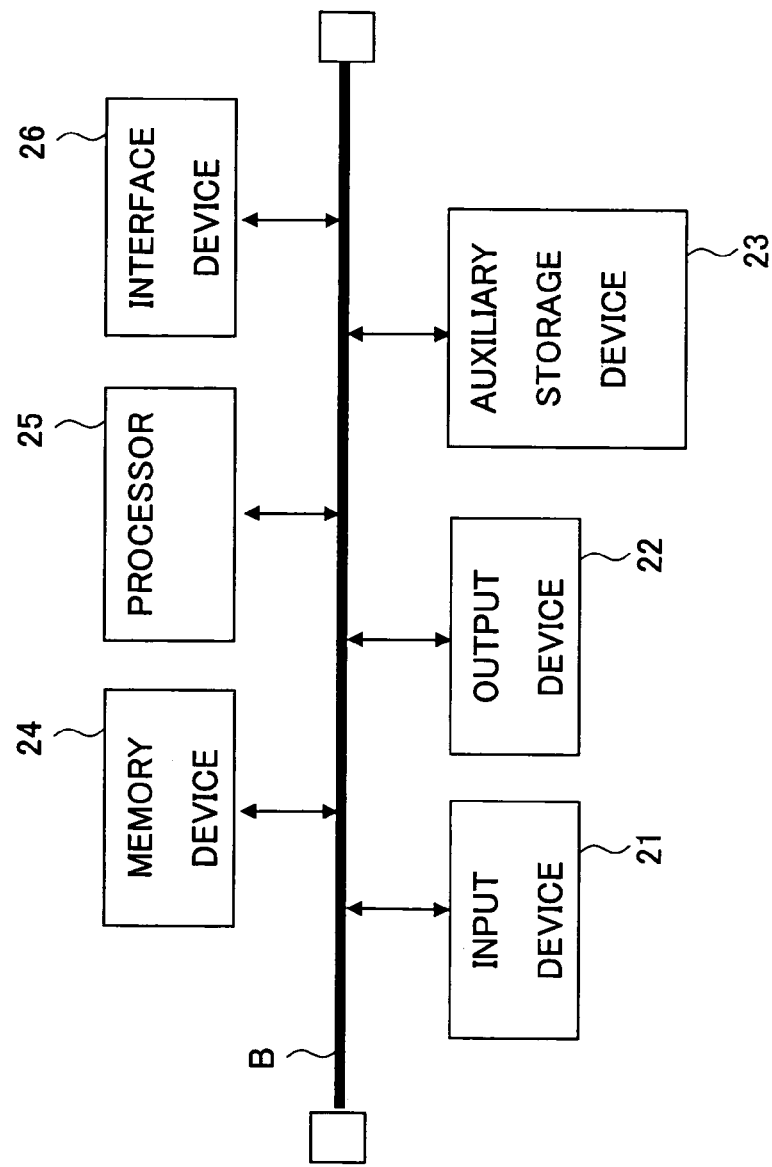
FIG. 2 is a block diagram showing a hardware configuration of the information processing apparatus according to the present invention.

Next, a description is given of the hardware configuration of the information processing apparatus 1. FIG. 2 is a block diagram showing a hardware configuration of the information processing apparatus 1 according to the present invention. The information processing apparatus 1 includes the input device 21, the output device 22, a secondary storage device 23, the memory device 24, a processor 25, and an interface device 26, which are connected by a bus B.

The input device 21 includes a keyboard and a mouse, and is used to input a variety of instructions on operations. The output device 22 includes a display and a printer, and outputs information necessary for inputting the instructions on operations. The auxiliary storage device 23 stores a program for causing the information processing apparatus 1 to perform processing related thereto and files and data necessary for the processing of the program. The interface device 26 includes a modem, for example, and is used to establish connection to a network.

When the information processing apparatus 1 is activated, the memory device 24 reads out the program stored in the auxiliary storage device 23, and stores the read-out program. The processor 25 performs processing according to the program stored in the memory device 24.

The information processing apparatus 1 is connected to, for instance, a client via a network, and distributes image information using a distribution function. In order to use the distribution function, it is necessary to set address data such as e-mail addresses as user information in the information processing apparatus 1.

Figure 3:
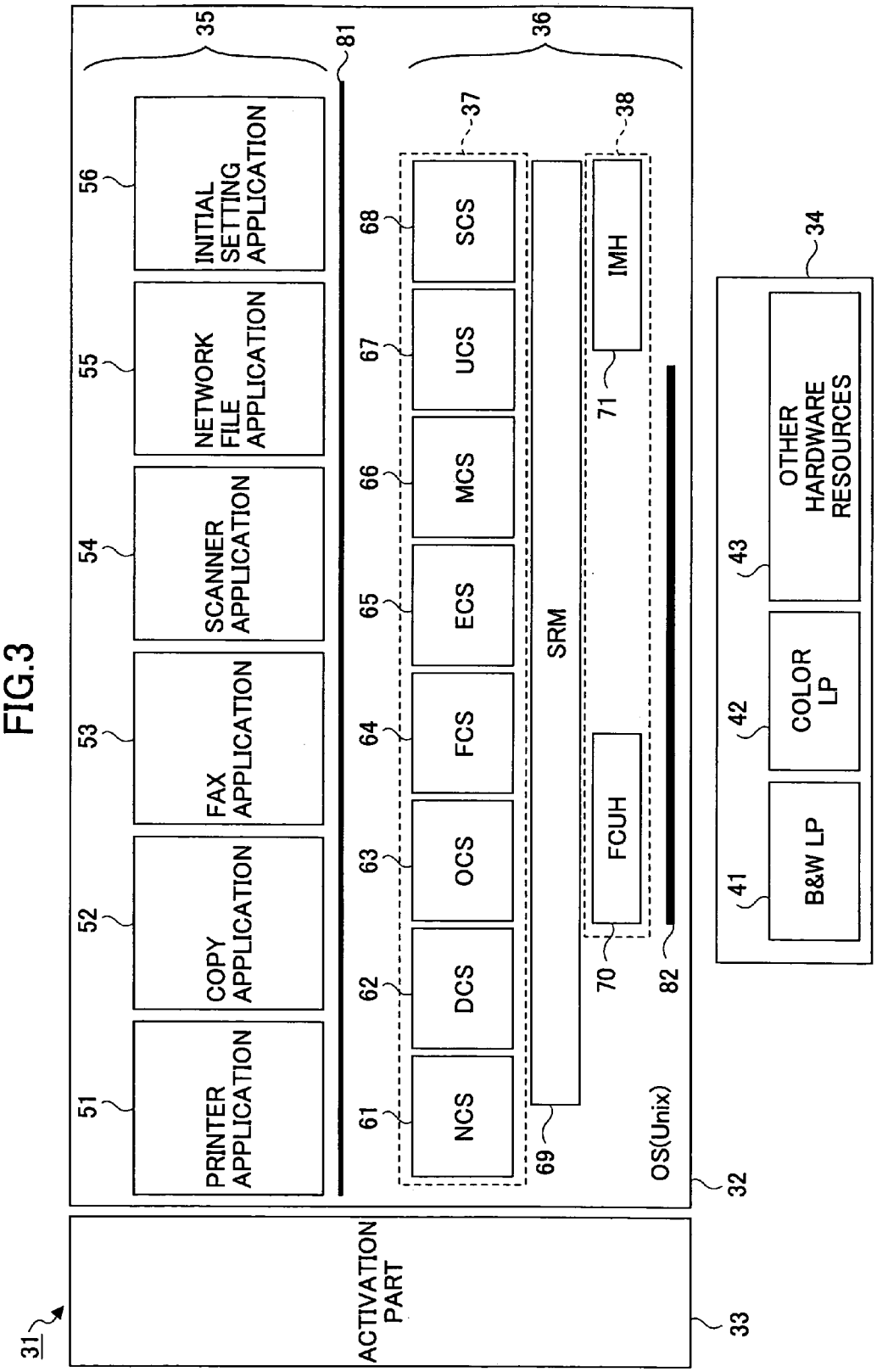
FIG. 3 is a block diagram showing a multi-function apparatus according to the present invention.

Next, a description is given of a multi-function apparatus 31 as an application of the information processing apparatus 1 according to the present invention. FIG. 3 is a block diagram showing the multi-function apparatus 31 according to the present invention. The multi-function apparatus 31 includes a software group 32, a multi-function apparatus activation part 33, and a hardware resource 34.

When the multi-function apparatus 31 is turned on, the activation part 33 is first operated to activate an application layer 35 and a platform 36. The hardware resource 34 includes a black and white laser printer (B&W LP) 41, a color laser printer (color LP) 42, and other hardware resources 43 such as a scanner and a facsimile machine. The software group 32 includes the application layer 35 and the platform 36 activated on an OS such as UNIX®.

The application layer 35 includes a printer application 51, a copier application 52, a facsimile machine (FAX) application 53, a scanner application 54, a network filing application 55, and an initial setting application 56. The network filing application 55, which is an application for network filing, manages communications with an information storage server connected to the multi-function apparatus 31 via a network.

The platform 36 includes a control service layer 37, a system resource manager (SRM) 69, and a handler layer 38. The control service layer 37 interprets requests for processing (processing requests) from the application layer 35, and generates requests for obtaining the hardware resource 34 (obtaining requests). The SRM 69 manages the hardware resource 34 and arbitrates between the obtaining requests from the control service layer 37. The handler layer 38 manages the hardware resource 34 in accordance with the obtaining requests from the SRM 69.

The control service layer 37 includes one or more service modules such as a network control service (NCS) 61, a delivery control service (DCS) 62, an operations panel control service (OCS) 63, a facsimile control service (FCS) 64, an engine control service (ECS) 65, a memory control service (MCS) 66, a user information control service (UCS) 67, and a system control service (SCS) 68.

The platform 36 includes an API 81. The OS executes the software programs of the application layer 35 and the platform 36 in parallel as processes.

The process of the NCS 61 arbitrates between data when the data are transmitted or received. The process of the DCS 62 controls the delivery of a document stored in the multi-function apparatus 31. The process of the OCS 63 controls an operations panel serving as an information transmission part between an operator and main body control. The process of the FCS 64 provides an API for performing facsimile transmission and reception. The process of the ECS 65 controls the engine part of the hardware resource 34. The process of the MCS 66 controls memory. The process of the UCS 67 manages user information. The process of the SCS 68 performs processing for system control. The process of the SRM 39 performs system control and manages the hardware resource 34 in cooperation with the SCS 38.

Figure 4:
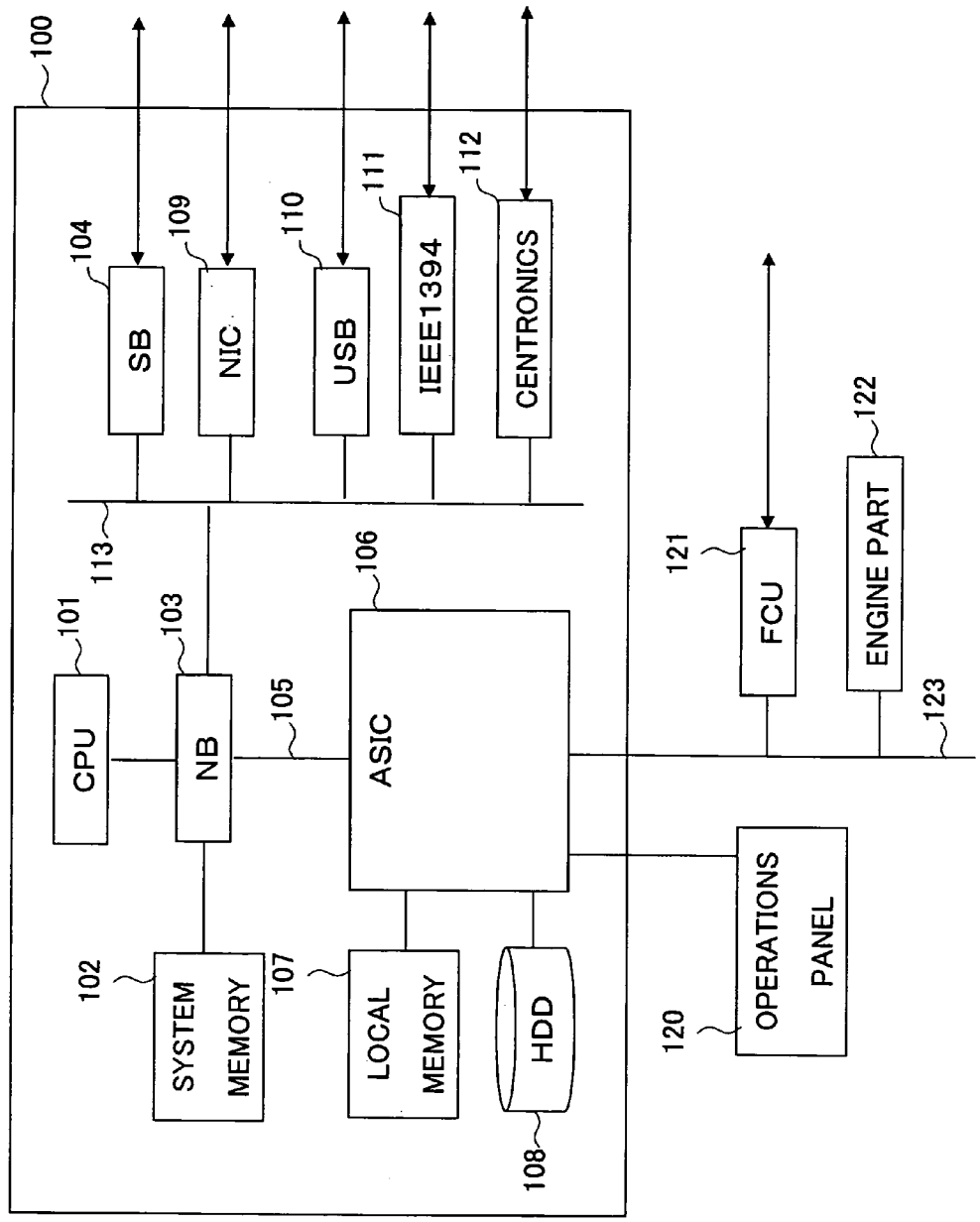
FIG. 4 is a block diagram showing a hardware configuration of the multi-function apparatus according to the present invention.

The handler layer 38 includes a facsimile control unit handler (FCUH) 70 and an image memory handler (IMH) 71. The FCUH 70 manages a below-described facsimile control unit (FCU) 121 (FIG. 4). The IMH 71 allocates memory to each process and manages the memory allocated to each process. The SRM 69 and the FCUH 70 make processing requests to the hardware resource 34 using an engine I/F 82. The configuration of FIG. 3 allows the multi-function apparatus 1 to perform all necessary operations common to the applications in the platform layer 36.

Next, a description is given of the hardware configuration of the multi-function apparatus 31. FIG. 4 is a block diagram showing a hardware configuration of the multi-function apparatus 31 according to the present invention. The multi-function apparatus 31 includes a controller 100, an operations panel 120, the FCU 121, and an engine part 122. The controller 100 includes a CPU 101, a system memory 102, a Northbridge (NB) 103, a Southbridge (SB) 104, an application specific integrated circuit (ASIC) 106, a local memory 107, a hard disk drive (HDD) 108, a network interface card (NIC) 109, a USB device 110, an IEEE1394 device 111, and a Centronics port 112.

The CPU 101 controls the entire multi-function apparatus 31. For instance, the CPU 101 activates processes on the OS, and causes them to be executed. The NB 103 is a bridge for connecting the CPU 101, the system memory 102, the SB 104, a PCI bus 113, and the ASIC 106. The SB 104 is a bridge for connecting a ROM and peripheral devices with the PCI bus 113. The system memory 102 is employed as the memory for image drawing of the multi-function apparatus 31. The local memory 107 is employed as an image buffer for copying and a code buffer.

The ASIC 106 is an IC for image processing including a hardware element for image processing. The HDD 108 is a storage device (secondary storage device) for storing image data, document data, programs, and font data. The NIC 109 an interface device for connecting the multi-function apparatus 31 to a network. The USB device 110, the IEEE1394 device 111, and the Centronics port 112 are interfaces based on their respective standards.

The operations panel 120 is an operation part receiving operations input by an operator and displaying information to the operator. The FCU 121, which includes memory, is used to, for instance, temporarily store facsimile data received when the multi-function apparatus 31 is off.

[First Embodiment]

A description is given below, with respect to a connection test method according to the present invention, of the operation of the multi-function apparatus 31 as an application of the information processing apparatus 1 according to the present invention. According to this embodiment, an information storage server is based on LDAP (Lightweight Directory Access Protocol), and is called an LDAP server. Connection information for connecting the multi-function apparatus 31 to the information storage server is referred to as LDAP server information. Further, the LDAP server manages user information.

Figure 5:
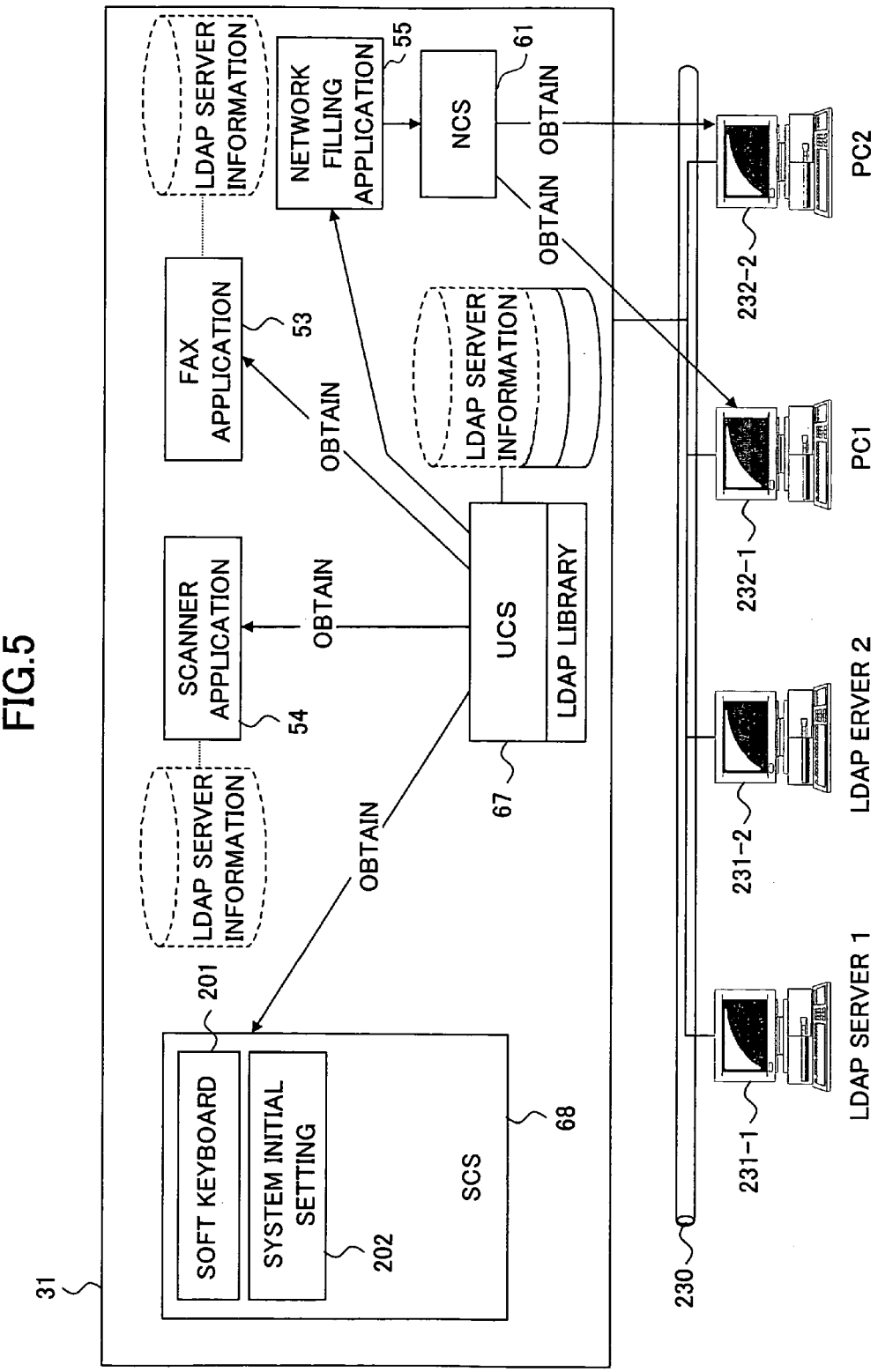
FIG. 5 is a diagram for illustrating a request for obtaining LDAP server information according to a first embodiment of the present invention.

FIG. 5 is a diagram for illustrating a request for obtaining LDAP server information. In FIG. 5, configuration parts unnecessary for the illustration are omitted. The UCS 67 stores the LDAP server information in the HDD 108, and manages the LDAP server information LDAP server by LDAP server. The LDAP server information managed by the UCS 67 includes a server name, a host name (an IP address), a port number, a search start position, authentication information, a plurality of optional search conditions (search options), and a character code.

The UCS 57 supplies the LDAP server information to the FAX application 53, the scanner application 54, a system initial setting function 202 of the SCS 68, or an external client (PC) 232-1 or 232-2 of the multi-function apparatus 31 at the request thereof for obtaining the LDAP server information. The supplied LDAP server information includes a server name, a host name (an IP address), a port number, a search start position, authentication information, a plurality of search options, and a character code. A soft keyboard function 201 of the SCS 68 controls a soft keyboard displayed on the operations panel 120.

Figure 6:
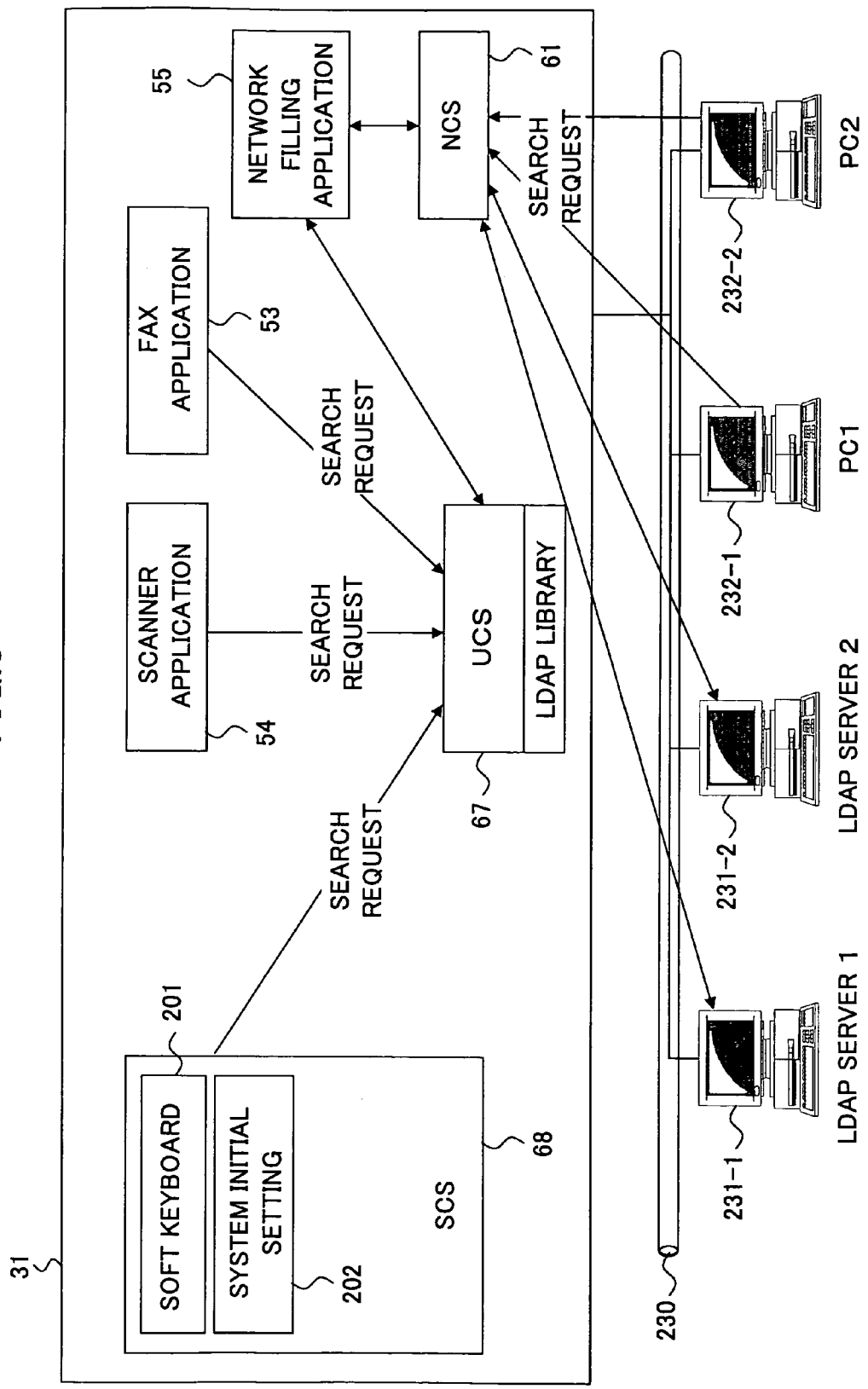
FIG. 6 is a diagram for illustrating a search request using the LDAP server information according to the first embodiment of the present invention.

FIG. 6 is a diagram for illustrating a search request using the LDAP server information. In FIG. 6, configuration parts unnecessary for the illustration are omitted. The UCS 67 makes a request to search for user information (a search request) to the FAX application 53, the scanner application 54, the system initial setting function 202 of the SCS 68, or the external client 232-1 or 232-2 of the multi-function apparatus 31 at the search request thereof. For instance, the UCS 67 makes a search request to an LDAP server 231-1 or 231-2 via the network filing application 55, the NCS 61, and a network 230.

At the time of making a search request, the FAX application 53, the scanner application 54, the system initial setting function 202 of the SCS 68, or the external client 232-1 or 232-2 of the multi-function apparatus 31 supplies the UCS 67 with target server information such as the server name, the host name, and the port number of a target LDAP server, or the LDAP server 231-1 or 231-2 to be searched, and with search information necessary for the search, such as search conditions and the maximum number of hits.

The FAX application 53, the scanner application 54, the system initial setting function 202 of the SCS 68, or the external client 232-1 or 232-2 of the multi-function apparatus 31 makes a request to search for necessary user information to the UCS 67 using the LDAP server information, thereby searching for the user information stored in the LDAP server 231-1 or 231-2.

Figure 7:
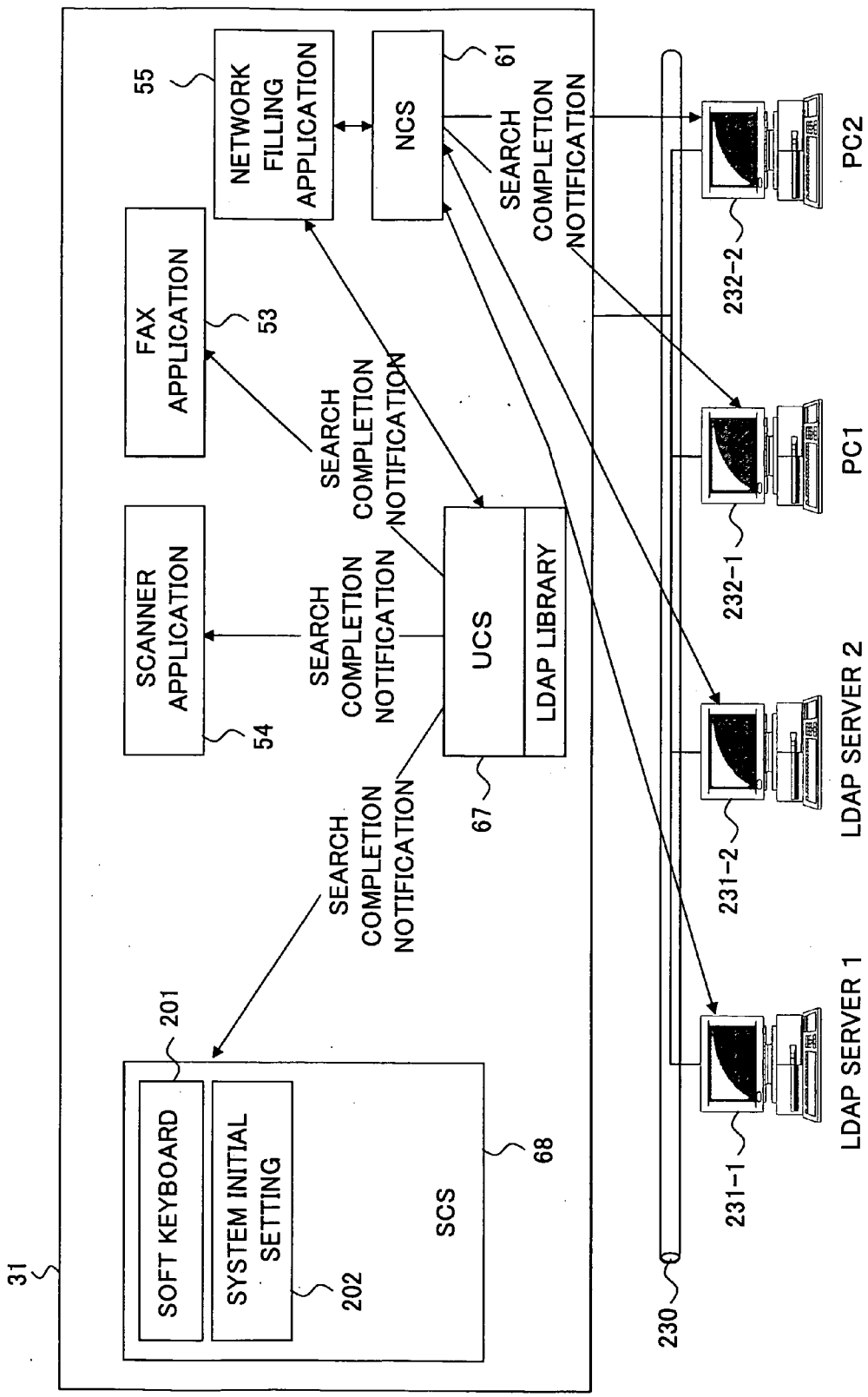
FIG. 7 is a diagram for illustrating a search completion notification to a search request according to the first embodiment of the present invention.

FIG. 7 is a diagram for illustrating a search completion notification to a search request. In FIG. 7, configuration parts unnecessary for the illustration are omitted. The UCS 67 receives a response to the search request (a search request response) from the LDAP server 231-1 or 231-2 via, for instance, the network 230, the NCS 61 and the network filing application 55. Receiving the search request response, the UCS 67 stores the search request response in the HDD 108. For instance, the search request response includes user information such as a name, an e-mail address, a facsimile number, a company name, a division name, and a password. Further, when receiving the search request response, the UCS 67 transmits a search completion notification (reporting the completion of the search) to the FAX application 53, the scanner application 54, the system initial setting function 202 of the SCS 68, or the external client 232-1 or 232-2 of the multi-function apparatus 31. The search completion notification includes a search result such as SUCCESS, TIME OUT, EXCEEDING MAXIMUM NUMBER OF HITS, or AUTHENTICATION FAILURE.

Figure 8:
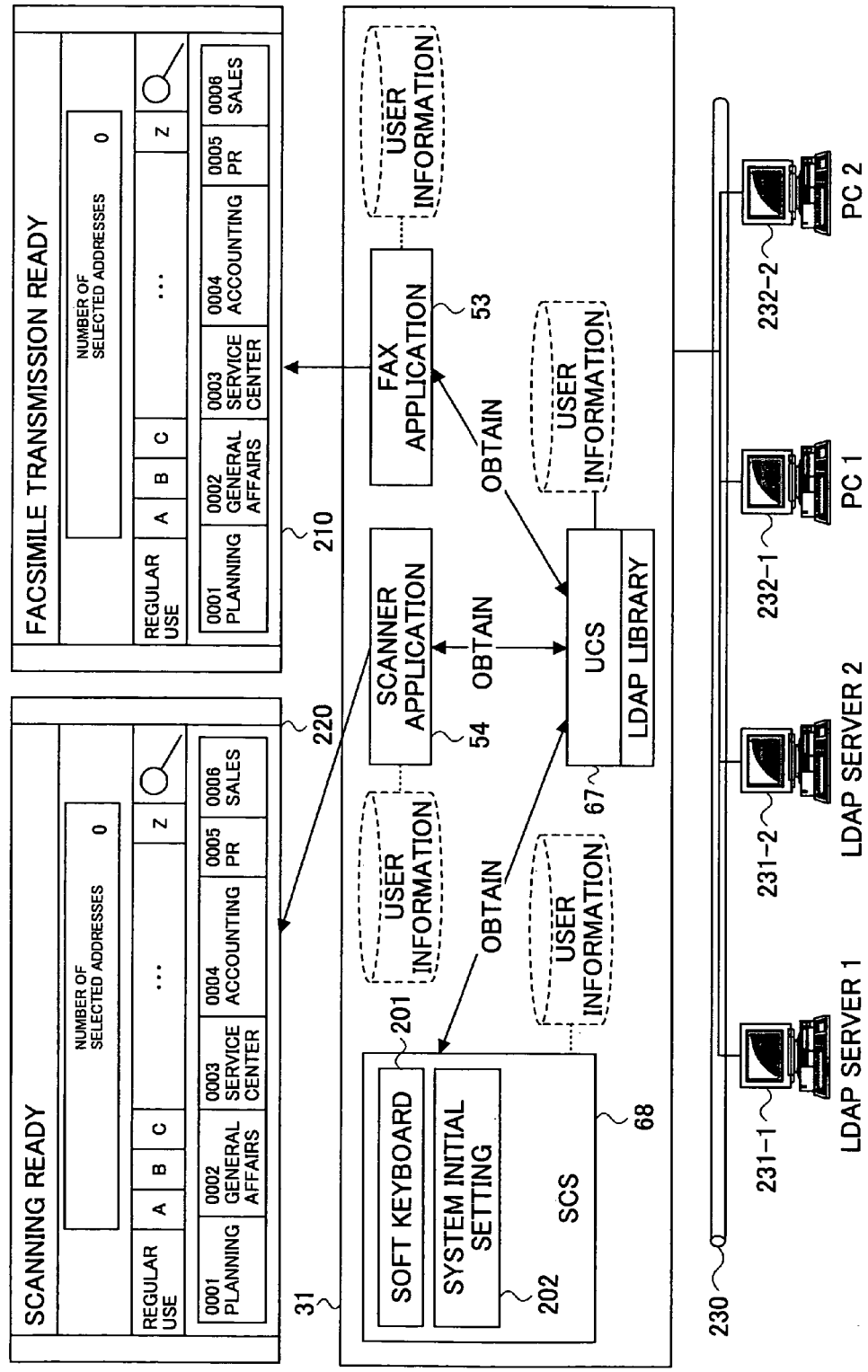
FIG. 8 is a diagram for illustrating a request to obtain user information according to the first embodiment of the present invention.

FIG. 8 is a diagram for illustrating a request to obtain user information. In FIG. 8, configurations unnecessary for the illustration are omitted. When receiving the search completion notification, the FAX application 53, the scanner application 54, or the system initial setting function 202 of the SCS 68 makes a request to obtain user information to the UCS 67 if the search result is, for instance, SUCCESS. The UCS 67 supplies the user information to the FAX application 53, the scanner application 54, or the system initial setting function 202 of the SCS 68 at the request thereof for obtaining the user information.

For instance, the FAX application 53 obtains user information necessary for a facsimile function by making a request to obtain user information to the UCS 67, and displays a screen 210 on the operations panel 120 using the user information. The screen 210 displays information for selecting an address such as a facsimile number to which facsimile data is to be transmitted. The scanner application 54 obtains user information necessary for a scanner function by making a request to obtain user information to the UCS 67, and displays a screen 220 on the operations panel 120 using the user information. The screen 220 displays information for selecting an address such as an e-mail address to which scanner data is to be transmitted.

Thus, according to the multi-function apparatus 31 according to the present invention, the user information managed in the LDAP servers 231-1 and 231-2 can be searched for. Accordingly, there is no need to enter or set the user information manually in each multi-function apparatus 31. In order for the multi-function apparatus 31 to use the user information managed in the LDAP servers 231-1 and 231-2, the LDAP server information should be entered and set with accuracy. Accordingly, the multi-function apparatus 31 conducts a below-described connection test so as to determine the accuracy of the LDAP server information.

FIG. 9 is a diagram for illustrating a request for a connection test (a connection test request). In FIG. 9, configuration parts unnecessary for the illustration are omitted. The connection test request may be made to the UCS 67 by the system initial setting function 202 of the SCS 68 or the external client 232-1 or 232-2 of the multi-function apparatus 31. Alternatively, the connection test request may be made by the initial setting application 56, which has the same function as the system initial setting function 202 of the SCS 68.

The connection test request from the system initial setting function 202 is made by a user giving an instruction to conduct a connection test on a below-described LDAP server information recording screen (LDAP server input screen) (FIGS. 11A through 1D). The connection test request from the client 232-1 or 232-2 is made by a user-giving an instruction to conduct a connection test on the LDAP server information recording screen of, for instance, a Web format displayed on a screen.

The UCS 67 receives the connection test request from the client 232-1 or 232-2 via the network 230, the NCS 61, and the network filing application 55. The connection test request includes LDAP server information such as a test level, a host name, a port number, a search start position, authentication information, search conditions, and a character code.

Receiving the connection test request, the UCS 67 makes a variety of requests for the connection test, such as a request for authentication and a request for search, to the LDAP server 231-1 or 231-2 using the LDAP server information included in the connection test request. Then, the UCS 67 supplies the result of the connection test to the system initial setting function 202 of the SCS 68 or the external client 232-1 or 232-2 of the multi-function apparatus 31.

The user can determine the accuracy of entered LDAP server information by checking the result of the connection test displayed on the screen of the operations panel 120 or the client 232-1 or 232-2.

Next, a description is given of the case of giving an instruction to record LDAP server information and conduct a connection test on the screen of the operations panel 120. FIG. 10 is a sequence diagram showing a relationship between the recording of LDAP server information and the conducting of a connection test. The instruction to record LDAP server information and conduct a connection test may be given on the screen of the client 232-1 or 232-2.

Referring to FIG. 10, in step S1, the user operates the operations panel 120 to give an instruction to display the LDAP server information recording screen. The system initial setting function 202 of the SCS 68 displays the LDAP server information recording screen on the operations panel 120 based on the instruction from the user. The user operates the soft keyboard displayed on the operations panel 120 to enter LDAP server information on the LDAP server information recording screen displayed on the operations panel 120. When the user gives an instruction to conduct a connection test on the LDAP server information recording screen, in step S2, the SCS 68 makes a connection test request to the UCS 67.

Receiving the connection test request, in step S3, the UCS 67 makes a variety of requests for the connection test to the LDAP server 231-1 or 231-2 using the LDAP server information included in the connection test request. In step S4, the UCS 67 obtains the result of the connection test.

In step S5, the UCS 67 supplies the result of the connection test to the system initial setting function 202 of the SCS 68. The system initial setting function 202 displays the supplied result of the connection test on the operations panel 120. By checking the result of the connection test displayed on the operations panel 120, the user can determine the accuracy of the LDAP server information that the user is to record.

Then, in step S6, the user determines whether the connection test has succeeded based on the result of the connection test. If the user determines that the connection test has succeeded (that is, "YES" in step S6), the user operates the operations panel to give an instruction to record the LDAP server information entered on the LDAP server information recording screen. Next, in step S7, the system initial setting function 202 of the SCS 68 makes a request to record the LDAP server information to the UCS 67 based on the instruction from the user. Receiving the request to record the LDAP server information from the SCS 68, the UCS 67 records the LDAP server information.

If the user determines in step S6 that the connection test has failed based on the result of the connection test (that is, "NO" in step S6), the user gives an instruction to display the LDAP server information recording screen from the operations panel 120. Then, the system initial setting function 202 of the SCS 68 returns to step S1 to display the LDAP server information recording screen on the operations panel 120.

According to the operation shown in the sequence diagram of FIG. 10, the LDAP server information can be recorded after being entered with accuracy by repeating the entering of the LDAP server information and the conducting of the connection test.

Next, a detailed description is given of the operation of entering the LDAP server information in step S1. FIGS. 11A through 11D are image diagrams showing example LDAP server information recording screens. When the user gives an instruction to display the LDAP server information recording screen from the operations panel 120, the system initial setting function 202 displays a screen 300 (FIG. 11A) on the operations panel 120. In the case of recording new LDAP server information, the user presses a new recording (NEW RECORDING) button 301 on the screen 300. In the case of changing recorded LDAP server information, the user presses an LDAP server selection button 302. The following description is given of the case of recording new LDAP server information.

When the NEW RECORDING button 301 is pressed on the screen 300, the system initial setting function 202 displays a screen 310 (FIG. 11B) on the operations panel 120. The screen 310 is configured so that a name, a server name, authentication information, and a username may be entered thereon. For instance, the user operates the soft keyboard displayed on the operations screen 120 to enter a name, a server name, authentication information, and a username on the screen 310. In the case of entering LDAP server information other than that enterable on the screen 310, the user presses a next page display (NEXT) button 311.

When the NEXT button 311 is pressed on the screen 310, the system initial setting function 202 displays a screen 320 (FIG. 11C) on the operations panel 120. The screen 320 includes a test conducting (CONNECTION TEST) button 321 for conducting a connection test and a test level setting (SET TEST LEVEL) button 322 for displaying a below-described test level setting screen on the operations panel 120. Further, the screen 320 is configured so that a port number, a search start position, and a Japanese character code as an example of a character code may be entered thereon.

For instance, the user operates the soft keyboard displayed on the operations panel 120 to enter a port number, a search start position, and a Japanese character code on the screen 320. In the case of entering LDAP server information other than that enterable on the screen 320, the user presses a next page display (NEXT) button 324.

When a previous page display (PREV.) button 323 is pressed on the screen 320, the system initial setting function 202 displays the screen 310 of FIG. 11B on the operations panel 120. When the NEXT button 324 is pressed on the screen 320, the system initial setting function displays a screen 330 (FIG. 1D) on the operations panel 120. The screen 330 is configured so that one or more search options may be entered thereon. The search options refer to attributes to be used for searching or obtaining that can be set arbitrarily (selected optionally).

For instance, the user operates the soft keyboard displayed on the operations panel 120 to enter the search options. In the case of entering LDAP server information other than that enterable on the screen 330, the user presses a previous page display (PREV.) button 331.

When the OK button or the CANCEL button is pressed on the screen 310, 320, or 330, the system initial setting function 202 displays the screen 300 of FIG. 11A on the operations panel 120. When the OK button is pressed on the screen 310, 320, or 330, the system initial setting function 202 records the LDAP server information entered on the screen(s) 310, 320, and/or 330, and thereafter, displays the screen 300 on the operations panel 120. On the other hand, when the CANCEL button is pressed on the screen 310, 320, or 330, the system initial setting function 202 displays the screen 300 on the operations panel 120 without recording the entered LDAP server information.

Next, a detailed description is given of the operation of setting a test level. FIGS. 12A through 12D are image diagrams showing example test level setting screens. When the user presses the SET TEST LEVEL button 322 on the screen 320 of FIG. 11C, the system initial setting function 202 displays a screen 400 (FIG. 12A) on the operations panel 120. The screen 400 is configured so that connection test items such as ENTERED ITEM, SERVER STATE, AUTHENTICATION, and SEARCH OPTION may be selected. The connection test item "ENTERED ITEM" is provided for checking the sufficiency of entered LDAP server information items. The connection test item "SERVER STATE" is provided for checking the operating state of the LDAP server 231-1 or 231-2 by a command for testing network connections, such as a ping command.

The connection test item "AUTHENTICATION" executes a request for authentication (authentication request), such as an ldap_bind command, corresponding to settings, and determines whether authentication information includes an error based on a return value from the LDAP server 231-1 or 231-2. The connection test item "SEARCH OPTION" makes search requests based on below-described search options 1 through 3, and determines whether the LDAP server 231-1 or 231-2 is searchable by the search options 1 through 3. In the case of selecting connection test items other than those selectable on the screen 400, the user presses a next page display (NEXT) button 401.

When the NEXT button 401 is pressed on the screen 400, the system initial setting function 202 displays a screen 410 (FIG. 12B) on the operations panel 120. The screen 410 is configured so that connection test items such as JAPANESE CHARACTER CODE, QUICK SEARCH, TEST CONDITION SEARCH, and NORMAL SEARCH can be selected.

The connection test item "JAPANESE CHARACTER CODE" displays information to be displayed on the operations panel 120, such as an authenticated person (user) registered in the LDAP server 231-1 or 231-2 or search results, in one or more Japanese character codes. The connection test item "QUICK SEARCH" executes an "ldap_search command," letting a search condition be, for instance, "objectClass=*," and determines whether the LDAP server 231-1 or 231-2 is searchable. The connection test item "TEST CONDITION SEARCH" makes a search request such as an "ldap_search command" after entering a search condition for testing (a test search condition) beforehand, and displays the search results on the operations panel 120.

In addition to the "objectClass=*," "cn=*," "mail=*," or "facsimileTelephoneNumber=*" may be used as the search condition. A certain condition may be entered in the asterisk (*) included in the search condition. Further, it is also possible to change an attribute. By changing the attribute, it can be determined whether information necessary for the multi-function apparatus 31 can be searched for. For instance, if the multi-function apparatus 31 requires information related to e-mail, "mail=*" may be selected as the search condition.

Further, in addition to "ldap_search," a command such as "ldap_search_ext," "ldap_search_ext_s," "ldap_search_s," or "ldap_search_st" may be used as the search request.

The entered test search condition may be retained until being changed. The connection test item "NORMAL SEARCH" enters a search condition and performs normal search, then displaying the search results on the operations panel 120.

In the case of entering a test search condition, the user presses a test condition editing (TEST CONDITION EDITING) button 412 on the screen 410. When the test condition editing (TEST CONDITION EDITING) button 412 is pressed on the screen 410, the system initial setting function 202 displays a screen 420 (FIG. 12C) on the operations panel 120. In the case of selecting connection test items other than those selectable on the screen 410, the user presses a previous page button (PREV.) 411.

The screen 420 is configured so that search conditions such as NAME, MAIL ADDRESS, FACSIMILE (FAX) DESTINATION, COMPANY NAME, and DIVISION NAME may be entered. The screen 420 is also configured so that match conditions such as MATCH, FORWARD MATCH (begins-with partial word matching), BACKWARD MATCH (ends-with partial word matching), INCLUDING, EXCLUDING, and FUZZY may be selected for each search condition. In FIG. 12C, a last name 422 is entered in Japanese.

In the case of entering a test search condition, the user presses a next page display (NEXT) button 421 on the screen 420. When the NEXT button 421 is pressed on the screen 420, the system initial setting function 202 displays a screen 430 (FIG. 12D) on the operations panel 120. The screen 430 is configured so that the search options 1 through 3 may be entered. Further, the screen 430 is also configured so that match conditions such as MATCH, FORWARD MATCH, BACKWARD MATCH, INCLUDING, EXCLUDING, and FUZZY may be selected. Further, the user may return to the screen 420 of FIG. 12C by pressing a previous page display (PREV.) button 431 on the screen 430.

When the OK button or the CANCEL button is pressed on the screen 420 or 430, the system initial setting function 202 displays the screen 410 of FIG. 12B on the operations panel 120. When the OK button or the CANCEL button is pressed on the screen 400 or 410, the system initial setting function 202 displays the screen 320 of FIG. 11C on the operations panel 120.

Figures 11C, 11D:
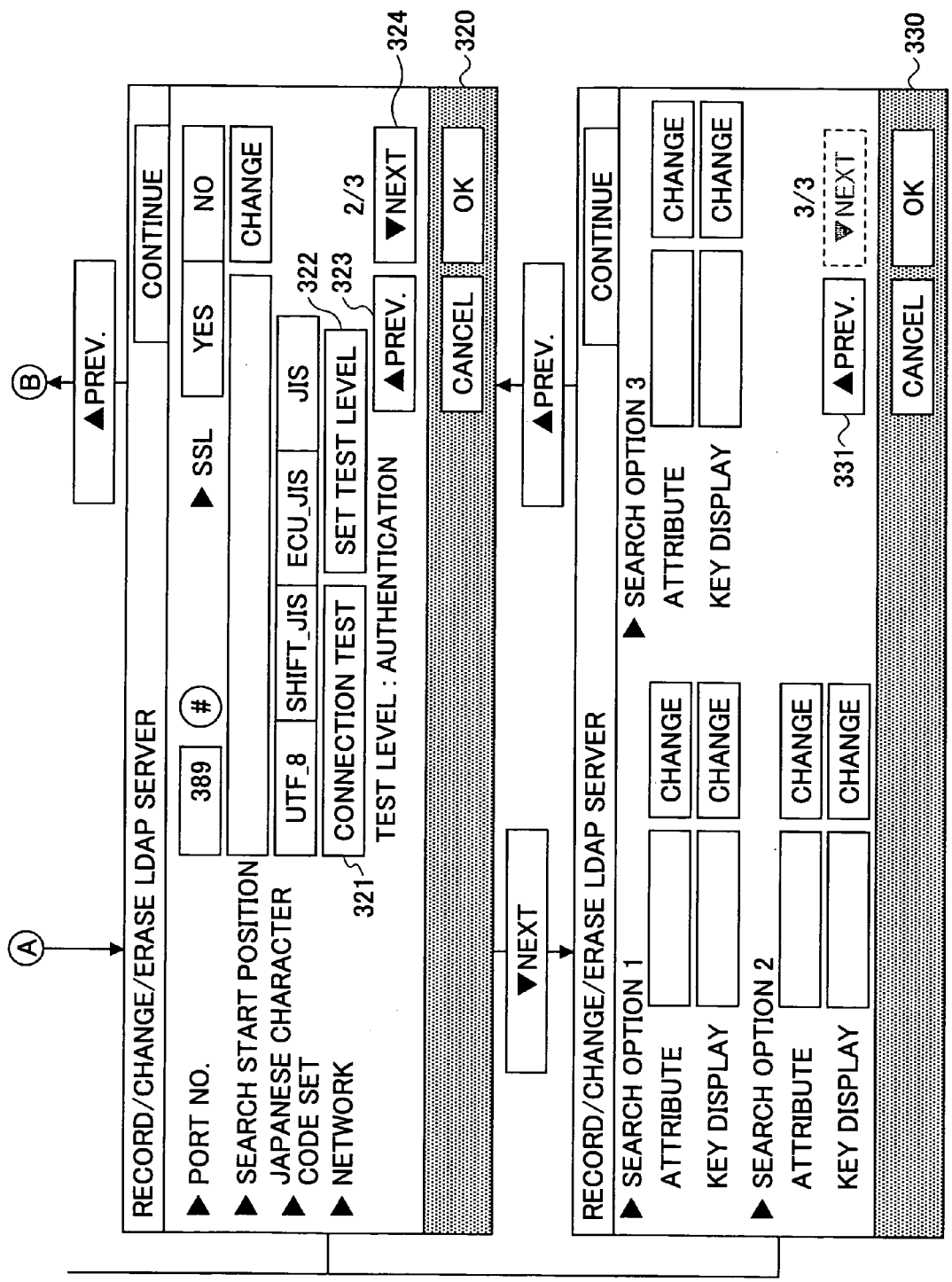

When the OK button is pressed on the screen 400 or 410, the system initial setting function 202 records the connection test level entered on the screen(s) 400, 410, 420, and/or 430, and thereafter, displays the screen 320 of FIG. 11C on the operations panel 120. On the other hand, when the CANCEL button is pressed on the screen 400 or 410, the system initial setting function 202 displays the operations panel 120 on the screen 320 without recording the entered connection test level.

Thus, the multi-function apparatus 31 is configured so that a connection test item for which a connection test is to be conducted is selectable. Accordingly, the multi-function apparatus 31 can arbitrarily set the test level of a connection test. The screens 400, 410, 420, and 430 of FIGS. 12A through 12D allow the user to perform detailed selection of the connection test items. Alternatively, one or more connection test items may be divided into a plurality of levels of predetermined stages so that the user may select one of the levels. In this case, the user can set a desired connection test level by selecting one of the levels. Further, the default values of the connection test items may be pre-selected. In this case, the user does not have to enter the test level of a connection test. When the user presses the CONNECTION TEST button 321 on the screen 320 of FIG. 11C, the system initial setting function 202 conducts a connection test based on the selected connection test item(s).

Next, an expatiation is given of processing in the case of conducting a connection test with a single connection test item being selected. Processing in the case of conducting a connection test with a plurality of connection test items being selected can be performed by combining processing in the case of conducting a connection test with a selected connection test item and processing in the case of conducting a connection test with another selected connection test item.

Figure 13:
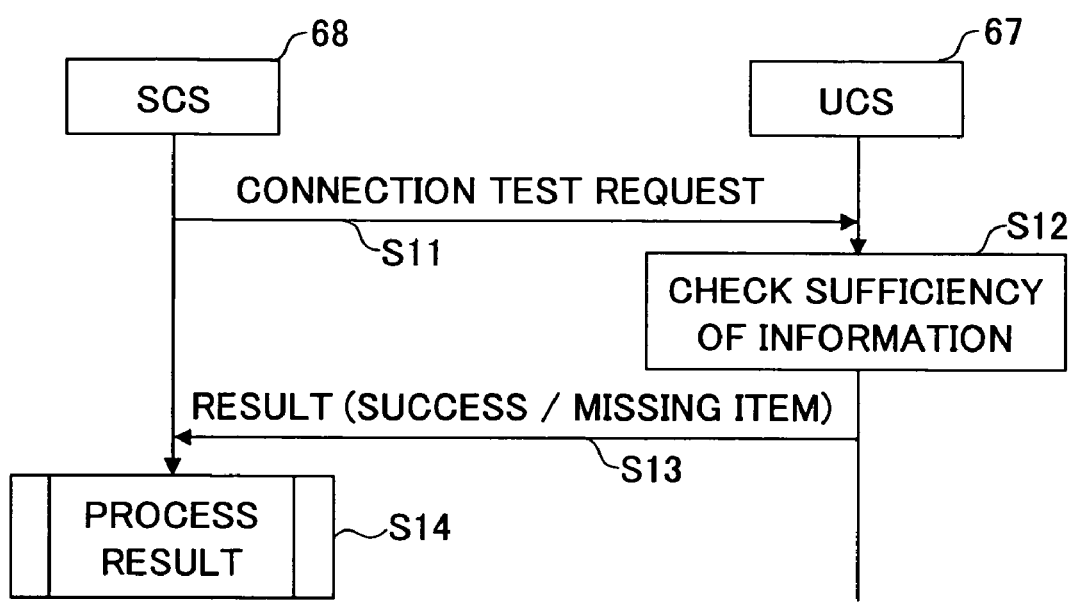
FIG. 13 is a sequence diagram showing processing in the case of conducting a connection test with a connection test item "ENTERED ITEM" being selected according to the first embodiment of the present invention.

FIG. 13 is a sequence diagram showing processing in the case of conducting a connection test with the connection test item "ENTERED ITEM" being selected. When the user presses the CONNECTION TEST button 321 on the screen 320 of FIG. 1C, in step S11, the system initial setting function 202 of the SCS 68 makes a connection test request with respect to the connection test item "ENTERED ITEM" to the UCS 67.

In step S12, the UCS 67 checks the sufficiency of entered LDAP server information items (such as those on the screens 310, 320, and/or 330). Then, in step S13, the UCS 67 supplies the result of the connection test to the system initial setting function 202 of the SCS 68.

Specifically, if the entered LDAP server information items are sufficient, the UCS 67 notifies the system initial setting function 202 of the success of the connection test. On the other hand, if the entered LDAP server information items are lacking in some necessary item, the UCS 67 notifies the system initial setting function 202 of the missing LDAP server information item. Receiving the result of the connection test from the UCS 67, the system initial setting function 202 proceeds to step S14, where the system initial setting function 202 processes the result of the connection test as shown in FIG. 14.

Figure 14:
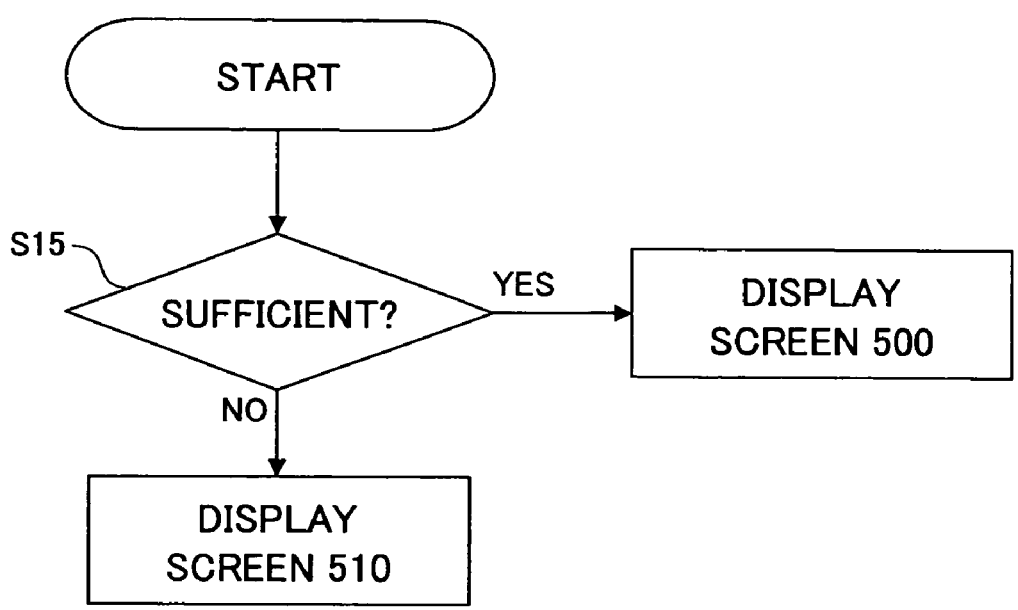
FIG. 14 is a flowchart of the operation of processing the result of the connection test conducted with the connection test item "ENTERED ITEM" being selected according to the first embodiment of the present invention.

FIG. 14 is a flowchart of the operation of processing the result of the connection test conducted with the connection test item "ENTERED ITEM" being selected. In step S15 of FIG. 14, the system initial setting function 202 determines whether the entered LDAP server information items are sufficient.

Figure 15:
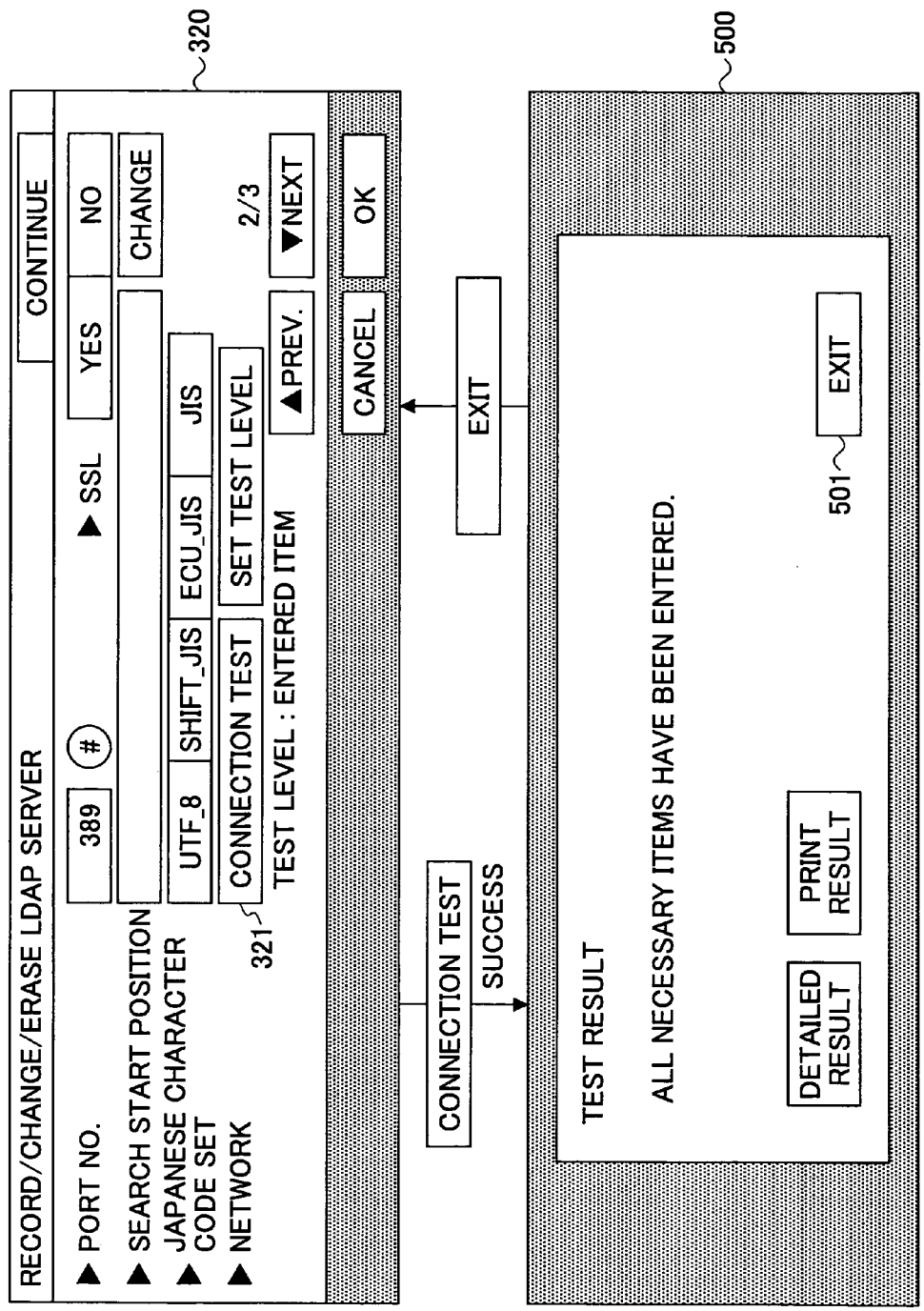
FIG. 15 is an image diagram for illustrating a screen displayed on an operations panel in the case of conducting the connection test with the connection test item "ENTERED ITEM" being selected according to the first embodiment of the present invention.

If the entered LDAP server information items are sufficient (that is, "YES" in step S15), the system initial setting function 202 displays a screen 500 (FIG. 15) on the operations panel 120. The screen 500 includes a message indicating that the entered LDAP server information items are sufficient, such as "ALL NECESSARY ITEMS HAVE BEEN ENTERED." The user can return to the screen 320 of FIG. 11C by pressing an EXIT button 501 on the screen 500 as shown in FIG. 15.

Figure 16:
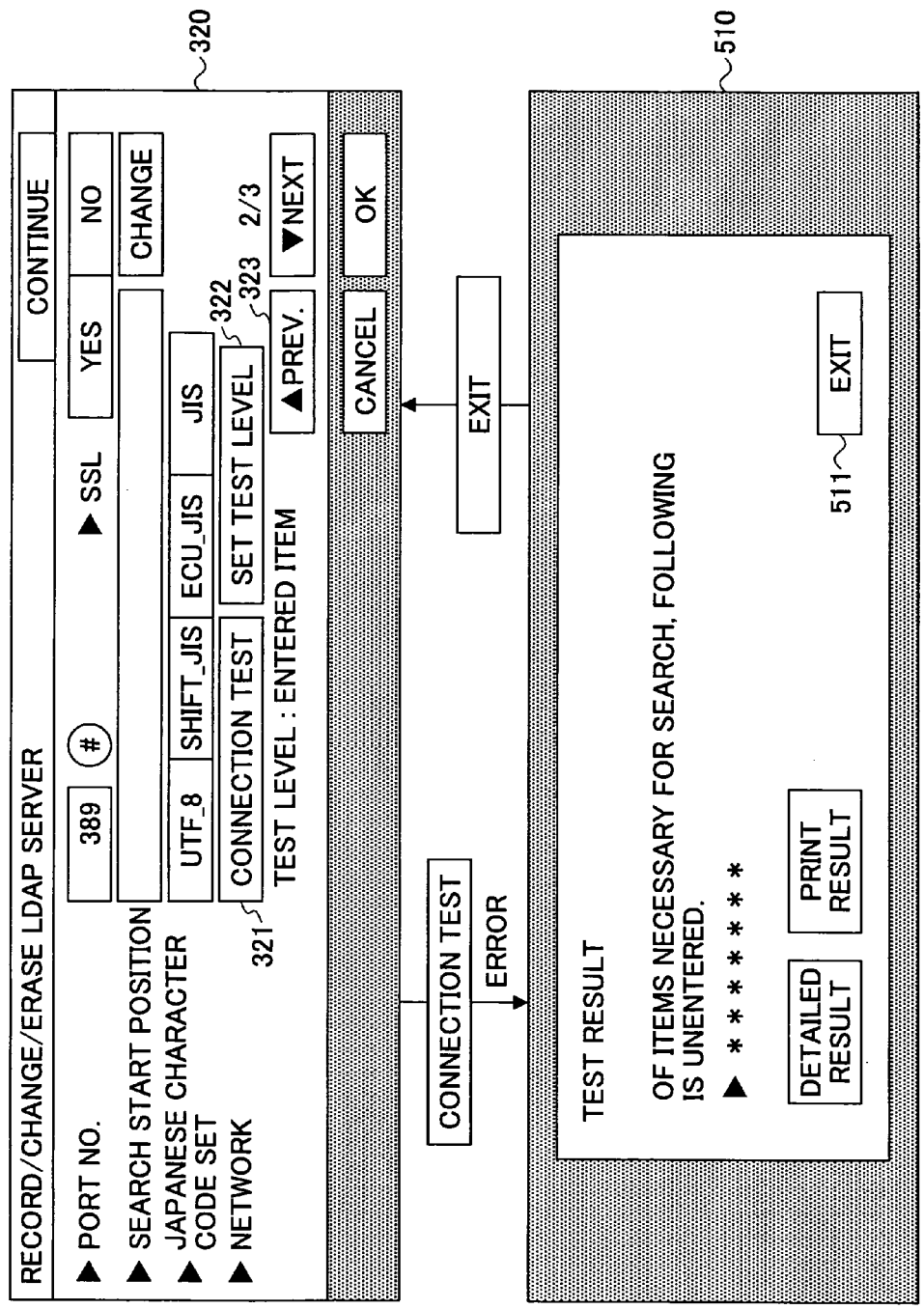
FIG. 16 is an image diagram for illustrating a screen displayed on the operations panel in the case of conducting the connection test with the connection test item "ENTERED ITEM" being selected according to the first embodiment of the present invention.

On the other hand, if the entered LDAP server information items are lacking in some necessary item (that is, "NO" in step S15), the system initial setting function 202 displays a screen 510 (FIG. 16) on the operations panel 120. The screen 510 includes a message indicating a necessary item to be entered that is not included in the entered LDAP server information items, such as "OF ITEMS NECESSARY FOR SEARCH, PORT NUMBER IS UNENTERED." In the screen 510 of FIG. 16, the missing (necessary) item to be entered is displayed in the part of *******. The user can return to the screen 320 by pressing an EXIT button 511 on the screen 510 as shown in FIG. 16.

Figure 17:
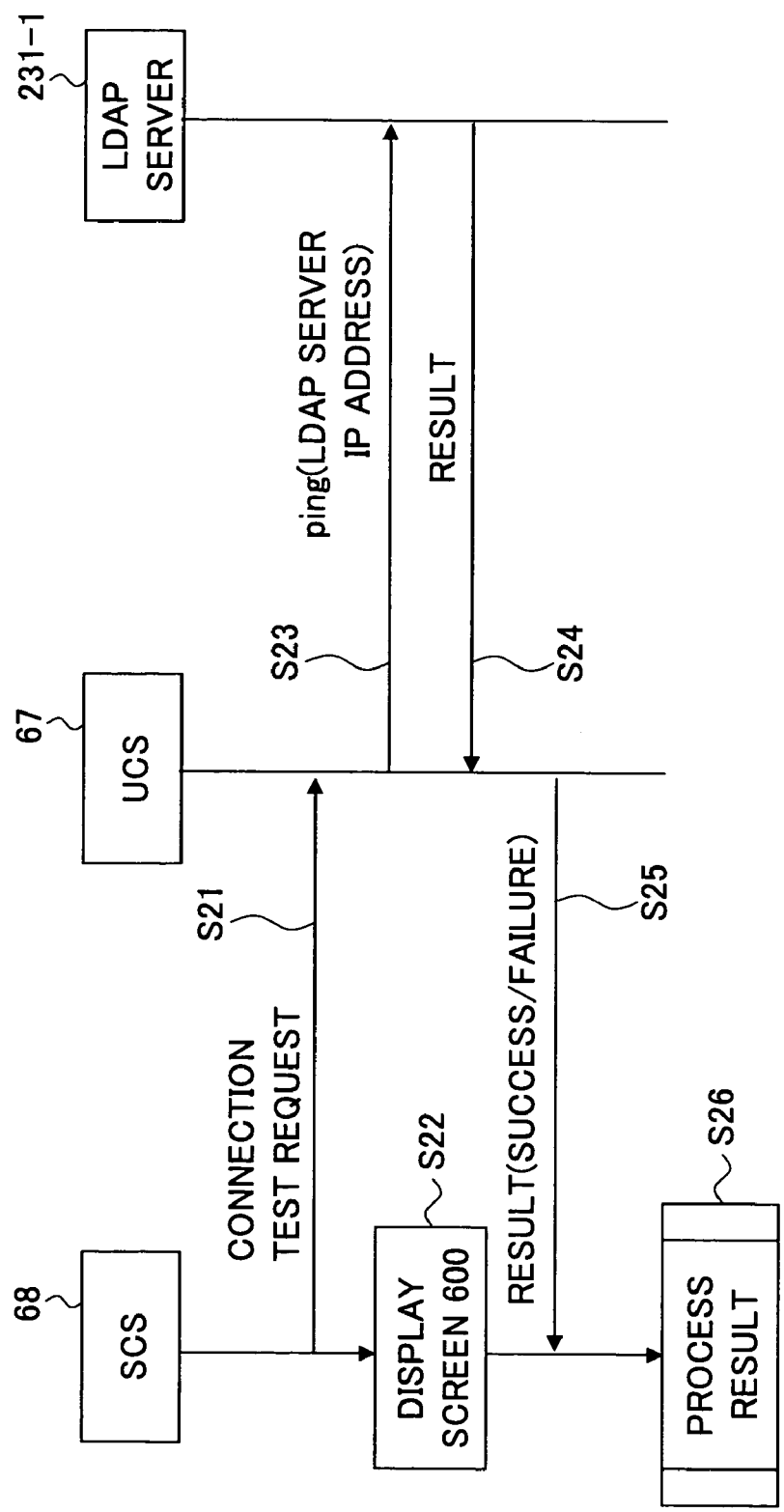
FIG. 17 is a sequence diagram showing processing in the case of conducting a connection test with a connection test item "SERVER STATE" being selected according to the first embodiment of the present invention.

FIG. 17 is a sequence diagram showing processing in the case of conducting a connection test with the connection test item "SERVER STATE" being selected. When the user presses the CONNECTION TEST button 321 on the screen 320 of FIG. 11C, in step S21, the system initial setting function 202 of the SCS 68 makes a connection test request with respect to the connection test item "SERVER STATE" to the UCS 67.

Next, in step S22, the system initial setting function 202 displays a screen 600 (FIG. 19) on the operations panel 120. The screen 600 includes a message indicating that the connection test is being conducted, such as "NOW TESTING. PLEASE WAIT FOR A MOMENT." The user can cancel the connection test and return to the screen 320 by pressing a CANCEL button 601 on the screen 600.

When receiving the connection test request from the system initial setting function 202, in step S23, the UCS 67 obtains, for instance, an IP address corresponding to, for instance, the LDAP server 231-1 from the LDAP server information included in the connection test request, and executes a ping command to the LDAP server 231-1 corresponding to the IP address. Then, in step S24, the UCS 67 receives the result of the ping command executed in step S23 if the LDAP server 231-1 is running. If the LDAP server 231-1 is not running, the UCS 67 does not receive the result of the ping command.

Next, in step S25, the UCS 67 supplies the result of the connection test to the system initial setting function 202 of the SCS 68. Specifically, if the UCS 67 receives the result of the ping command in step S24, the UCS 67 notifies the system initial setting function 202 of the success of the connection test. If the UCS 67 does not receive the result of the ping command within a predetermined period of time after executing the ping command in step S23, the UCS 67 notifies the system initial setting function 202 of the failure of the connection test.

In step S23 of FIG. 17, the operating state of the LDAP server 231-1 is checked by the ping command. Alternatively, the operating state of the LDAP server 231-1 may be checked using an authentication request for establishing connection based on the LDAP protocol. In this case, in step S24, the UCS 67 receives the result of the authentication request made in step S23. If the LDAP server 231-1 is not running, the UCS 67 does not receive the result of the authentication request.

Next, in step S25, the UCS 67 notifies the system initial setting function 202 of the SCS 68 of the result of the connection test. Specifically, if the UCS 67 receives the result of the authentication request in step S24', the UCS 67 notifies the system initial setting function 202 of the success of the connection test. If the UCS 67 does not receive the result of the authentication request within a predetermined period of time after making the authentication request in step S23, the UCS 67 notifies the system initial setting function 202 of the failure of the connection test.

Figure 18:
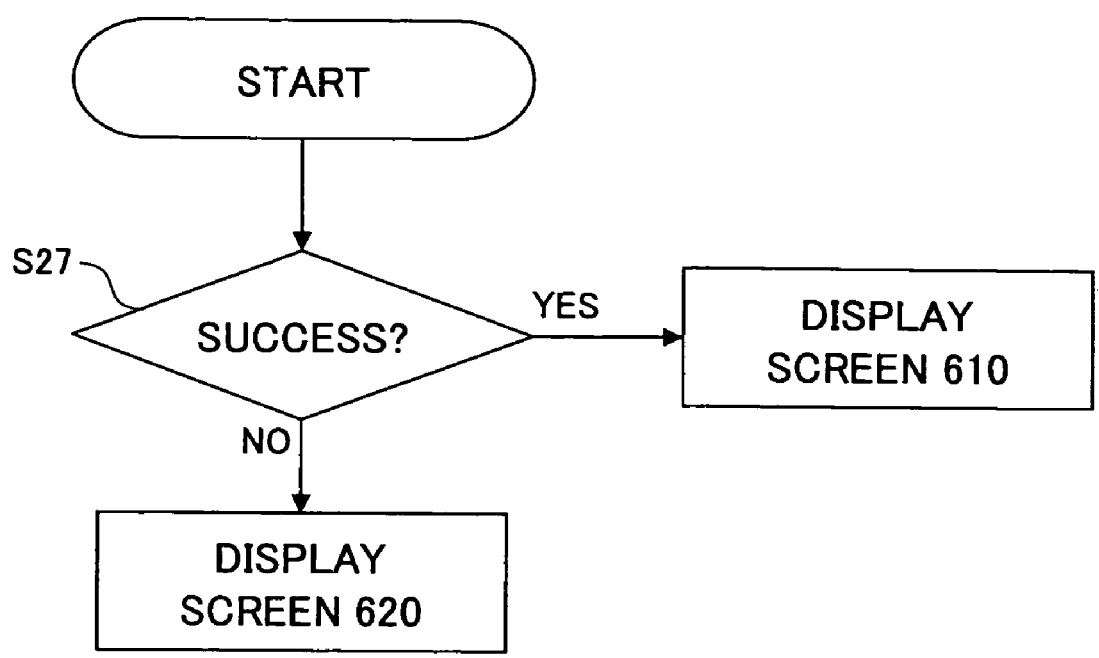
FIG. 18 is a flowchart of the operation of processing the result of the connection test conducted with the connection test item "SERVER STATE" being selected according to the first embodiment of the present invention.

When receiving the result of the connection test from the UCS 67, the system initial setting function 202 proceeds to step S26, where the system initial setting function 202 processes the result of the connection test as shown in FIG. 18. FIG. 18 is a flowchart of the operation of processing the result of the connection test conducted with the connection test item "SERVER STATE" being selected. When receiving the result of the connection test from the UCS 67, in step S27, the system initial setting function 202 determines whether the LDAP server 231-1 is running.

Figure 19:
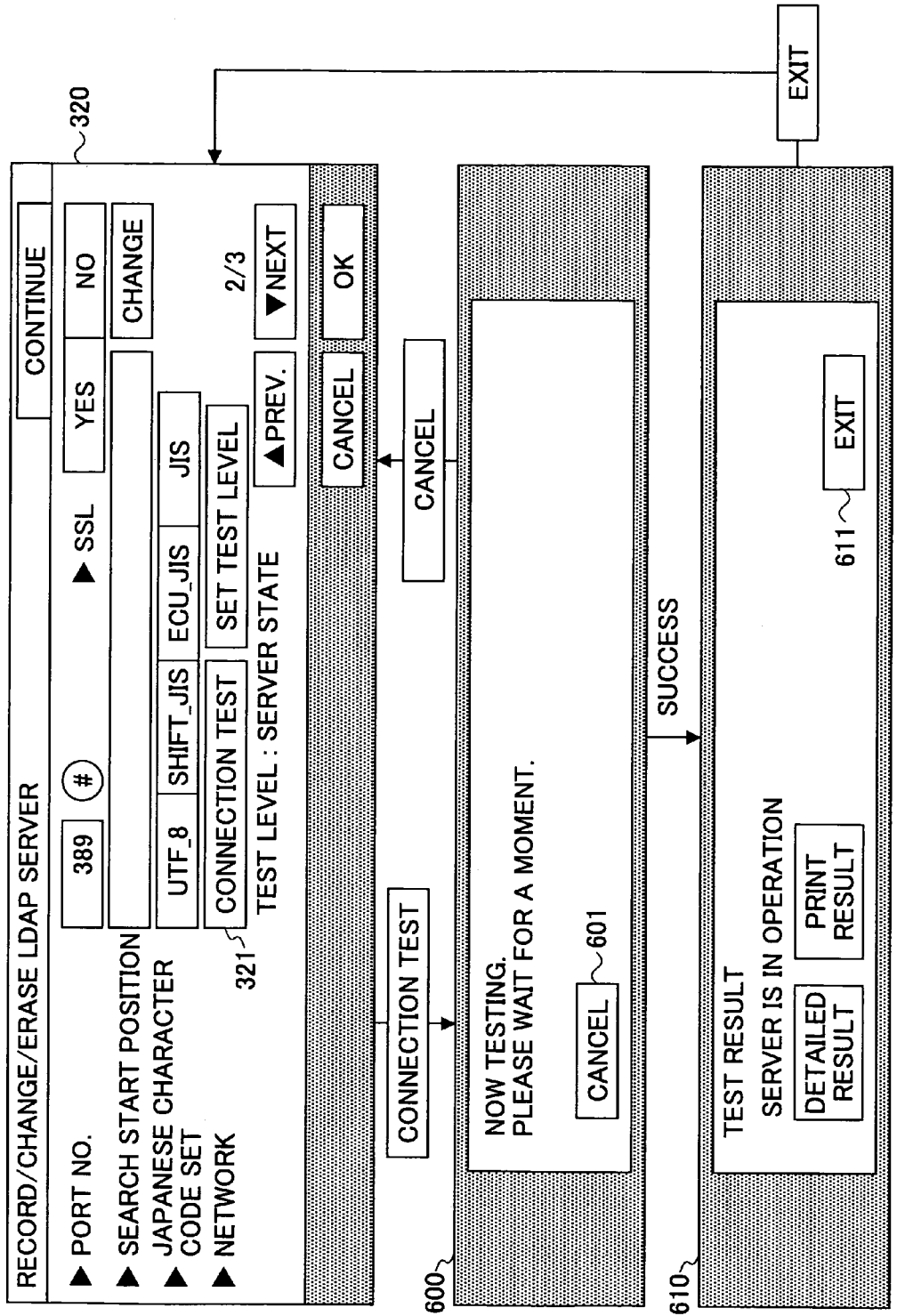
FIG. 19 is an image diagram for illustrating screens displayed on the operations panel in the case of conducting the connection test with the connection test item "SERVER STATE" being selected according to the first embodiment of the present invention.

If the LDAP server 231-1 is running (that is, "YES" in step S27), the system initial setting function 202 displays a screen 610 (FIG. 19) on the operations panel 120. The screen 610 includes a message indicating that the LDAP server 231-1 is running, such as "SERVER IS IN OPERATION." The user can return to the screen 320 by pressing an EXIT button 611 on the screen 610 as shown in FIG. 19.

Figure 20:
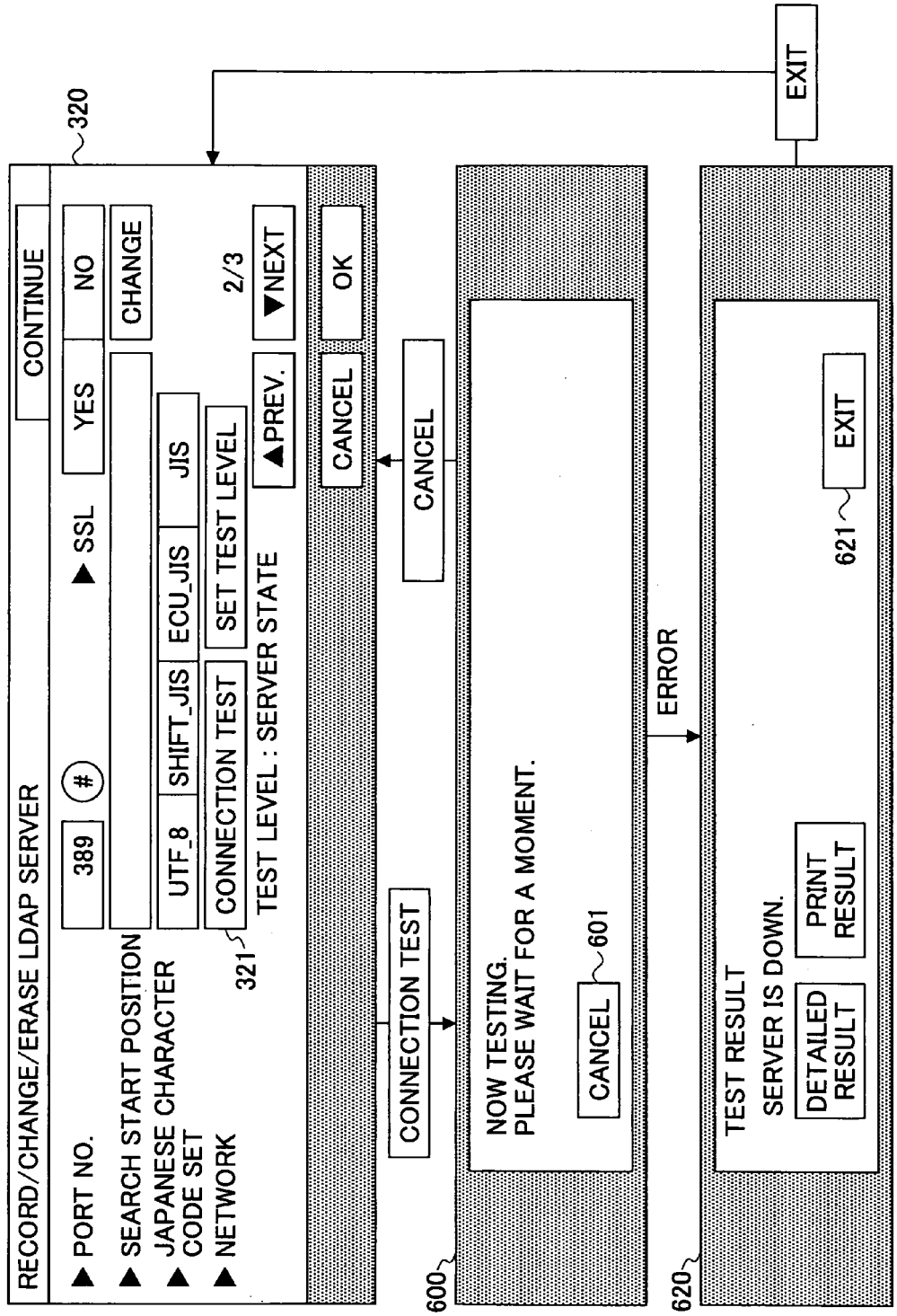
FIG. 20 is an image diagram for illustrating screens displayed on the operations panel in the case of conducting the connection test with the connection test item "SERVER STATE" being selected according to the first embodiment of the present invention.

On the other hand, if the LDAP server 231-1 is not running (that is, "NO" in step S27), the system initial setting function 202 displays a screen 620 (FIG. 20) on the operations panel 120. The screen 620 includes a message indicating that the LDAP server 231-1 is not running, such as "SERVER IS DOWN." The user can return to the screen 320 by pressing an EXIT button 621 on the screen 620 as shown in FIG. 20.

Figure 21:
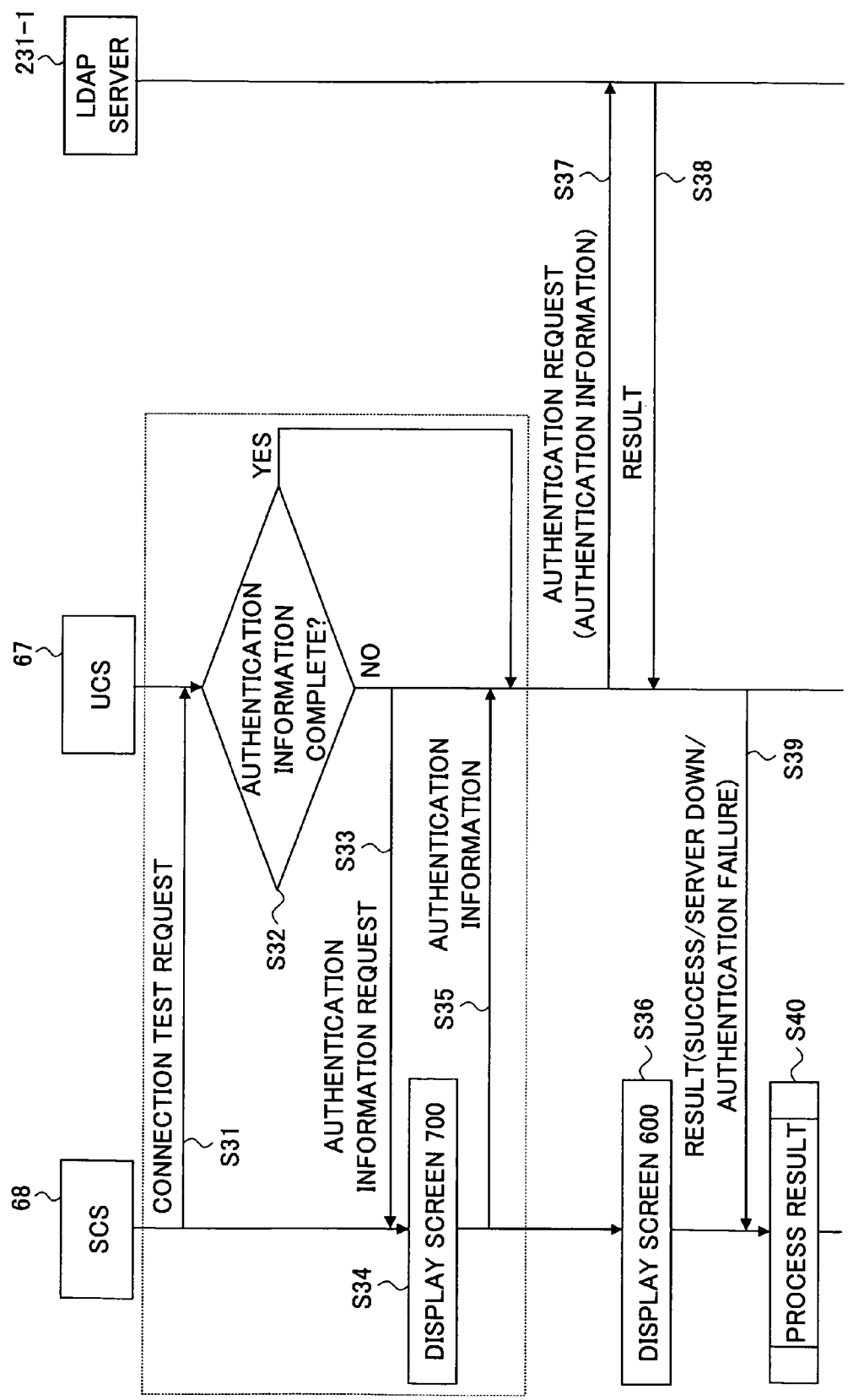
FIG. 21 is a sequence diagram showing processing in the case of conducting a connection test with a connection test item "AUTHENTICATION" being selected according to the first embodiment of the present invention.

FIG. 21 is a sequence diagram showing processing in the case of conducting a connection test with the connection test item "AUTHENTICATION" being selected. When the user presses the CONNECTION TEST button 321 on the screen 320 of FIG. 11C, in step S31, the system initial setting function 202 of the SCS 68 makes a connection test request with respect to the connection test item "AUTHENTICATION" to the UCS 67.

Next, in step S32, the UCS 67 determines whether authentication information necessary for the connection test request is complete by checking the LDAP server information included in the connection test request. If the authentication information necessary for the connection test request is incomplete (that is, "NO" in step S32), in step S33, the UCS 67 makes a request for (missing) authentication information (an authentication information request) to the system initial setting function 202 of the SCS 68. Receiving the authentication information request from the UCS 67, in step S34, the system initial setting function 202 displays a screen 700 (FIG. 23) on the operations panel 120. The screen 700 is configured so that authentication information composed of a username and a password may be entered.

Figure 23:
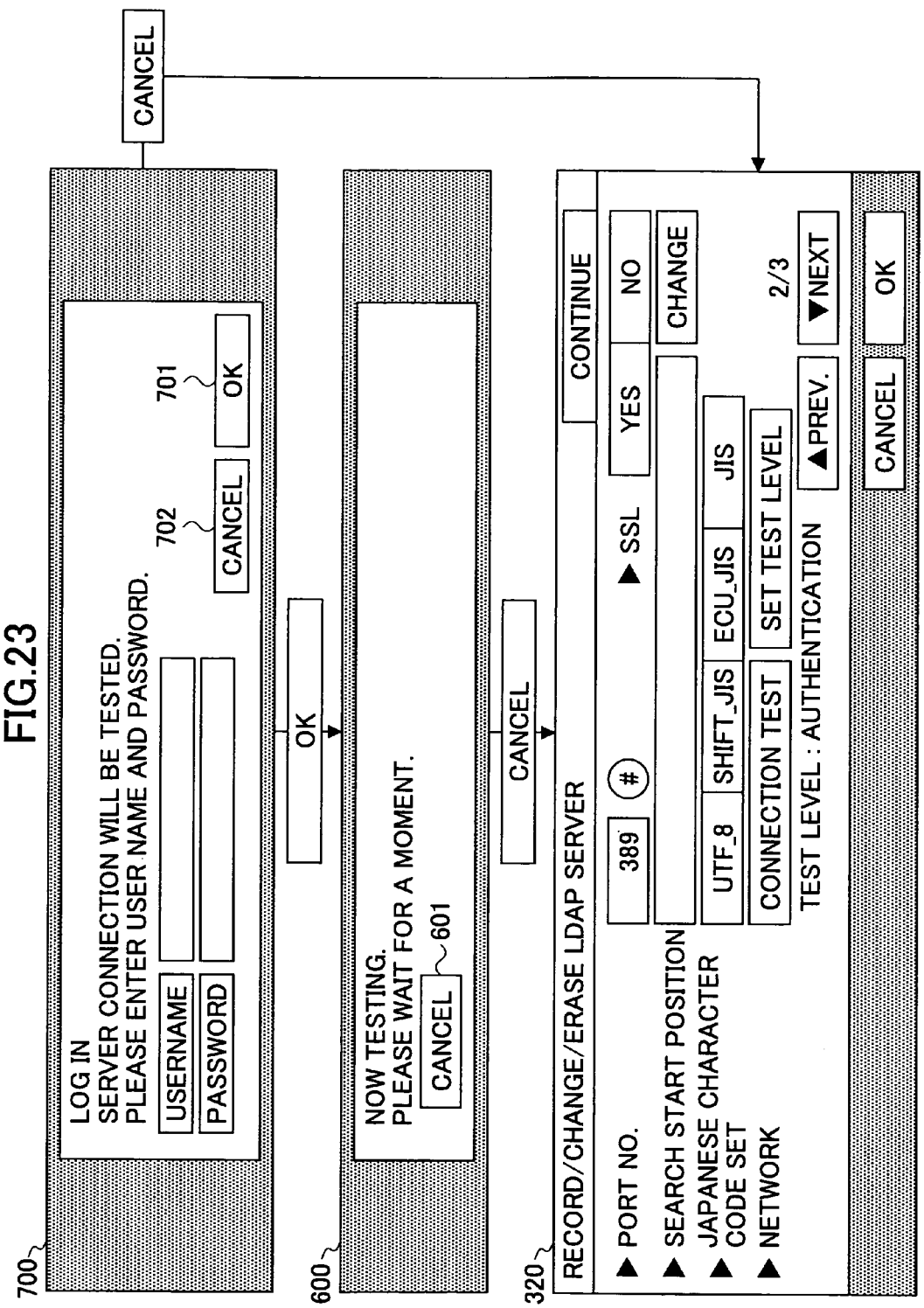
FIG. 23 is an image diagram for illustrating screens displayed on the operations panel in the case of conducting the connection test with the connection test item "AUTHENTICATION" being selected according to the first embodiment of the present invention.

When the user enters a username and a password and presses an OK button 701 on the screen 700, in step S35, the system initial setting function 202 transmits the authentication information entered on the screen 700 to the UCS 67. The user can return to the screen 320 by pressing a CANCEL button 702 on the screen 700 as shown in FIG. 23.

Then, in step S36, the system initial setting function 202 displays the screen 600 of FIG. 19 on the operations panel 120. The screen 600 includes a message indicating that the connection test is being conducted. If the authentication information necessary for the connection test request is complete (that is, "YES" in step S32), the system initial setting function 202 displays the screen 600 on the operations panel 120 based on an instruction from the UCS 67. The user can cancel the connection test and return to the screen 320 by pressing the CANCEL button 601 on the screen 600.

Next, in step S37, the UCS 67 makes an authentication request using the authentication information to the LDAP server 231-1. Then, in step S38, the UCS 67 receives the result of the authentication request made in step S37. For instance, as an authentication request corresponding to entries, the UCS 67 may execute a command such as ldap_bind, ldap_bind_s, ldap_sasl_bind, ldap_sasl_bind_s, ldap_simple_bind, ldap_simple_bind_s, ldap_kerberos_bind, or ldap_kerberos_bind_s, and may determine whether the authentication information includes an error based on a return value from the LDAP server 231-1.

Next, in step S39, the UCS 67 supplies the result of the connection test to the system initial setting function 202 of the SCS 68. Specifically, if the UCS 67 determines in step S38 that the authentication information includes no error, the UCS 67 notifies the system initial setting function 202 of the success of the authentication. If the UCS 67 determines in step S38 that the authentication information includes an error, the UCS 67 notifies the system initial setting function 202 of the failure of the authentication. Further, if the UCS 67 does not receive the result of the authentication request within a predetermined period of time after making the authentication request in step S37, the UCS 67 notifies the system initial setting function 202 that the LDAP server 231-1 is not running.

Figure 22:
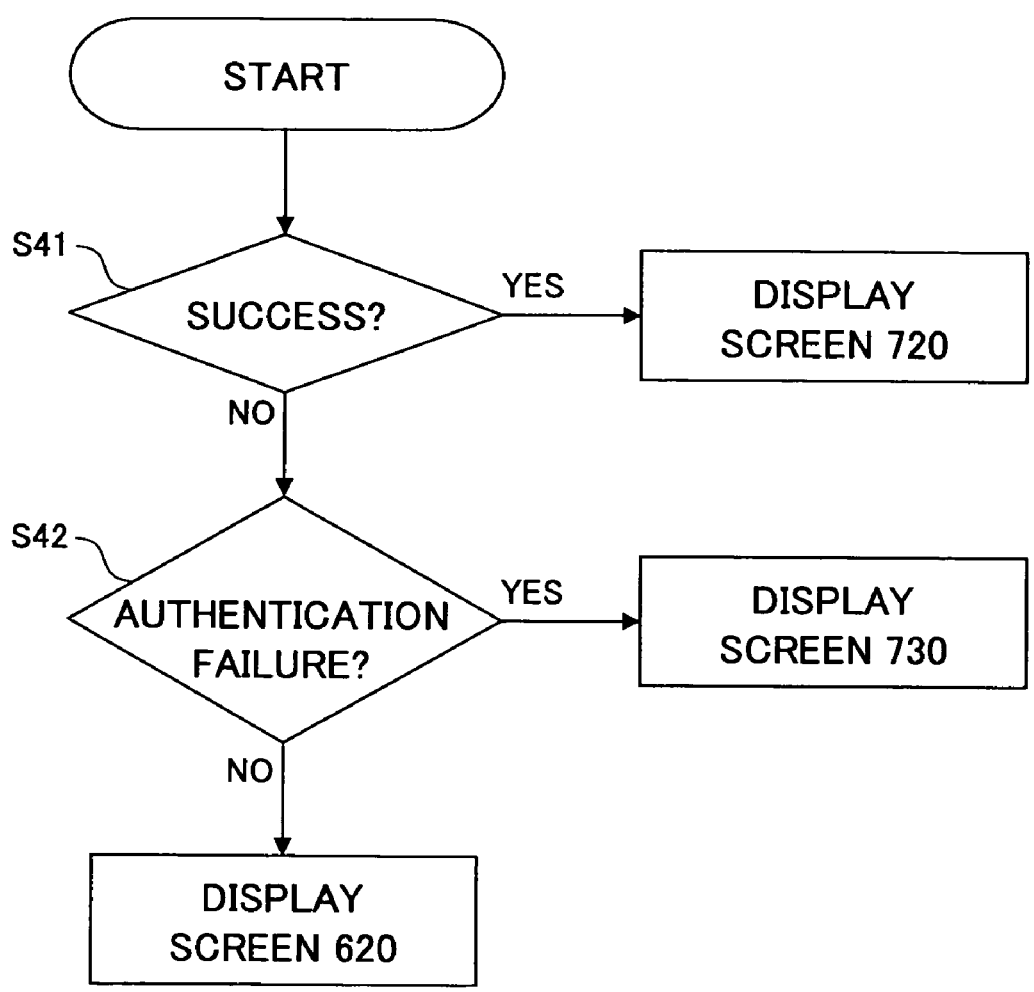
FIG. 22 is a flowchart of the operation of processing the result of the connection test conducted with the connection test item "AUTHENTICATION" being selected according to the first embodiment of the present invention.

Receiving the result of the connection test from the UCS 67, the system initial setting function 202 proceeds to step S40, where the system initial setting function 202 processes the result of the connection test as shown in FIG. 22. FIG. 22 is a flowchart of the operation of processing the result of the connection test conducted with the connection test item "AUTHENTICATION" being selected. Receiving the result of the connection test from the UCS 67, in step S41, the system initial setting function 202 determines whether the authentication by the LDAP server 231-1 has succeeded.

Figure 24:
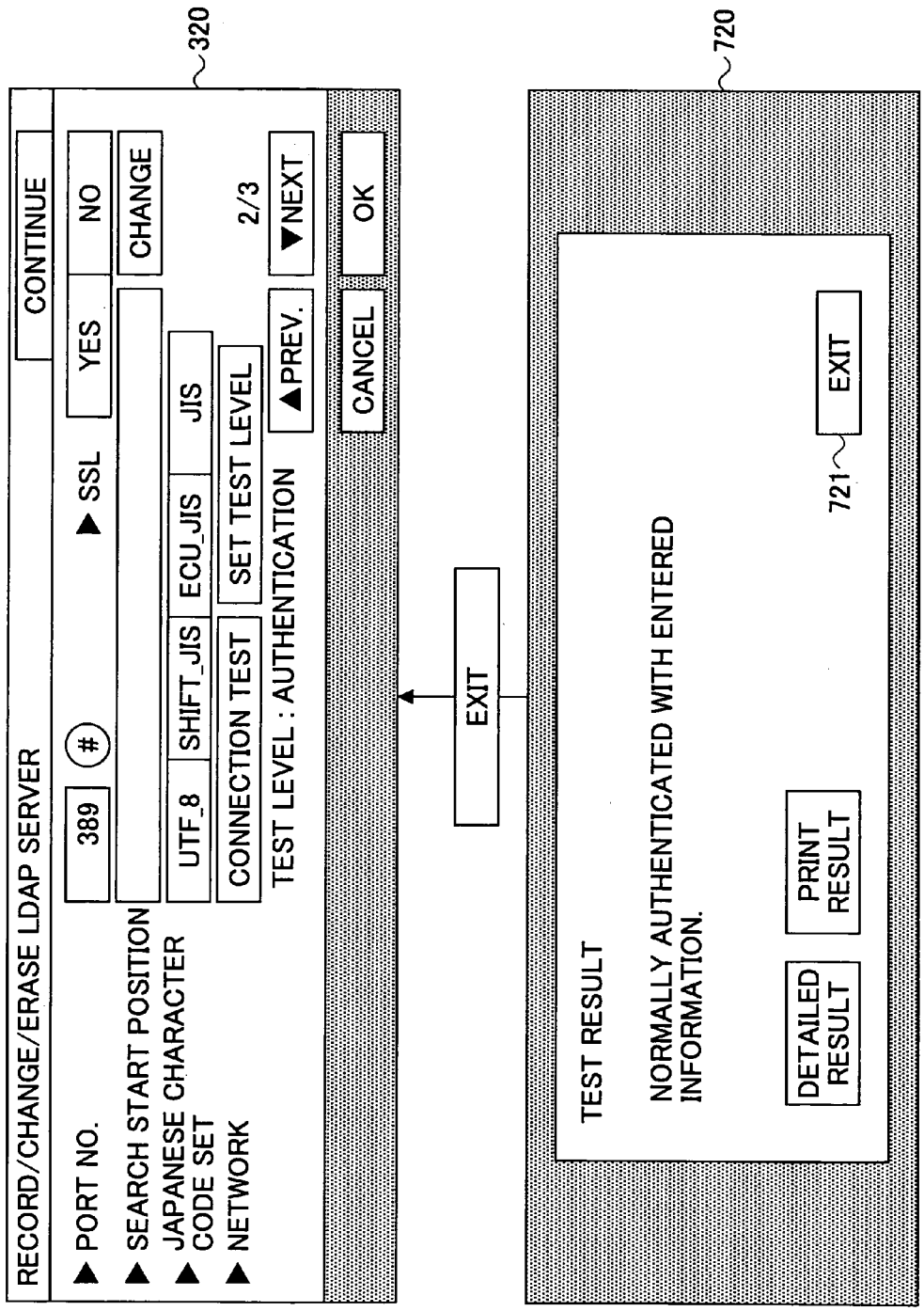
FIG. 24 is an image diagram for illustrating a screen displayed on the operations panel in the case of conducting the connection test with the connection test item "AUTHENTICATION" being selected according to the first embodiment of the present invention.

If the authentication by the LDAP server 231-1 has succeeded (that is, "YES" in step S41), the system initial setting function 202 displays a screen 720 (FIG. 24) on the operations panel 120. The screen 720 includes a message indicating the success of the authentication, such as "NORMALLY AUTHENTICATED WITH ENTERED INFORMATION." The user can return to the screen 320 by pressing an EXIT button 721 on the screen 720 as shown in FIG. 24.

If the authentication by the LDAP server 231-1 has not succeeded (that is, "NO" in step S41), in step S42, the system initial setting function 202 determines whether the authentication by the LDAP server 231-1 has failed.

Figure 25:
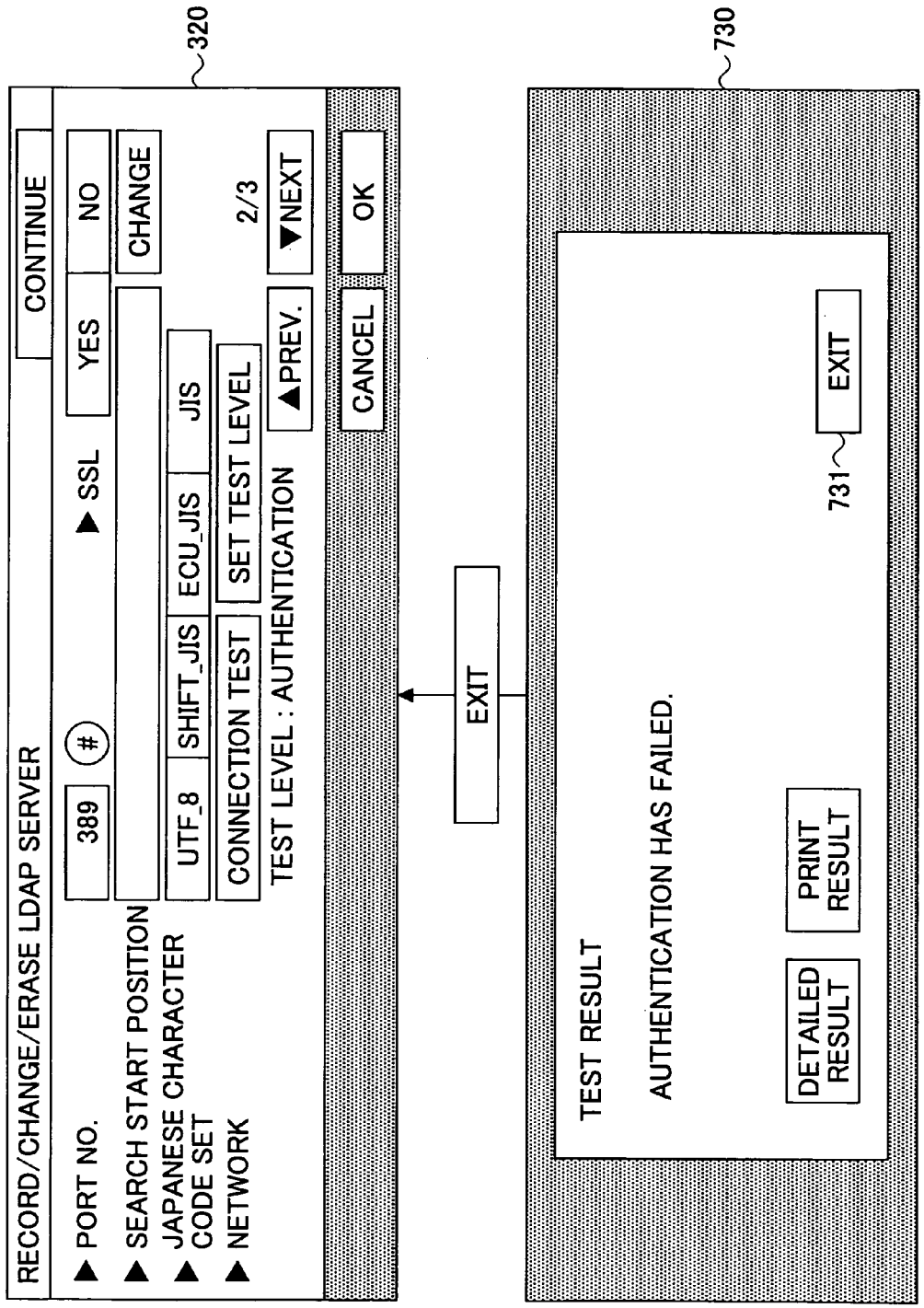
FIG. 25 is an image diagram for illustrating a screen displayed on the operations panel in the case of conducting the connection test with the connection test item "AUTHENTICATION" being selected according to the first embodiment of the present invention.

If the authentication by the LDAP server 231-1 has failed (that is, "YES" in step S42), the system initial setting function 202 displays a screen 730 (FIG. 25) on the operations panel 120. The screen 730 includes a message indicating that the authentication has failed, such as "AUTHENTICATION HAS FAILED." The user can return to the screen 320 by pressing an EXIT button 731 on the screen 730 as shown in FIG. 25.

If the authentication by the LDAP server 231-1 has not failed (that is, "NO" in step S42), the system initial setting function 202 displays on the operations panel 120 the above-described screen 620 (FIG. 20) indicating that the LDAP server 231-1 is not running. In the following description, the operations of steps S31 through S35 of the sequence diagram of FIG. 21 are referred to as an authentication information checking operation.

Figure 26:
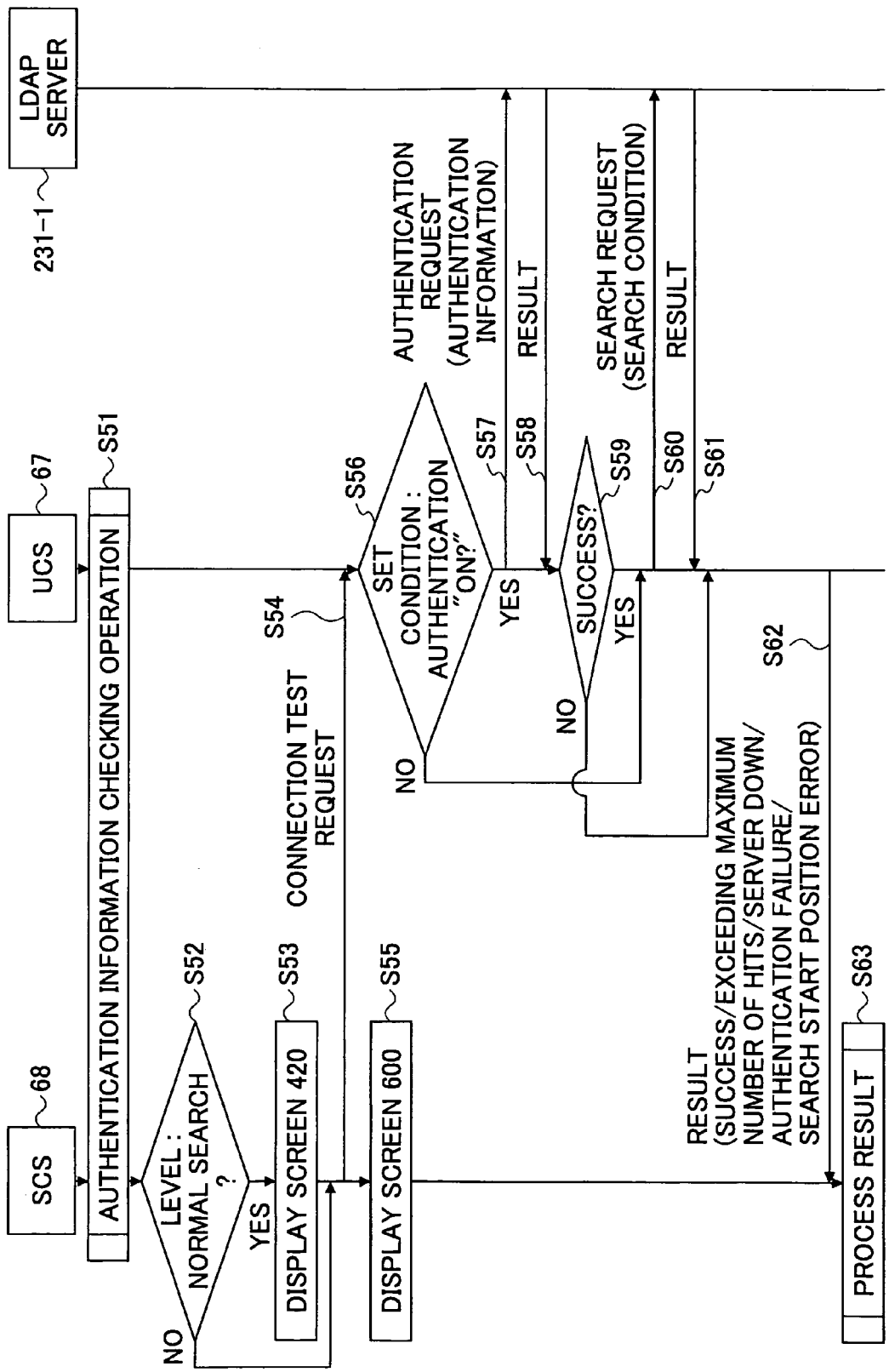
FIG. 26 is a sequence diagram showing an operation in the case of conducting a connection test with one of connection test items "QUICK SEARCH," "TEST CONDITION SEARCH," and "NORMAL SEARCH" being selected according to the first embodiment of the present invention.

FIG. 26 is a sequence diagram showing an operation in the case of conducting a connection test with one of the connection test items "QUICK SEARCH," "TEST CONDITION SEARCH," and "NORMAL SEARCH" being selected. When the user presses the CONNECTION TEST button 321 on the screen 320 of FIG. 1C, in step S51, the system initial setting function 202 of the SCS 68 and the UCS 67 perform the same authentication information checking operation as steps S31 through S35 of FIG. 21.

Next, in step S52, the system initial setting function 202 determines whether the connection test item "NORMAL SEARCH" is selected. If the connection test item "NORMAL SEARCH" is selected (that is, "YES" in step S52), in step S53, the system initial setting function 202 displays on the operations panel 120 the above-described screen 420 (FIG. 12C) for entering a search condition and selecting a match condition for the search condition.

When the user presses the OK button after entering a search condition (search conditions) and selecting a match condition for the (each) search condition on the screen 420, in step S54, the system initial setting function 202 makes a connection test request with respect to searching to the UCS 67. If the connection test item "NORMAL SEARCH" is not selected (that is, "NO" in step S52), in step S54, the system initial setting function 202 makes a connection test request with respect to searching to the UCS 67. Then, in step S55, the system initial setting function 202 displays on the operations panel 120 the above-described screen 600 (FIG. 19) indicating that the connection test is being conducted.

Receiving the connection test request from the system initial setting function 202, in step S56, the UCS 67 determines, by checking the LDAP server information included in the connection test request, whether the authentication information entered from the screen 310 (FIG. 11B) is "ON," indicating that an authentication request is to be made.

If the authentication information is "ON" (that is, "YES" in step S56), the UCS 67 proceeds to step S57. The operations of steps S57 and S58 are equal to those of steps S37 and S38 of FIG. 21, and a description thereof is omitted.

Receiving the result of the authentication request from the LDAP server 231-1, in step S59, the UCS 67 determines whether the authentication by the LDAP server 231-1 has succeeded. If the authentication has succeeded (that is, "YES" in step S59), in step S60, the UCS 67 makes a search request using the search condition(s) included in the connection test request to the LDAP server 231-1. If the authentication information is not "ON" (that is, "NO" in step S56), the UCS 67 proceeds to step S60. Then, in step S61, the UCS 67 receives the result of the search request made in step S60. Next, in step S62, the UCS 67 supplies the result of the connection test to the system initial setting function 202 of the SCS 68.

Specifically, if the UCS 67 determines in step S61 that the search has succeeded, the UCS 67 notifies the system initial setting function 202 of the result of the search. If the UCS 67 determines in step S61 that the search has failed for exceeding the maximum number of hits (the number of retrievals of the search exceeding a maximum number), the UCS 67 notifies the system initial setting function 202 that the search has failed due to exceeding the maximum number of hits. If the UCS 67 determines that the search has failed due to a search start position error, the UCS 67 notifies the system initial setting function 202 that the search has failed due to a search start position error.

If the authentication has not succeeded (that is, "NO" in step S59), the UCS 67 proceeds to step S62. If the UCS 67 determines in step S58 that the authentication information includes an error, the UCS 67 notifies the system initial setting function 202 of the failure of the authentication. If the UCS 67 does not receive the result of the authentication request within a predetermined period of time after making the authentication request in step S57, the UCS 67 notifies the system initial setting function 202 that the LDAP server 231-1 is not running. Receiving the result of the connection test from the UCS 67, the system initial setting function 202 proceeds to step S63, where the system initial setting function 202 processes the result of the connection test as shown in FIG. 27.

Figure 27:
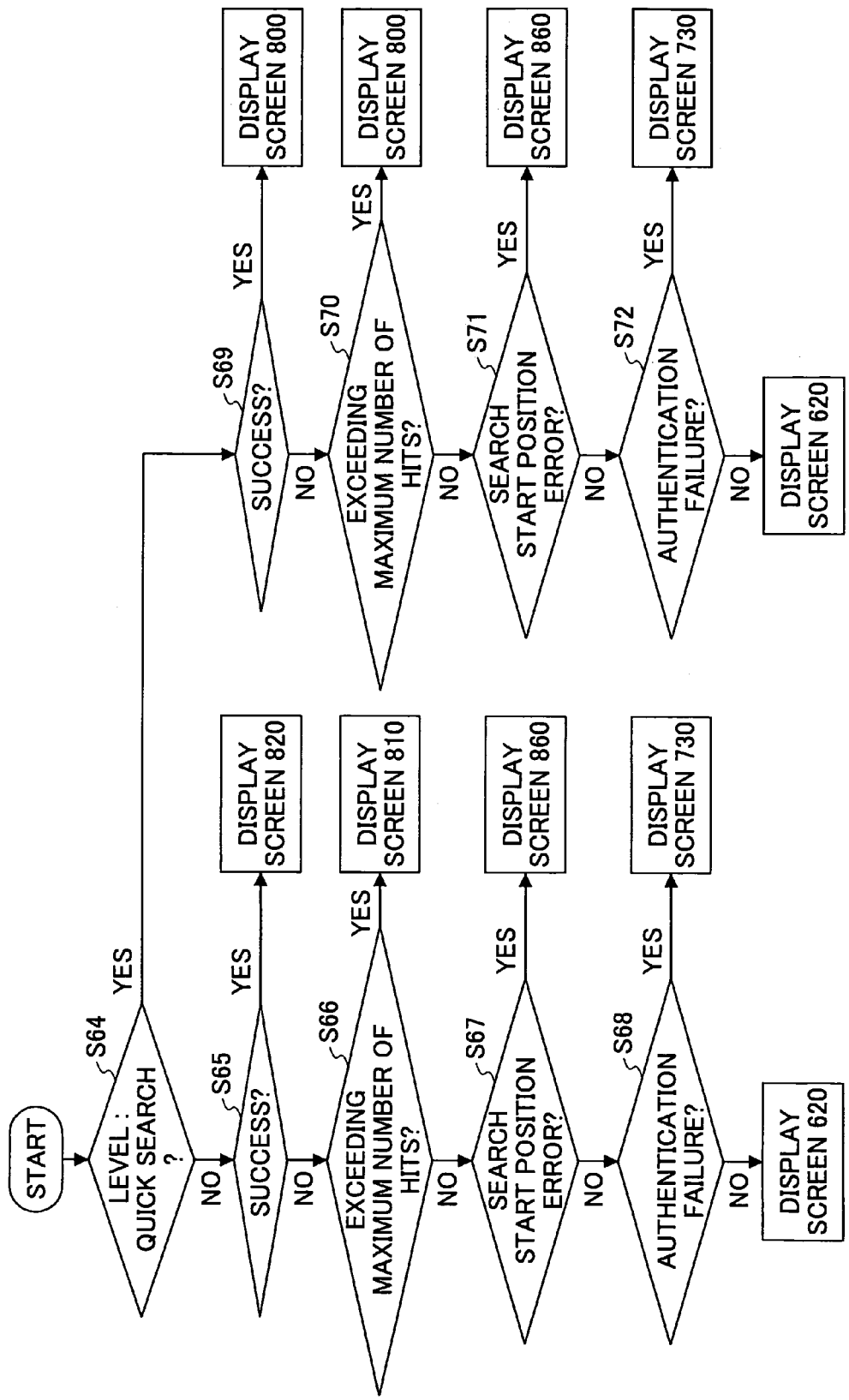
FIG. 27 is a flowchart of the operation of processing the result of the connection test conducted with one of the connection test items "QUICK SEARCH," "TEST CONDITION SEARCH," and "NORMAL SEARCH" being selected according to the first embodiment of the present invention.

FIG. 27 is a flowchart of the operation of processing the result of the connection test conducted with one of the connection test items "QUICK SEARCH," "TEST CONDITION SEARCH," and "NORMAL SEARCH" being selected.

Receiving the result of the connection test from the UCS 67, in step S64, the system initial setting function 202 determines whether the connection test item "QUICK SEARCH" is selected. If the connection test item "QUICK SEARCH" is selected (that is, "YES" in step S64), the system initial setting function 202 proceeds to step S69.

Figure 28:
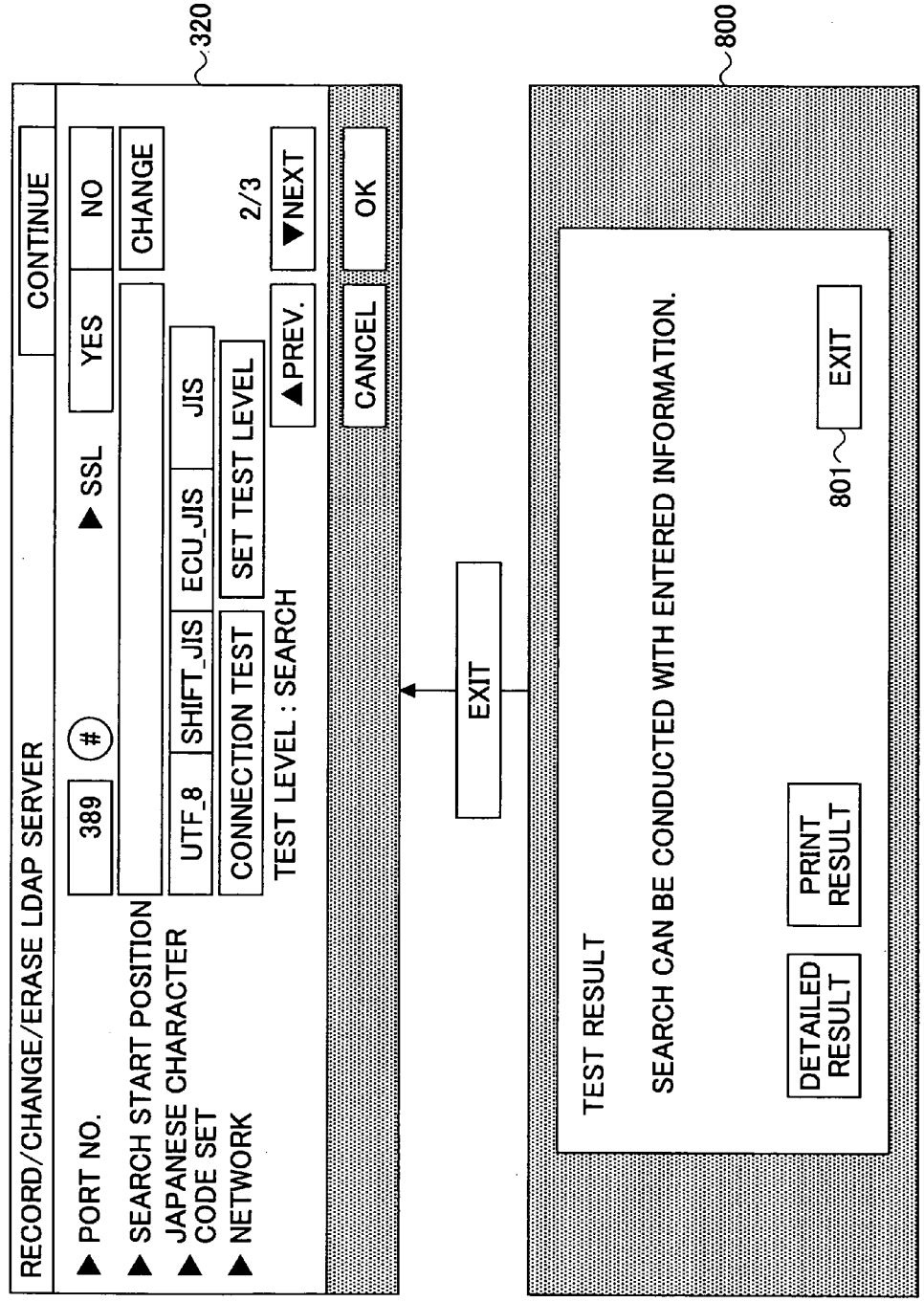
FIG. 28 is an image diagram for illustrating a screen displayed on the operations panel in the case of conducting the connection test with one of the connection test items "QUICK SEARCH," "TEST CONDITION SEARCH," and "NORMAL SEARCH" being selected according to the first embodiment of the present invention.

In step S69, the system initial setting function 202 determines whether the search has succeeded. If the search has succeeded (that is, "YES" in step S69), the system initial setting function 202 displays a screen 800 (FIG. 28) on the operations panel 120. The screen 800 includes a message indicating the success of the search, such as "SEARCH CAN BE CONDUCTED WITH ENTERED INFORMATION." The user can return to the screen 320 by pressing an EXIT button 801 on the screen 800 as shown in FIG. 28.

If the search has not succeeded (that is, "NO" in step S69), in step S70, the system initial setting function 202 determines whether the search has failed due to exceeding the maximum number of hits.

If the search has failed due to exceeding the maximum number of hits (that is, "YES" in step S70), the system initial setting function 202 displays the above-described screen 800 (FIG. 28) on the operations panel 120. When the search has failed due to exceeding the maximum number of hits, it may be considered that it is possible to conduct a search if search conditions are appropriately set (entered). Accordingly, the screen 800 indicating that the search has succeeded is displayed on the operations panel 120. If the failure of the search is not due to exceeding the maximum number of hits (that is, "NO" in step S70), the system initial setting function 202 proceeds to step S71.

Figure 29:
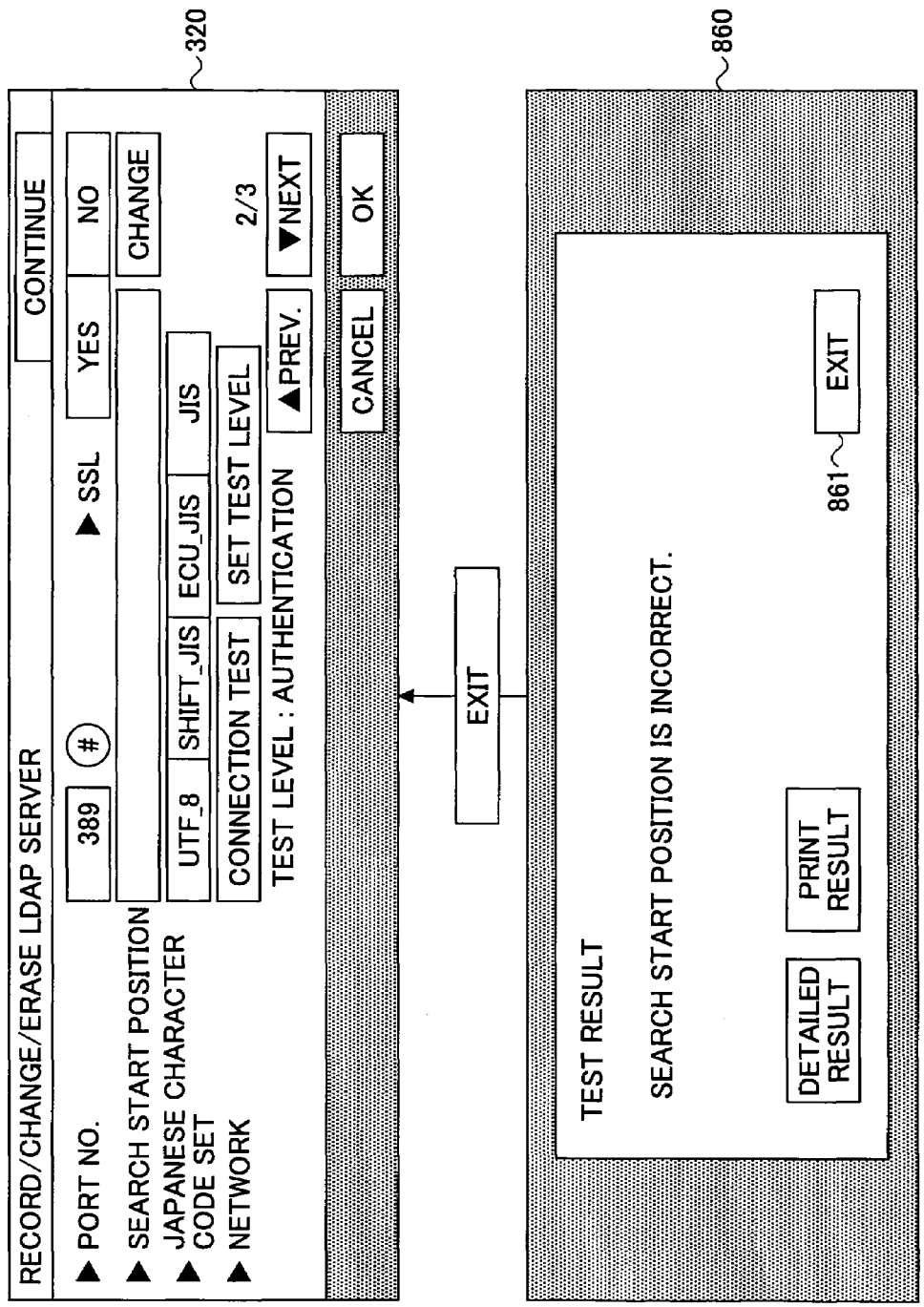
FIG. 29 is an image diagram for illustrating a screen displayed on the operations panel in the case of conducting the connection test with one of the connection test items "QUICK SEARCH," "TEST CONDITION SEARCH," and "NORMAL SEARCH" being selected according to the first embodiment of the present invention.

In step S71, the system initial setting function 202 determines whether the search has failed due to a search start position error. If the search has failed due to a search start position error (that is, "YES" in step S71), the system initial setting function 202 displays a screen 860 (FIG. 29) on the operations panel 120. The screen 860 includes a message indicating the failure of the search, such as "SEARCH START POSITION IS INCORRECT." The user can return to the screen 320 by pressing an EXIT button 861 on the screen 860 as shown in FIG. 29. If the failure of the search is not due to a search start position error (that is, "NO" in step S71), the system initial setting function 202 proceeds to step S72.

In step S72, the system initial setting function 202 determines whether the authentication by the LDAP server 231-1 has failed. If the authentication by the LDAP server 231-1 has failed (that is, "YES" in step S72), the system initial setting function 202 displays on the operations panel 120 the above-described screen 730 (FIG. 25) indicating that the authentication has failed. If the authentication by the LDAP server 231-1 has not failed (that is, "NO" in step S72), the system initial setting function 202 displays on the operations panel 120 the above-described screen 620 (FIG. 20) indicating that the LDAP server 231-1 is not working, or down.

On the other hand, if the connection test item "QUICK SEARCH" is not selected (that is, "NO" in step S64), in step S65, the system initial setting function 202 determines whether the search has succeeded. If the search has succeeded (that is, "YES" in step S65), the system initial setting function 202 displays a screen 820 (FIG. 30B) on the operations panel 120. The screen 820 includes a message indicating the success of the search, such as "SEARCH HAS BEEN CONDUCTED NORMALLY WITH ENTERED INFORMATION," and a search result display (SEARCH RESULT) button 822 for indicating the result of the search. The user can return to the screen 320 by pressing an EXIT button 821 on the screen 820.

When the SEARCH RESULT button 822 is pressed, the system initial setting function 202 displays a screen 830 (FIG. 30C) on the operations panel 120. The screen 830 includes, for instance, user information as the result of the search. The user can return to the screen 820 by pressing an EXIT button 831 on the screen 830.

When user information 832 is pressed (selected) on the screen 830, the system initial setting function 202 displays a screen 840 (FIG. 30D) on the operations panel 120. The screen 840 includes the detailed information of the pressed (selected) user information 832. When a next page display button 841 is pressed on the screen 840, the system initial setting function 202 displays a screen 850 (FIG. 30E) on the operations panel 120. The screen 850 includes the search options 1 through 3.

When a previous page display button 851 is pressed on the screen 850, the system initial setting function 202 displays the screen 840 on the operations panel 120. When the EXIT button is pressed on the screen 840 or 850, the system initial setting function 202 displays the screen 830 on the operations panel 120. In FIGS. 30C and 30D, reference numerals 833 and 834 refer to names in Japanese.

Figures 30A, 30B:
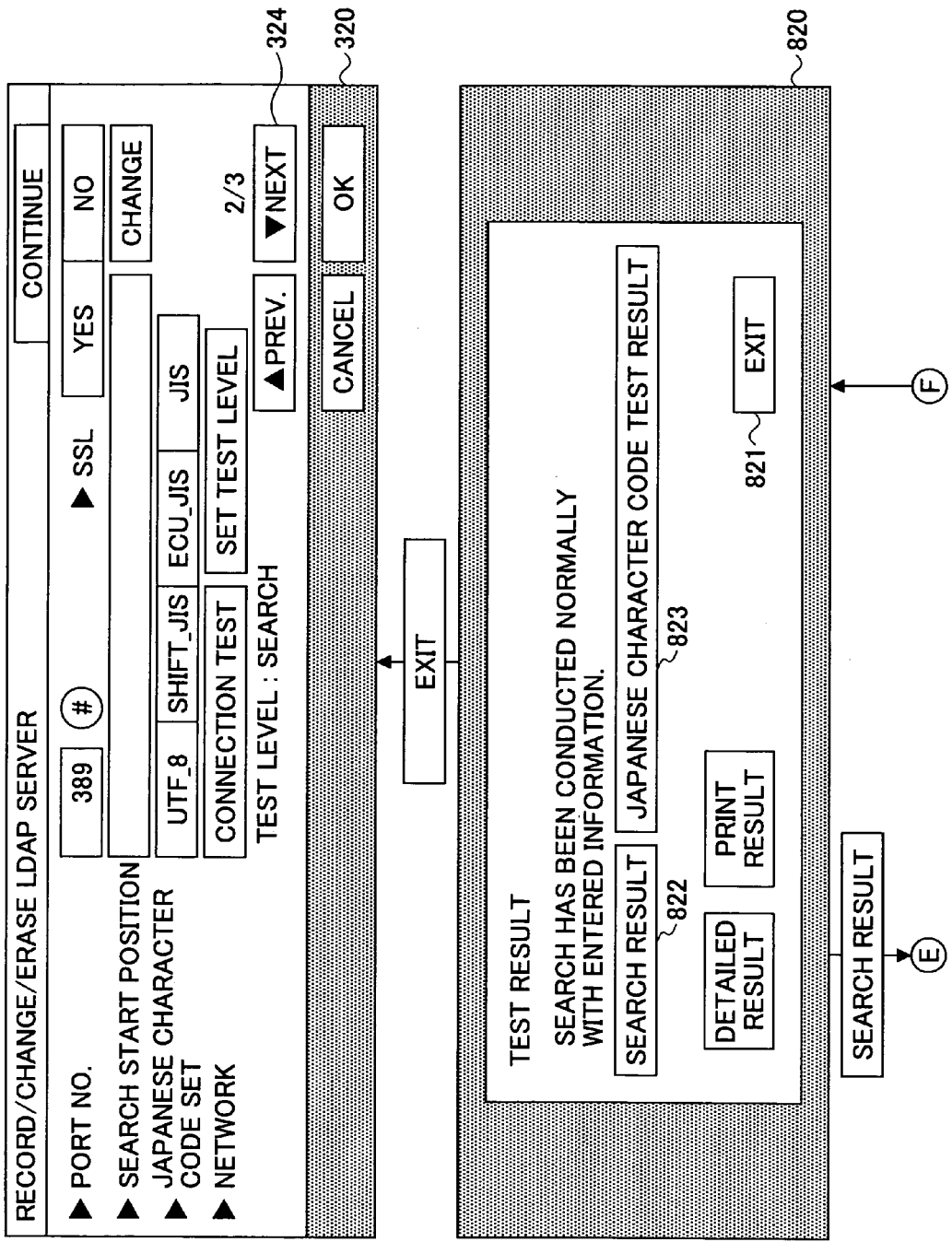

The screen 820 of FIG. 30B includes a Japanese character code test button 823 that is displayed in the case of conducting a connection test with the connection test item "JAPANESE CHARACTER CODE" being selected. When the Japanese character code test button 823 is pressed, a screen including the result of the connection test for the connection test item "JAPANESE CHARACTER CODE" is displayed on the operations panel 120. Such a screen is described below.

If the search has not succeeded (that is, "NO" in step S65), in step S66, the system initial setting function 202 determines whether the search has failed due to exceeding the maximum number of hits.

Figure 31:
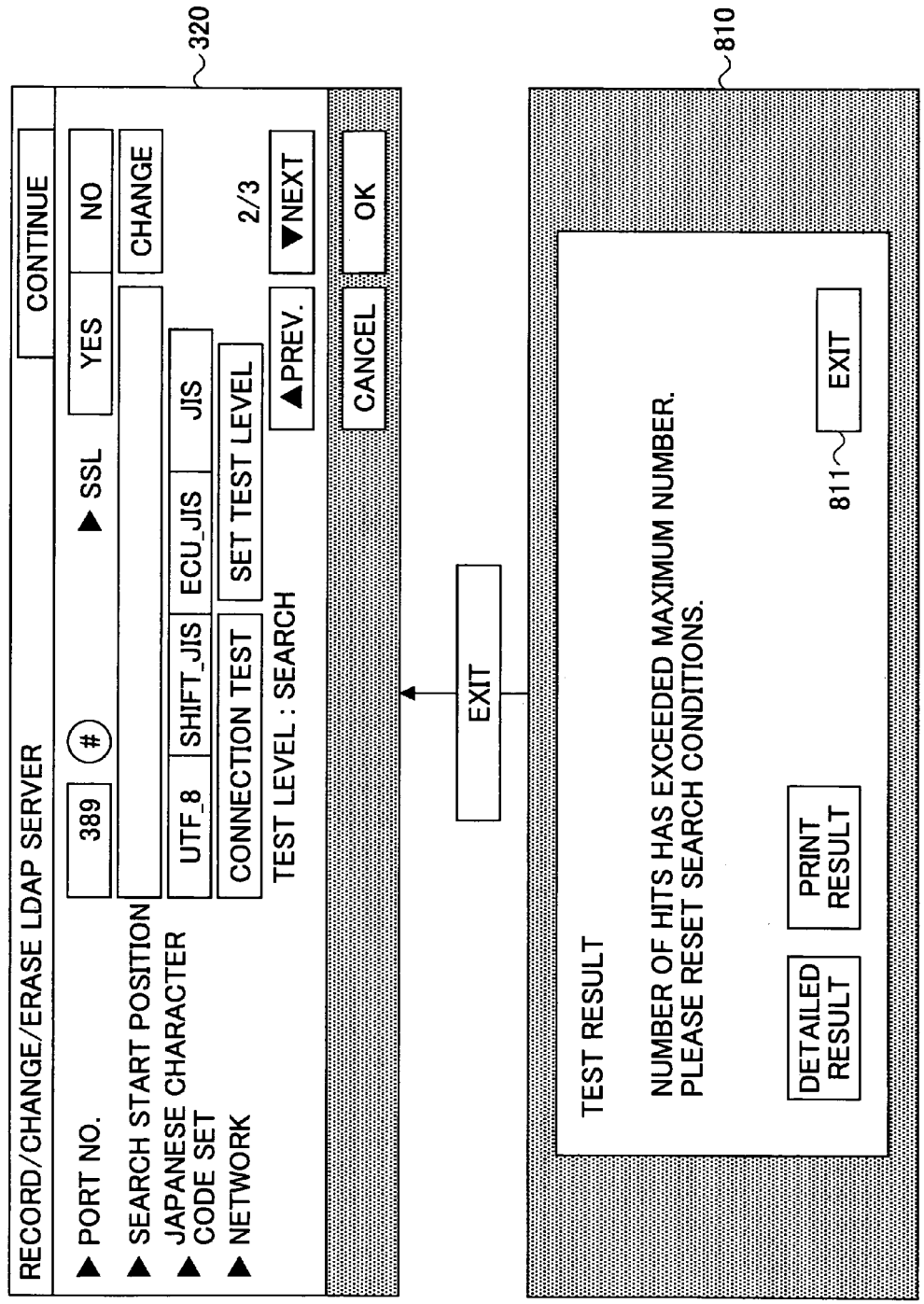
FIG. 31 is an image diagram for illustrating a screen displayed on the operations panel in the case of conducting the connection test with one of the connection test items "QUICK SEARCH," "TEST CONDITION SEARCH," and "NORMAL SEARCH" being selected according to the first embodiment of the present invention.

If the search has failed due to exceeding the maximum number of hits (that is, "YES" in step S66), the system initial setting function 202 displays a screen 810 (FIG. 31) on the operations panel 120. The screen 810 includes a message indicating the failure of the search due to exceeding the maximum number of hits, such as "NUMBER OF HITS HAS EXCEEDED MAXIMUM NUMBER. PLEASE RESET SEARCH CONDITIONS." The user can return to the screen 320 by pressing an EXIT button 811 on the screen 810 as shown in FIG. 31. If the failure of the search is not due to exceeding the maximum number of hits (that is, "NO" in step S66), the system initial setting function 202 proceeds to step S67.

In step S67, the system initial setting function 202 determines whether the search has failed due to a search start position error. If the search has failed due to a search start position error (that is, "YES" in step S67), the system initial setting function 202 displays the screen 860 (FIG. 29) on the operations panel 120. The screen 860 includes a message indicating the failure of the search, such as "SEARCH START POSITION IS INCORRECT." The user can return to the screen 320 by pressing the EXIT button 861 on the screen 860 as shown in FIG. 29. If the failure of the search is not due to a search start position error (that is, "NO" in step S67), the system initial setting function 202 proceeds to step S68.

In step S68, the system initial setting function 202 determines whether the authentication by the LDAP server 231-1 has failed. If the authentication by the LDAP server 231-1 has failed (that is, "YES" in step S68), the system initial setting function 202 displays on the operations panel 120 the above-described screen 730 (FIG. 25) indicating that the authentication has failed. If the authentication by the LDAP server 231-1 has not failed (that is, "NO" in step S68), the system initial setting function 202 displays on the operations panel 120 the above-described screen 620 (FIG. 20) indicating that the LDAP server 231-1 is down.

Figure 32:
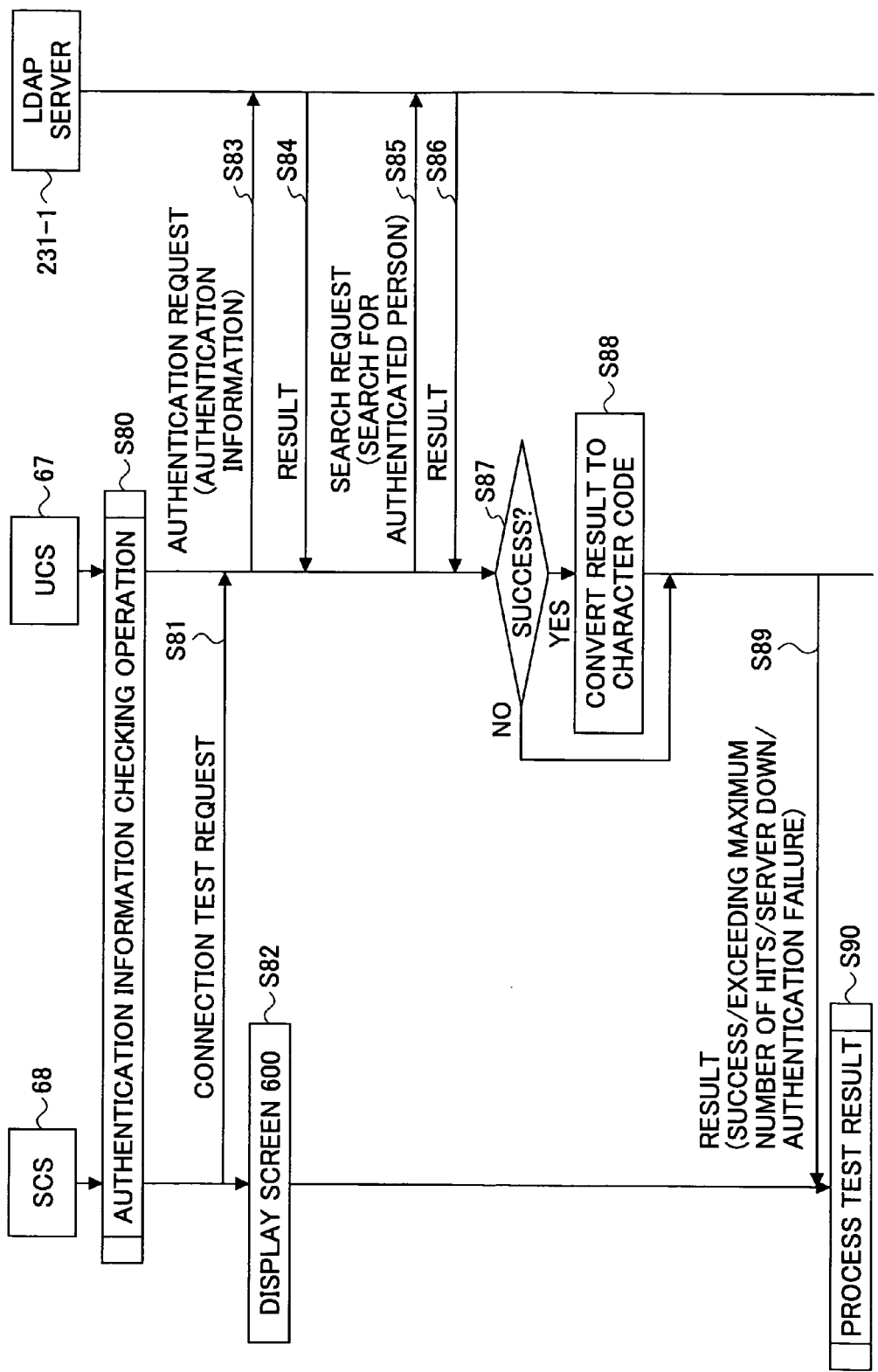
FIG. 32 is a sequence diagram showing processing in the case of conducting a connection test with a connection test item "JAPANESE CHARACTER CODE" being selected according to the first embodiment of the present invention.

FIG. 32 is a sequence diagram showing processing in the case of conducting a connection test with the connection test item "JAPANESE CHARACTER CODE" being selected. The sequence diagram of FIG. 32 shows the case where the entered authentication information is "ON," indicating that an authentication request is to be made.

When the user presses the CONNECTION TEST button 321 on the screen 320 of FIG. 11C, in step S80, the system initial setting function 202 of the SCS 68 performs the same authentication information checking operation as steps S31 through S35 of FIG. 21. Next, in step S81, the system initial setting function 202 makes a connection test request with respect to the connection test item "JAPANESE CHARACTER CODE" to the UCS 67. Then, in step S82, the system initial setting function 202 displays on the operations panel 120 the above-described screen 600 (FIG. 19) indicating that the connection test is being conducted.

Receiving the connection test request from the system initial setting function 202, in step S83, the UCS 67 makes an authentication request using the authentication information to the LDAP server 231-1. Next, in step S84, the UCS 67 receives the result of the authentication request made in step S83. Then, in step S85, the UCS 67 makes a request for a search for the authenticated user to the LDAP server 231-1. Then, in step S86, the UCS 67 receives the result of the search request made in step S85.

Receiving the result of the search request from the LDAP server 231-1, the UCS 67 determines whether the search for the authenticated user has succeeded. If the search has succeeded (that is, "YES" in step S87), in step S88, the UCS 67 converts the result of the search into one or more Japanese character codes, and then proceeds to step S89. If the search has not succeeded (that is, "NO" in step S87), the UCS 67 proceeds to step S89.

In step S89, the UCS 67 supplies the result of the connection test to the system initial setting function 202 of the SCS 68. Specifically, if the search for the authenticated user has succeeded, the UCS 67 notifies the system initial setting function 202 of the result of the search converted into the one or more Japanese character codes. If the UCS 67 confirms in step S86 that the search has failed due to exceeding the maximum number of hits, the UCS 67 notifies the system initial setting function 202 that the search has failed due to exceeding the maximum number of hits. If the UCS 67 confirms in step S84 that the authentication information includes an error, the UCS 67 notifies the system initial setting function 202 of the failure of the authentication. If the UCS 67 does not receive the result of the authentication request within a predetermined period of time after making the authentication request in step S83, the UCS 67 notifies the system initial setting function 202 that the LDAP server 231-1 is down.

Figure 33:
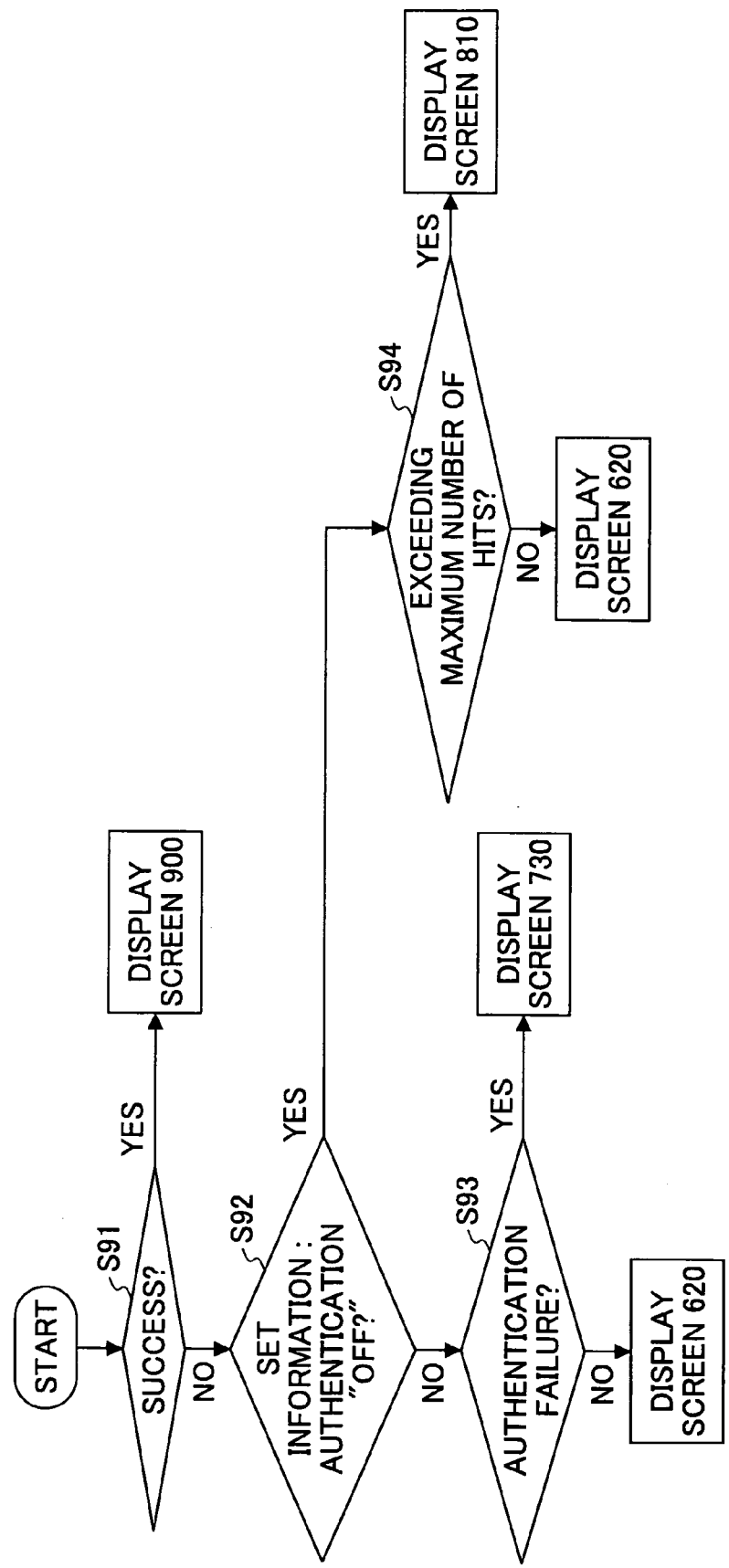
FIG. 33 is a flowchart of the operation of processing the result of the connection test conducted with the connection test item "JAPANESE CHARACTER CODE" being selected according to the first embodiment of the present invention.

Receiving the result of the connection test from the UCS 67, in step S90, the system initial setting function 202 processes the result of the connection test as shown in FIG. 33. FIG. 33 is a flowchart of the operation of processing the result of the connection test conducted with the connection test item "JAPANESE CHARACTER CODE" being selected.

Figure 34:
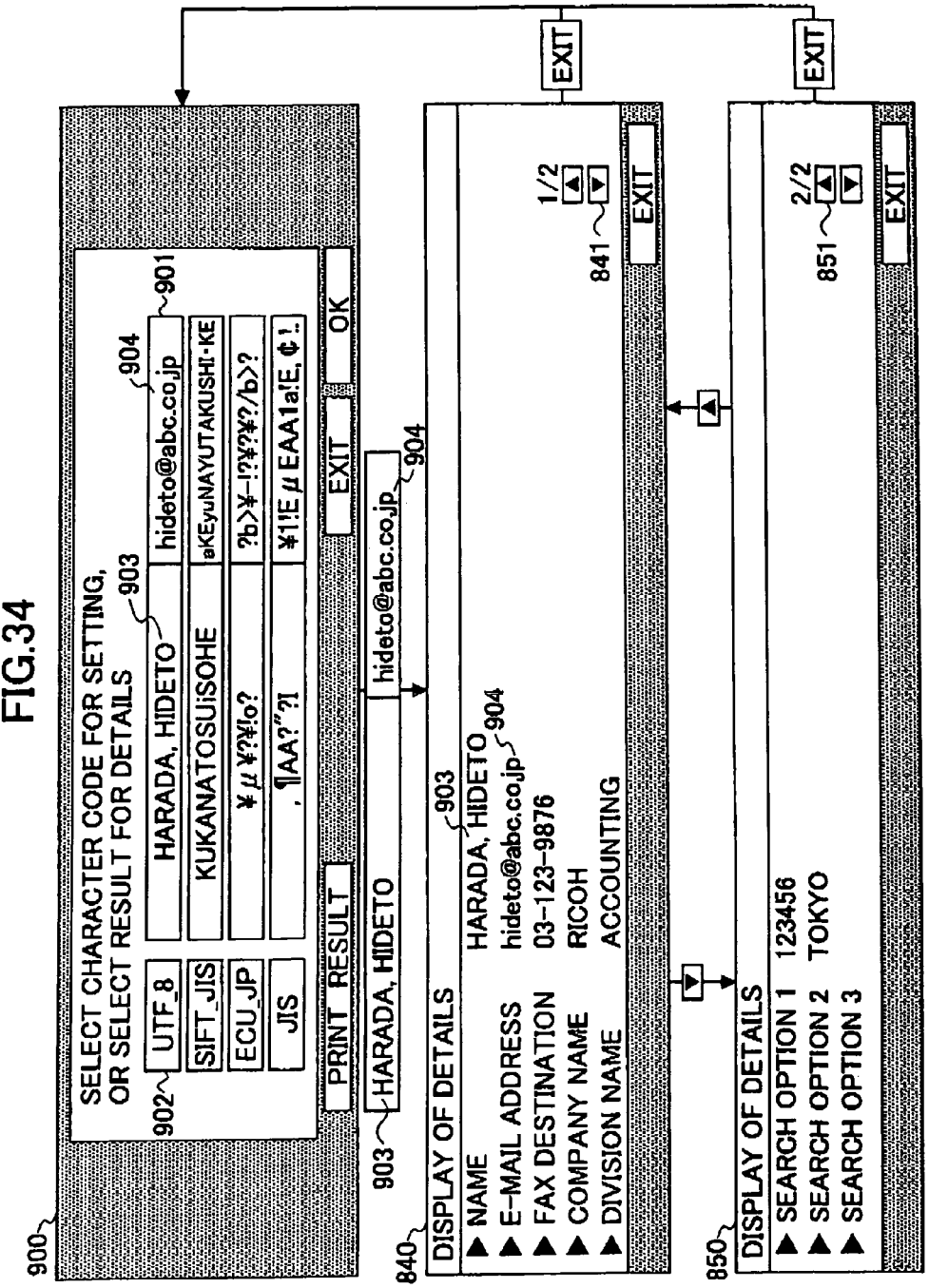
FIG. 34 is an image diagram for illustrating screens displayed on the operations panel in the case of conducting the connection test with the connection test item "JAPANESE CHARACTER CODE" being selected according to the first embodiment of the present invention.

Receiving the result of the connection test from the UCS 67, in step S91, the system initial setting function 202 determines whether the search for the authenticated user has succeeded. If the search has succeeded (that is, "YES" in step S91), the system initial setting function 202 displays a screen 900 (FIG. 34) on the operations panel 120. The screen 900 includes the user information converted into the one or more Japanese character codes such as UTF-8, SHIFT_JIS, EUC_JP, and JIS as the result of the search.

The user checks the user information displayed on the screen 900, recognizes a Japanese character code that correctly displays the user information in Japanese (for instance, UTF-8 in the case of FIG. 34 correctly displays user information 901 including a name 903 in Japanese and an e-mail address 904), and selects a Japanese character code button 902 of the Japanese character code, that is, UTF-8 in this case. In SHIFT_JIS, EUC_JP, and JIS, the user information is turned into gibberish. As a result, the Japanese character code can be set.

Further, when the user information 901 is pressed (selected) on the screen 900, the system initial setting function 202 displays on the operations panel 120 the above-described screen 840 (FIG. 30D) including the detailed information of the user information pressed (selected) on the screen 900. When the next page display button 841 is pressed on the screen 840, the system initial setting function 202 displays the above-described screen 850 (FIG. 30E) including the search options 1 through 3 on the operations panel 120.

If the search has not succeeded (that is, "NO" in step S91), in step S92, the system initial setting function 202 determines whether the authentication information entered from the screen 310 (FIG. 11B) is "OFF", indicating that an authentication request is not to be performed. If the entered authentication information is "OFF" (that is, "YES" in step S92), the system initial setting function 202 proceeds to step S94.

In step S94, the system initial setting function 202 determines whether the search has failed due to exceeding the maximum number of hits. If the search has failed for exceeding the maximum number of hits (that is, "YES" in step S94), the system initial setting function 202 displays on the operations panel 120 the above-described screen 810 (FIG. 31) indicating the failure of the search due to exceeding the maximum number of hits.

If the search has not failed due to exceeding the maximum number of hits (that is, "NO" in step S94), the system initial setting function 202 displays on the operations panel 120 the above-described screen 620 (FIG. 20) indicating that the LDAP server 231-1 is down. If the authentication information is not "OFF" (that is, "NO" in step S92), in step S93, the system initial setting function 202 determines whether the authentication by the LDAP server 231-1 has failed.

If the authentication by the LDAP server 231-1 has failed (that is, "YES" in step S93), the system initial setting function 202 displays on the operations panel 120 the above-described screen 730 (FIG. 25) indicating the failure of the authentication. If the authentication by the LDAP server 231-1 has not failed (that is, "NO" in step S93), the system initial setting function 202 displays on the operations panel 120 the above-described screen 620 (FIG. 20) indicating that the LDAP server 231-1 is down.

Figure 35:
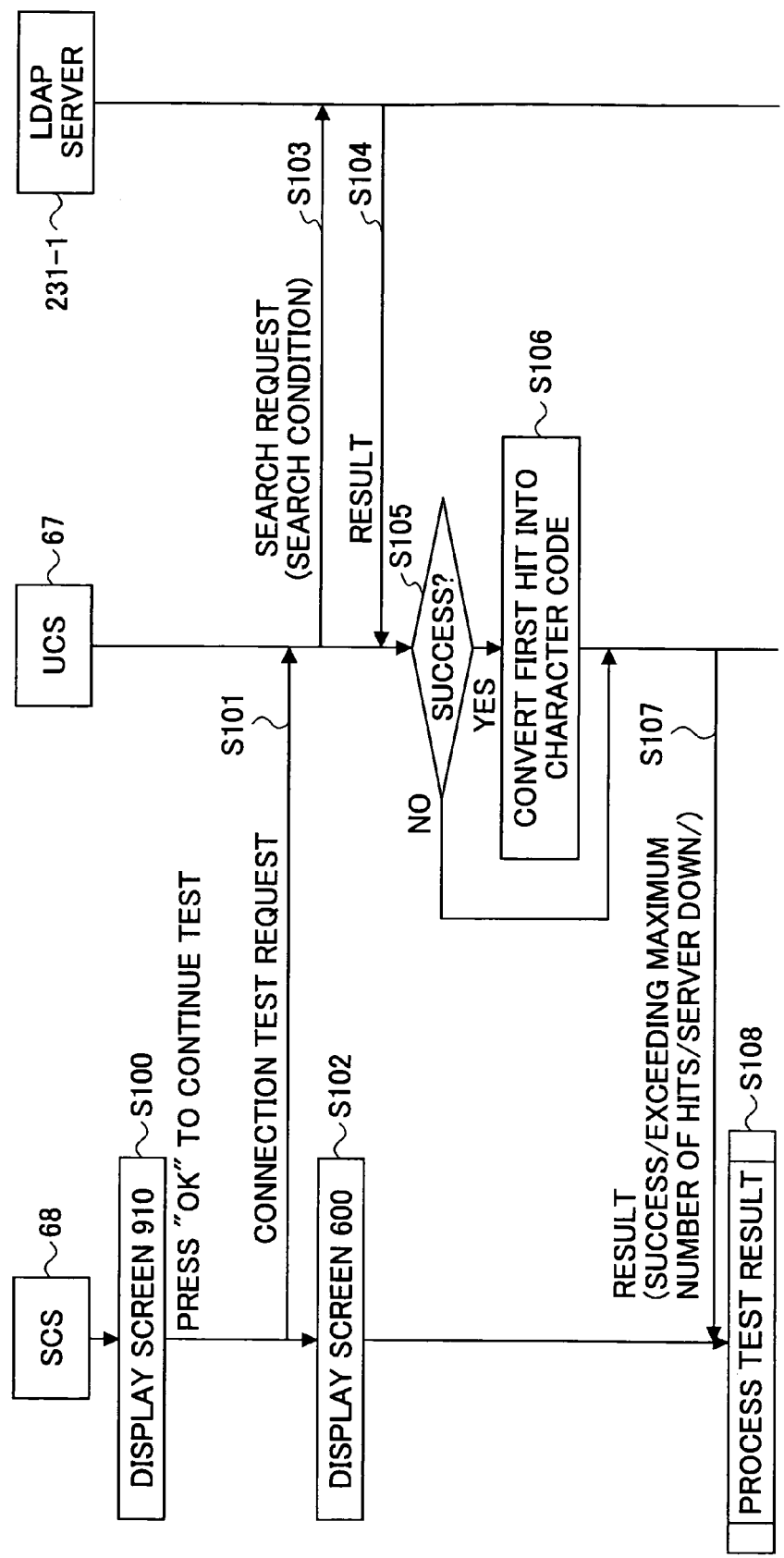
FIG. 35 is a sequence diagram showing processing in the case of conducting a connection test with the connection test item "JAPANESE CHARACTER CODE" being selected according to the first embodiment of the present invention.

FIG. 35 is a sequence diagram showing processing in the case of conducting a connection test with the connection test item "JAPANESE CHARACTER CODE" being selected. The sequence diagram of FIG. 35 shows the case where the entered authentication information is "OFF," indicating that an authentication request is not to be made.

Figure 36:
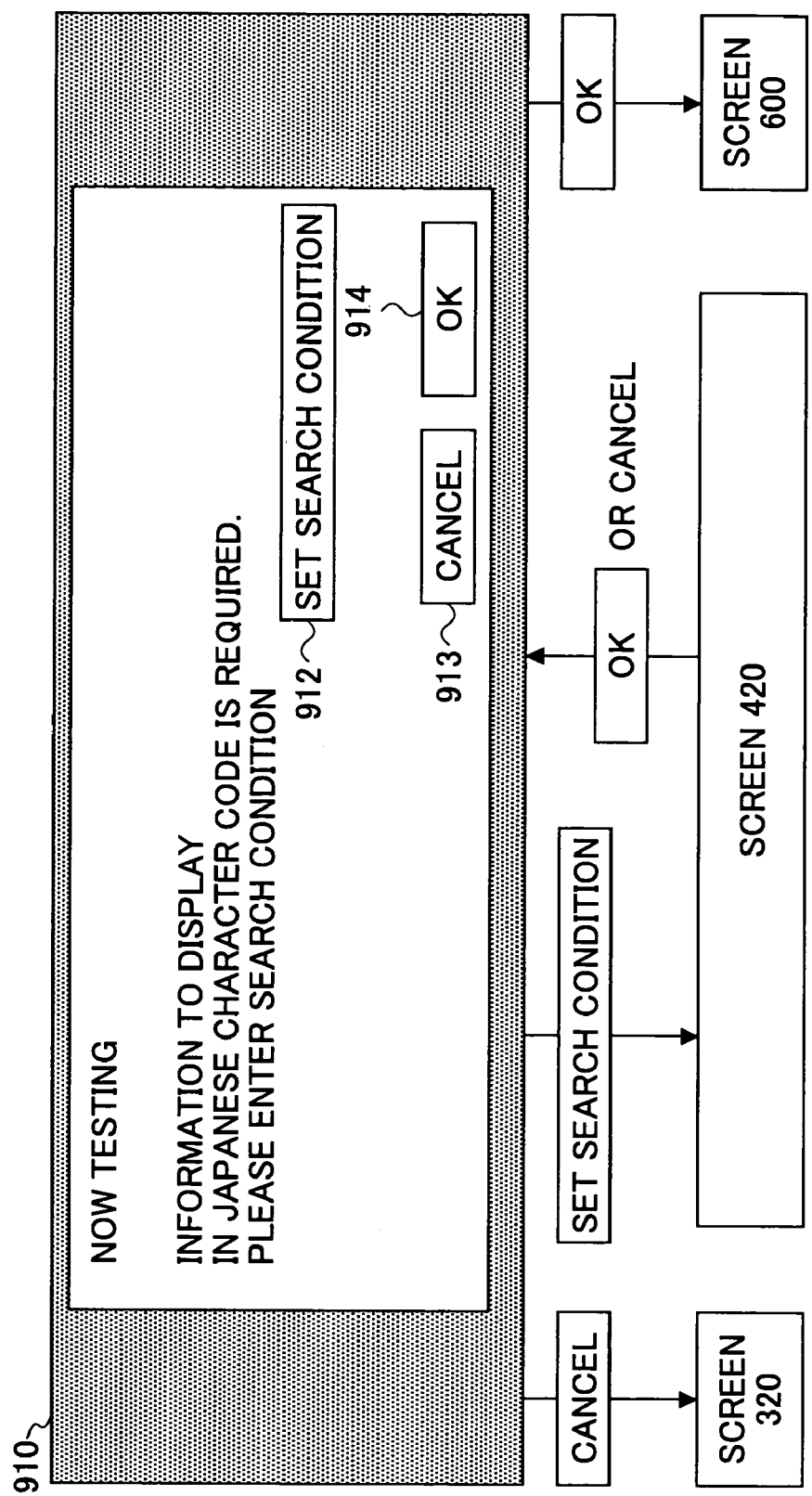
FIG. 36 is an image diagram showing a screen displayed on the operations panel in the case of conducting the connection test with the connection test item "JAPANESE CHARACTER CODE" being selected according to the first embodiment of the present invention.

When the user presses the CONNECTION TEST button 321 on the screen 320 (FIG. 11B), the system initial setting function 202 of the SCS 68 displays a screen 910 (FIG. 36) on the operations panel 120. The screen 910 includes a message prompting the user to enter a search condition, such as "INFORMATION TO DISPLAY IN JAPANESE CHARACTER CODE IS REQUIRED. PLEASE ENTER SEARCH CONDITION."

When the user presses a search condition setting (SET SEARCH CONDITION) button 912 on the screen 910, the system initial setting function 202 displays on the operations panel 120 the above-described screen 420 (FIG. 12C) for entering a search condition and selecting a match condition for the search condition. The user can return to the screen 910 by pressing the OK or CANCEL button after entering a search condition (search conditions) on the screen 420. The user can return to the screen 320 (FIG. 1C) by pressing a CANCEL button 913 on the screen 910.

When the user presses an OK button 914 after entering the search condition(s) on the screen 910, in step S101, the system initial setting function 202 makes a connection test request with respect to the connection test item "JAPANESE CHARACTER CODE" to the UCS 67. Then, in step S102, the system initial setting function 202 displays on the operations panel 120 the above-described screen 600 (FIG. 19) indicating that the connection test is being conducted.

Receiving the connection test request from the system initial setting function 202, in step S103, the UCS 67 sends to the LDAP server 231-1 a search request using the search condition(s) included in the connection test request. Then, in step S104, the UCS 67 receives the result of the search request made in step S103.

Next, in step S105, the UCS 67 determines from the received result of the search request whether the search has succeeded. If the search has succeeded (that is, "YES" in step S105), in step S106, the UCS 67 converts the first hit of the result of the search request into one or more Japanese character codes, and then proceeds to step S107. If the search has not succeeded (that is, "NO" in step S105), the UCS 67 proceeds to step S107.

In step S107, the UCS 67 supplies the result of the connection test to the system initial setting function 202 of the SCS 68. Specifically, if the search has succeeded, the UCS 67 notifies the system initial setting function 202 of the result of the search converted into the one or more Japanese character codes. If the UCS 67 confirms in step S104 that the search has failed due to exceeding the maximum number of hits, the UCS 67 notifies the system initial setting function 202 of the failure of the search due to exceeding the maximum number of hits. If the UCS 67 does not receive the result of the search request within a predetermined period of time after making the search request in step S103, the UCS 67 notifies the system initial setting function 202 that the LDAP server 231-1 is down.

Figure 37:
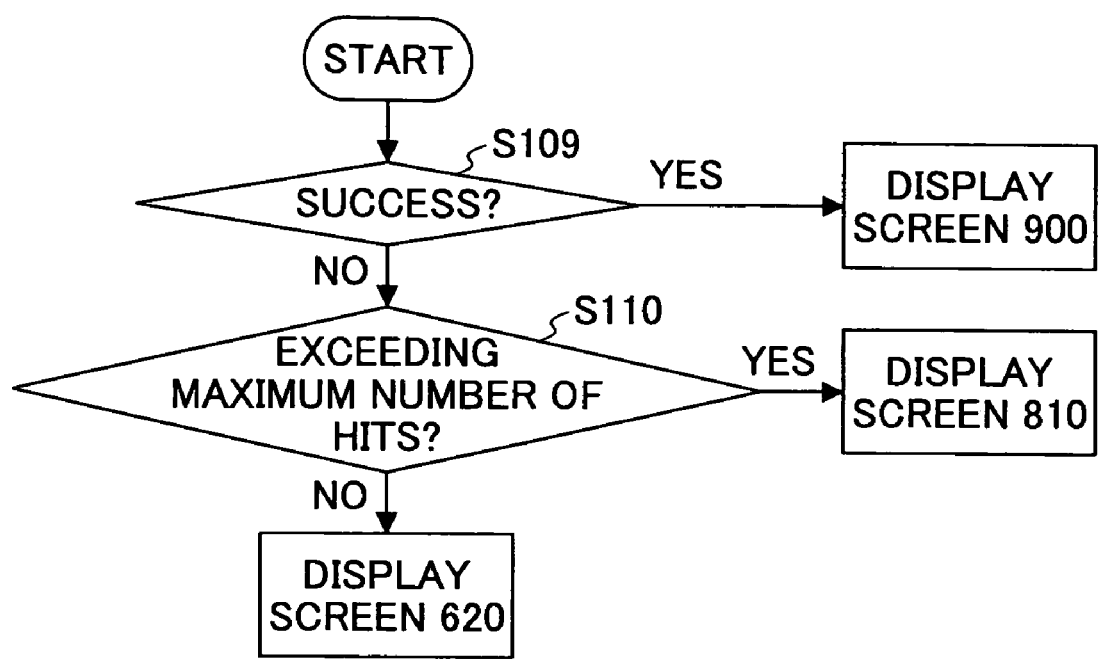
FIG. 37 is a flowchart of the operation of processing the result of the connection test conducted with the connection test item "JAPANESE CHARACTER CODE" being selected according to the first embodiment of the present invention.

Receiving the result of the connection test from the UCS 67, in step S108, the system initial setting function 202 processes the result of the connection test as shown in FIG. 37. FIG. 37 is a flowchart of the operation of processing the result of the connection test conducted with the connection test item "JAPANESE CHARACTER CODE" being selected.

Receiving the result of the connection test from the UCS 67, in step S109, the system initial setting function 202 determines whether the search has succeeded. If the search has succeeded (that is, "YES" in step S109), the system initial setting function 202 displays on the operations panel 120 the above-described screen 900 (FIG. 34) including the user information converted into the one or more Japanese character codes as the result of the search.

If the search has not succeeded (that is, "NO" in step S109), in step S110, the system initial setting function 202 determines whether the search has failed due to exceeding the maximum number of hits. If the search has failed due to exceeding the maximum number of hits (that is, "YES" in step S110), the system initial setting function 202 displays on the operations panel 120 the above-described screen 810 (FIG. 31) indicating the failure of the search due to exceeding the maximum number of hits.

If the failure of the search is not due to exceeding the maximum number of hits (that is, "NO" in step S110), the system initial setting function 202 displays on the operations panel 120 the above-described screen 620 (FIG. 20) indicating that the LDAP server 231-1 is down.

Figure 38:
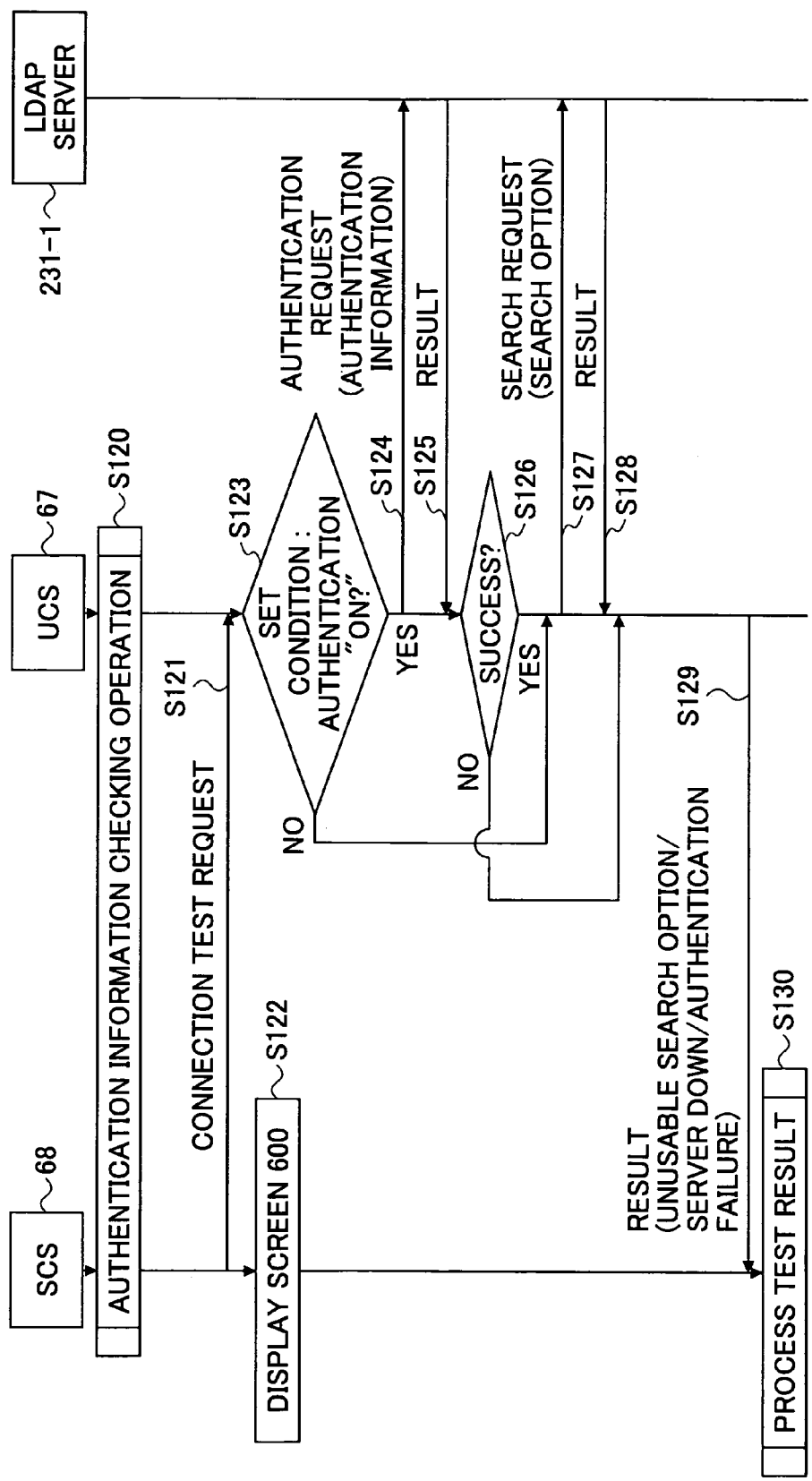
FIG. 38 is a sequence diagram showing processing in the case of conducting a connection test with a connection test item "SEARCH OPTION" being selected according to the first embodiment of the present invention.

FIG. 38 is a sequence diagram showing processing in the case of conducting a connection test with the connection test item "SEARCH OPTION" being selected. When the user presses the CONNECTION TEST button 321 on the screen 320 (FIG. 11C), in step S120, the system initial setting function 202 of the SCS 68 performs the same authentication information checking operation as steps S31 through S35 of FIG. 21.

Next, in step S121, the system initial setting function 202 makes a connection test request with respect to the connection test item "SEARCH OPTION" to the UCS 67. Then, in step S122, the system initial setting function 202 displays on the operations panel 120 the above-described screen 600 (FIG. 19) indicating that the connection test is being conducted.

Receiving the connection test request from the system initial setting function 202, in step S123, the UCS 67 determines, by checking the LDAP server information included in the connection test request, whether the authentication information entered from the screen 310 (FIG. 11B) is "ON," indicating that an authentication request is to be made.

If the authentication information is "ON" (that is, "YES" in step S123), the UCS 67 proceeds to step S124. The operations of step S124 and S125 are equal to those of steps S37 and S38 of FIG. 21, and a description thereof is omitted. Receiving the result of the authentication request, in step S126, the UCS 67 determines whether the authentication by the LDAP server 231-1 has succeeded. If the authentication has succeeded (that is, "YES" in step S126), in step S127, the UCS 67 makes a search request using the search option(s) included in the connection test request to the LDAP server 231-1. If the authentication information is not "ON" (that is, "NO" in step S123), the UCS 67 proceeds to step S127.

Next, in step S128, the UCS 67 receives the result of the search request made in step S127. Then, in step S129, the UCS 67 supplies the result of the connection test to the system initial setting function 202 of the SCS 68. If the authentication has not succeeded (that is, "NO" in step S126), the UCS 67 proceeds to step S129.

Specifically, if the UCS 67 recognizes an unusable search option in step S128, the UCS 67 notifies the system initial setting function 202 of the unusable search option. For instance, the unusable search option may be information such as an employee identification number arbitrarily made up and used by the user. If the UCS 67 recognizes an error in the authentication information in step S125, the UCS 67 notifies the system initial setting function 202 of the failure of the authentication. If the UCS 67 does not receive the result of the authentication request within a predetermined period of time after making the authentication request in step S124, the UCS 67 notifies the system initial setting function 202 that the LDAP server 231-1 is down.

Figure 39:
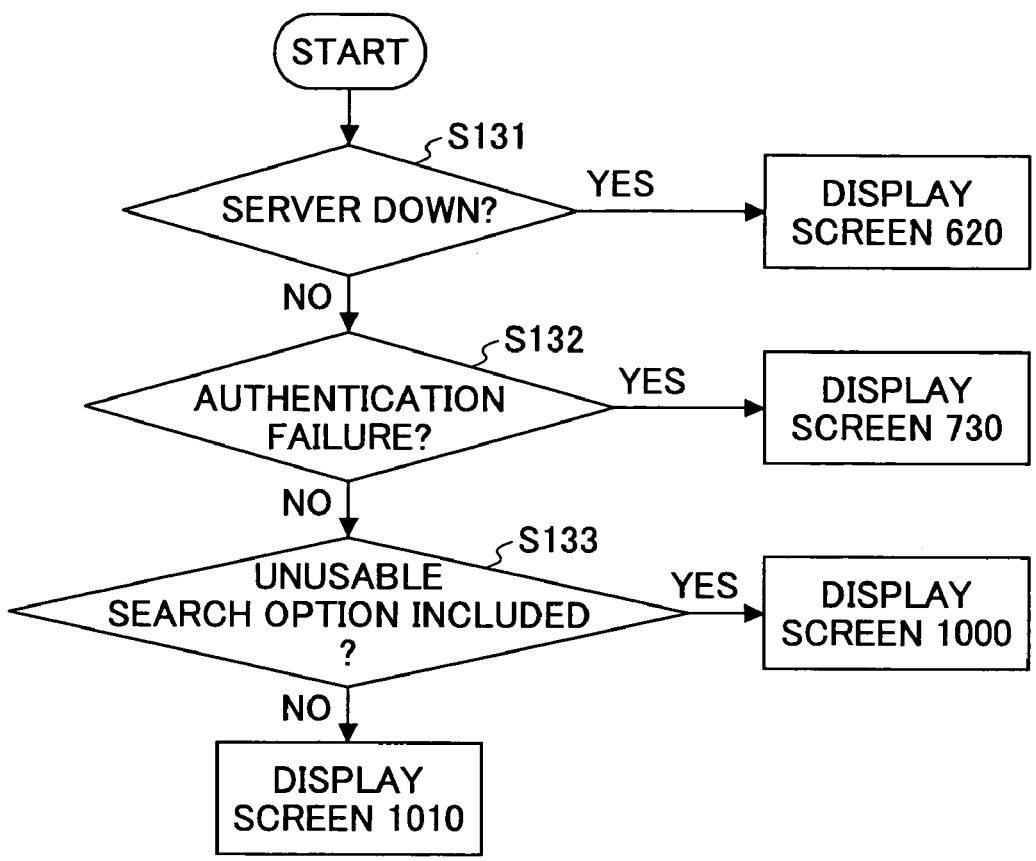
FIG. 39 is a flowchart of the operation of processing the result of the connection test conducted with the connection test item "SEARCH OPTION" being selected according to the first embodiment of the present invention.

Receiving the result of the connection test from the UCS 67, in step S130, the system initial setting function 202 processes the result of the connection test as shown in FIG. 39. FIG. 39 is a flowchart of the operation of processing the result of the connection test conducted with the connection test item "SEARCH OPTION" being selected.

Receiving the result of the connection test from the UCS 67 in step S129 of FIG. 38, in step S131 of FIG. 39, the system initial setting function 202 determines whether the LDAP server 231-1 is down. If the LDAP server 231-1 is down (that is, "YES" in step S131), the system initial setting function 202 displays on the operations panel 120 the above-described screen 620 (FIG. 20) indicating that the LDAP server 231-1 is down. If the LDAP server 231-1 is not down (that is, "NO" in step S131), the system initial setting function 202 proceeds to step S132.

In step S132, the system initial setting function 202 determines whether the authentication by the LDAP server 231-1 has failed. If the authentication by the LDAP server 231-1 has failed (that is, "YES" in step S132), the system initial setting function 202 displays on the operations panel 120 the above-described screen 730 (FIG. 25) indicating the failure of the authentication. If the authentication by the LDAP server 231-1 has not failed (that is, "NO" in step S132), the system initial setting function 202 proceeds to step S133.

Figure 40:
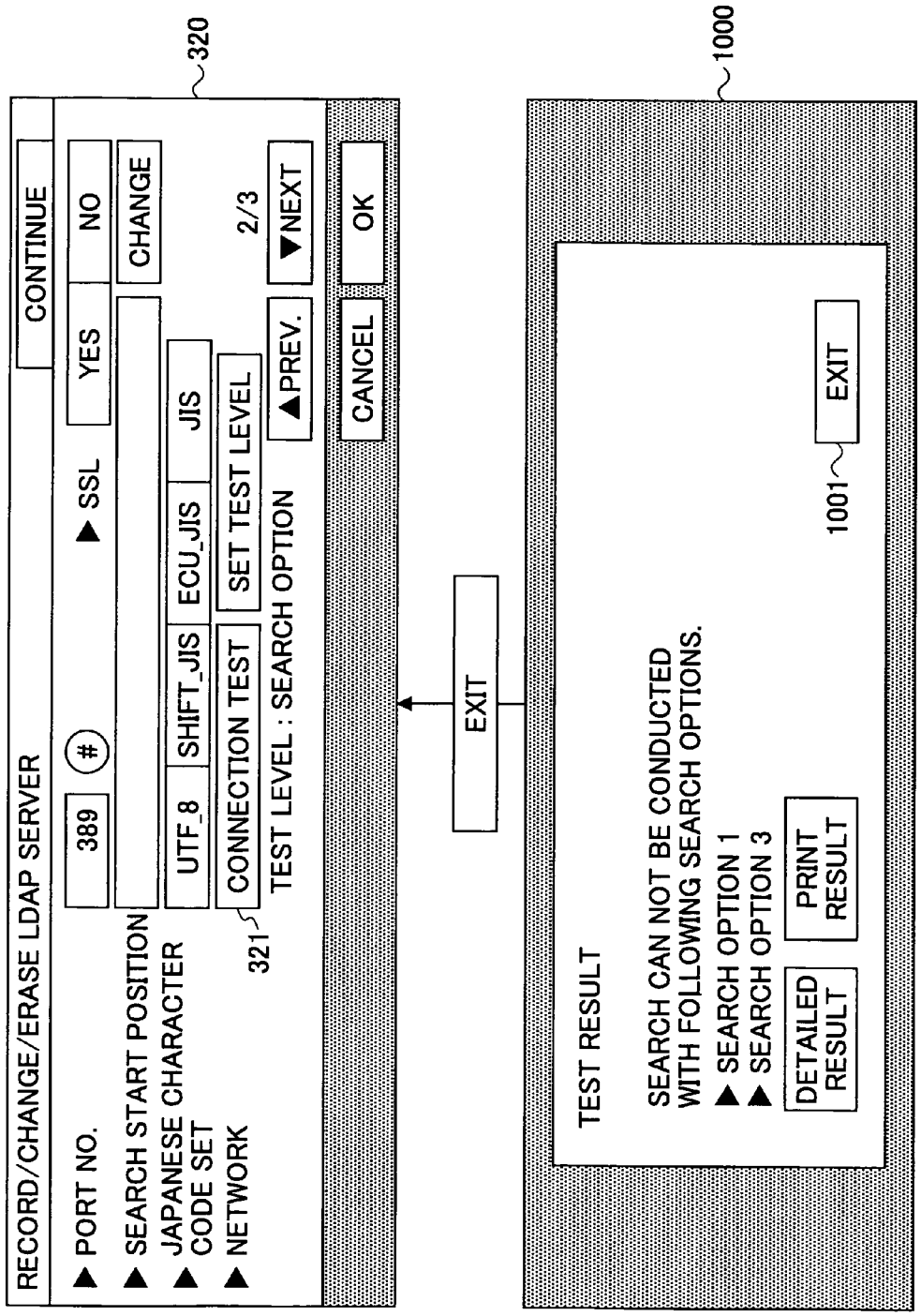
FIG. 40 is an image diagram for illustrating a screen displayed on the operations panel in the case of conducting the connection test with the connection test item "SEARCH OPTION" being selected according to the first embodiment of the present invention.

In step S133, the system initial setting function 202 determines whether the search option(s) includes (include) an unusable one. If the search option(s) includes (include) an unusable one (that is, "YES" in step S133), the system initial setting function 202 displays a screen 1000 (FIG. 40) on the operations panel 120. The screen 1000 includes a list of unusable search options. The user can return to the screen 320 (FIG. 11C) by pressing an EXIT button 1001 on the screen 1000 as shown in FIG. 40.

Figure 41:
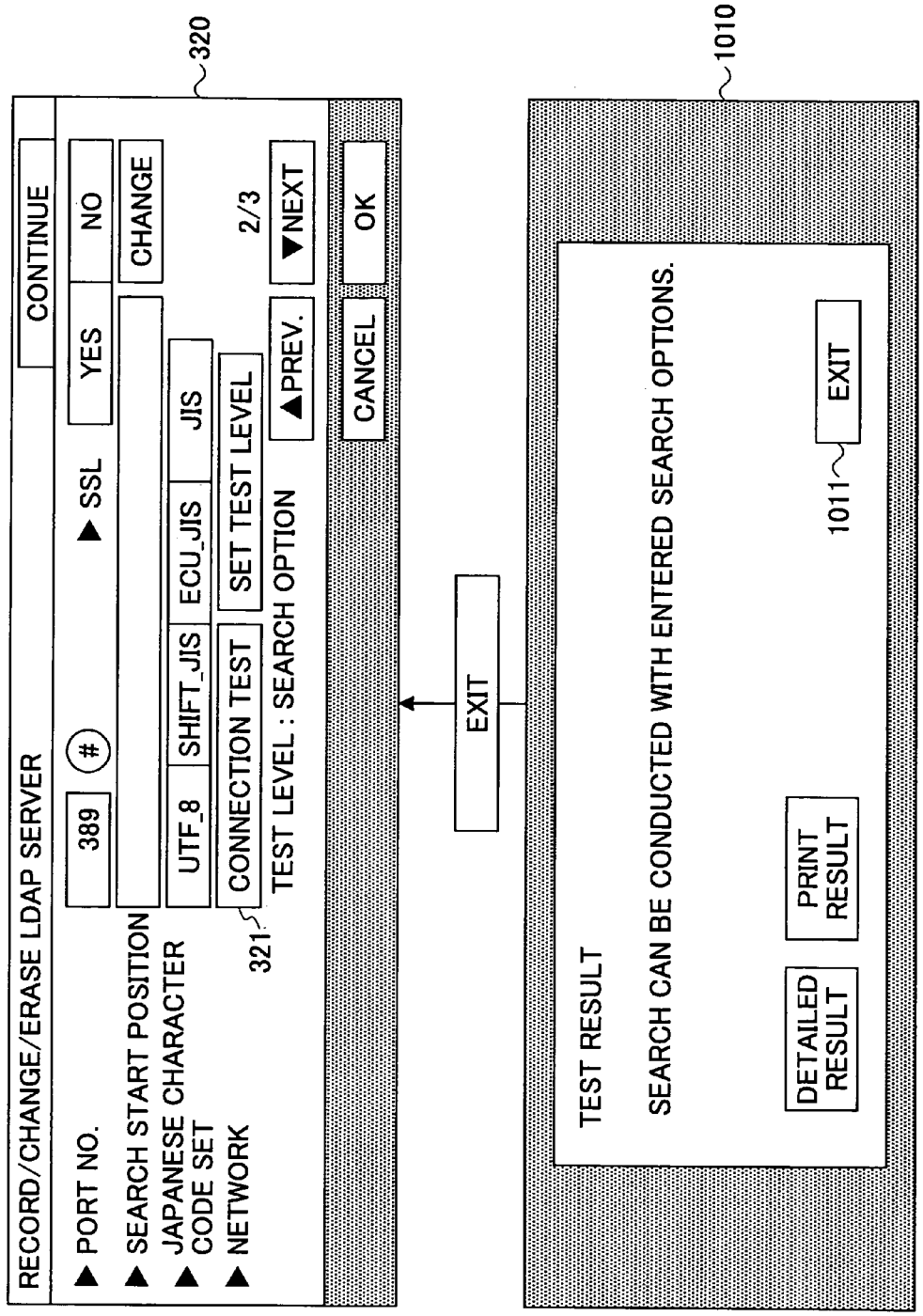
FIG. 41 is an image diagram for illustrating a screen displayed on the operations panel in the case of conducting the connection test with the connection test item "SEARCH OPTION" being selected according to the first embodiment of the present invention.

If the search option(s) does (do) not include any unusable search option (that is, "NO" in step S133), the system initial setting function 202 displays a screen 1010 (FIG. 41) on the operations panel 120. The screen 1010 includes a message indicating that a search can be conducted with the entered search option(s), such as "SEARCH CAN BE CONDUCTED WITH ENTERED SEARCH OPTIONS." The user can return to the screen 320 by pressing an EXIT button 1011 on the screen 1010 as shown in FIG. 41.

A description is given above of the case of giving an instruction to record LDAP server information and conduct a connection test on the operations panel 120. The operation is the same except for some part in the case of giving the instruction on the screen of the client 232-1 or 232-2. In the case of giving the instruction on the screen of the client 232-1 or 232-2, information necessary for recording LDAP server information and conducting a connection test is transmitted from the client 232-1 or 232-2 to the UCS 67, which is the difference from the case of giving the instruction on the operations panel 120 of the multi-function apparatus 31.

FIG. 42 is a sequence diagram showing a case of recording LDAP server information based on an instruction from the screen of the client 232-1. In step S140, the user operates the client 232-1 to give an instruction to display the LDAP server information recording screen. Then, the client 232-1 displays the LDAP server information recording screen on its screen based on the instruction from the user. The user operates an input device to enter LDAP server information on the LDAP server information recording screen displayed on the screen of the client 232-1.

Then, the client 232-1 transmits to the NCS 61 a request for recording the data of the LDAP server information entered on the LDAP server information recording screen (a data recording request). Next, in step S141, the NCS 61 extracts XML data as shown in FIG. 43 included in the received data recording request, and supplies the extracted XML data to the UCS 67. Then, in step S142, the UCS 67 extracts the LDAP server information from the XML data supplied from the NCS 61, and stores the extracted LDAP server information in the HDD 108.

Thus, the clients 232-1 and 232-2 can record (obtain, add, change, or delete) the LDAP server information managed by the multi-function apparatus 31 by using XML.

FIG. 44 is a sequence diagram showing a case of conducting a connection test based on an instruction from the screen of the client 232-1. In step S150, the user operates the client 232-1 to give an instruction to conduct a connection test. After the user giving the instruction, the client 232-1 transmits a connection test request to the NCS 61.

Next, in step S151, the NCS 61 extracts XML data as shown in FIG. 45 included in the received connection test request, and supplies the extracted XML data to the UCS 67. Then, in step S152, the UCS 67 extracts data for the connection test (test data) from the supplied XML data.

Next, in step S153, the UCS 67 conducts the connection test in accordance with the above-described test level using the LDAP server information included in the test data. Then, the UCS 67 obtains the result of the connection test. Next, in step S154, the UCS 67 supplies the result of the connection test to the NCS 61. Then, in step S155, the NCS 61 transmits to the client 232-1 the result of the connection test supplied from the UCS 67.

In step S156, the client 232-1 displays the received result of the connection test on its screen. The user can check the accuracy of the LDAP server information to be recorded by checking the result of the connection test displayed on the screen of the client 232-1. Thus, the clients 232-1 and 232-2 can make a connection test request to the multi-function apparatus 31 and check the result of the connection test by using XML.

Each of the above-described screens 500 (FIG. 15), 510 (FIG. 16), 610 (FIG. 19), 620 (FIG. 20), 720 (FIG. 24), 730 (FIG. 25), 800 (FIG. 28), 810 (FIG. 31), 820 (FIG. 30B), 1000 (FIG. 40), and 1010 (FIG. 41) displayed as a result of a connection test includes a detailed result display (DETAILED RESULT) button for displaying the details of the result of the connection test on the operations panel 120 and a result printing (PRINT RESULT) button for printing the result of the connection test. Further, the above-described screen 900 (FIG. 34) displayed as a result of a connection test includes a result printing (PRINT RESULT) button for printing the result of the connection test.

Figure 46:
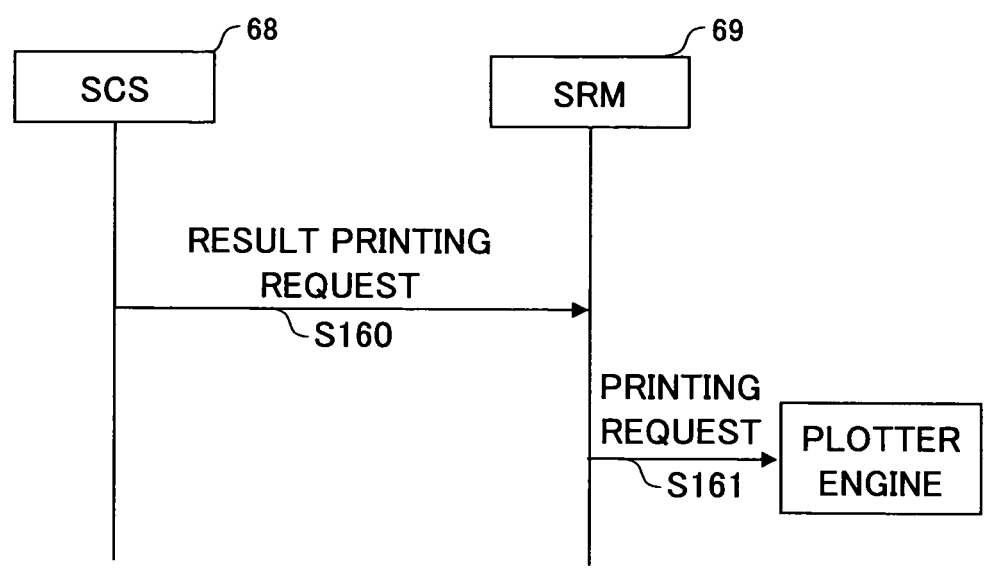
FIG. 46 is a flowchart of the operation of printing the result of the connection test according to the first embodiment of the present invention.

When the PRINT RESULT button is pressed, the multi-function apparatus 31 prints the result of the connection test as shown in FIG. 46. FIG. 46 is a flowchart of the operation of printing the result of the connection test. In step S160, the system initial setting function 202 of the SCS 68 makes a request to print the result of the connection test (a result printing request) to the SRM 69.

Next, in step S161, the SRM 69 makes a request for printing (a printing request) to the plotter engine of the B&W LP 41 or the color LP 42. In response to the printing request from the SRM 69, the plotter engine outputs the result of the connection test as shown in FIG. 47 or the details of the result of the connection test as shown in FIG. 48. FIG. 47 shows an example output in the case of conducting the connection test with a plurality of connection test items being selected. Accordingly, the example output of FIG. 47 varies in accordance with the selected connection test items.

Figure 49:
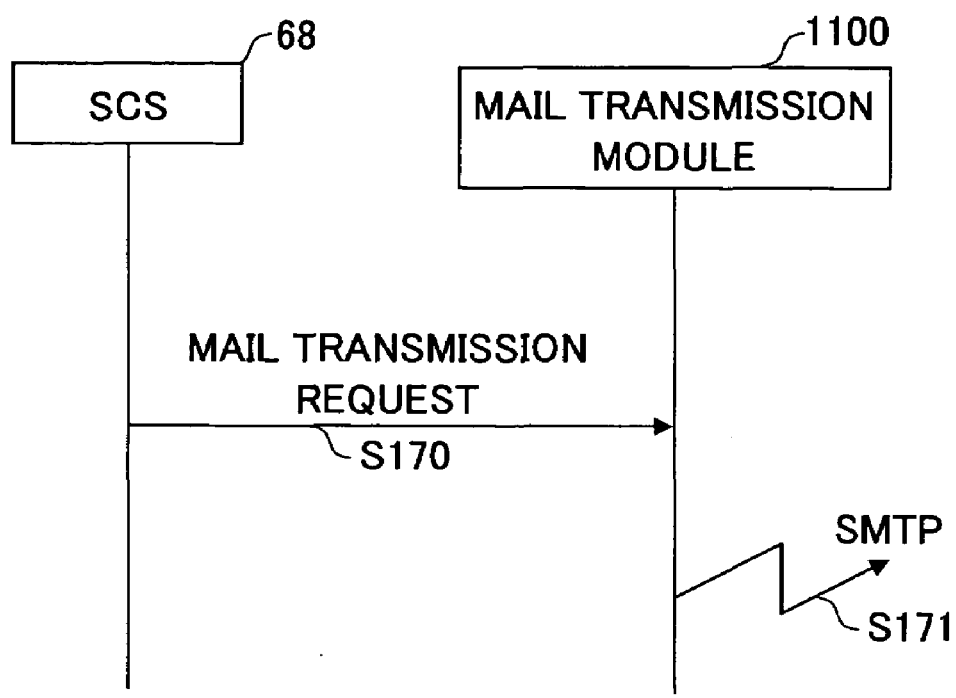
FIG. 49 is a flowchart of the operation of transmitting the result of the connection test or the details of the result of the connection test in the form of a text mail according to the first embodiment of the present invention.

Further, the multi-function apparatus 31 can also output the result of the connection test or the details of the result of the connection test in the form of an e-mail text message. FIG. 49 is a flowchart of the operation of transmitting the result of the connection test or the details of the result of the connection test in the form of an e-mail text message.

In step S170, the system initial setting function 202 of the SCS 68 transmits to a mail transmission module 1100 a request to transmit an e-mail message containing the result of the connection test or the details of the result of the connection test (a mail transmission request). Next, in step S171, the mail transmission module 1100 composes an e-mail message for transmitting the result of the connection test or the details of the result of the connection test, and transmits the composed e-mail message by SMTP (Simple Mail Transfer Protocol).

Figure 50:
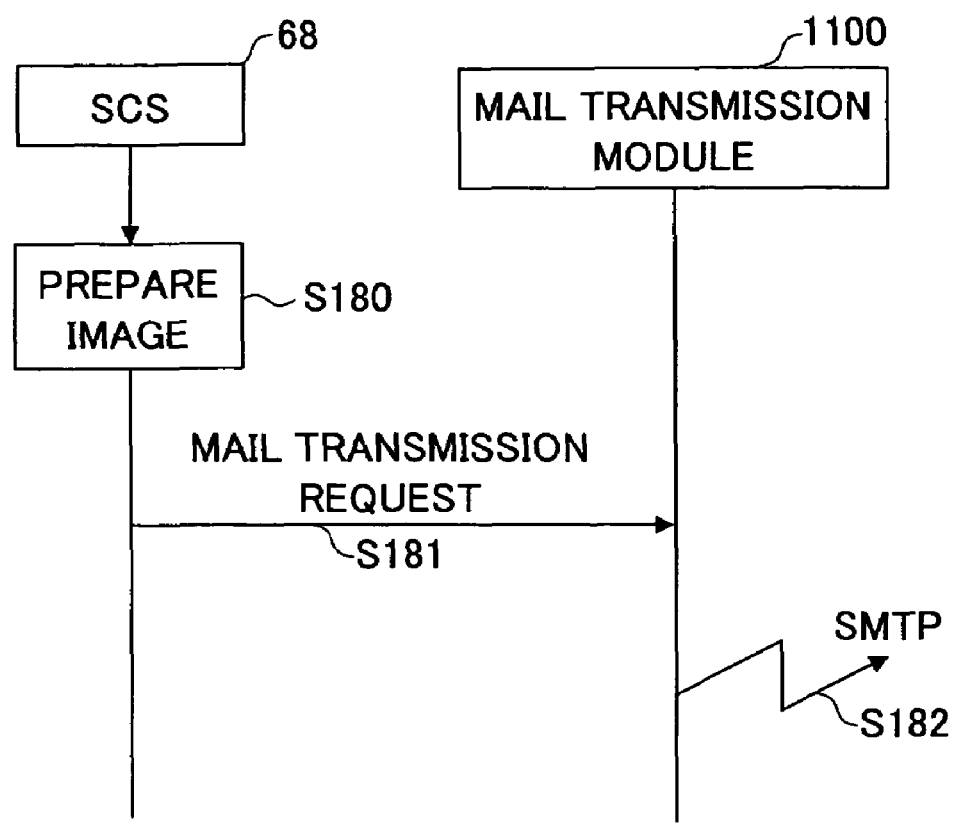
FIG. 50 is a flowchart of the operation of transmitting the result of the connection test or the details of the result of the connection test in the form of an e-mail message containing an image according to the first embodiment of the present invention.

Further, the multi-function apparatus 31 can also output the result of the connection test or the details of the result of the connection test in the form of an e-mail message containing an image. FIG. 50 is a flowchart of the operation of transmitting the result of the connection test or the details of the result of the connection test in the form of an e-mail message containing an image.

In step S180, the system initial setting function 202 of the SCS 68 prepares, for instance, a bitmapped image from character strings representing the result of the connection test or the details of the result of the connection test. This makes it possible to prevent the occurrence of a case where the result of the connection test or the details of the result of the connection test are turned into gibberish and cannot be recognized.

Next, in step S181, the system initial setting function 202 of the SCS 68 sends to the mail transmission module 1100 a request to transmit the image of the result of the connection test or the details of the result of the connection test by e-mail (a mail transmission request).

Next, in step S182, the mail transmission module composes an e-mail message for transmitting the image of the result of the connection test or the details of the result of the connection test, and transmits the composed e-mail message by, for instance, SMTP.

In this embodiment, the processing of the multi-function apparatus is mainly described. However, it is easy to apply the present invention to the information processing apparatus 1 shown in FIGS. 1 and 2. In the information processing apparatus 1, the system initial setting part 9, the user information management part 10, the communication control part 11, the mail formation part 12, the mail transmission and reception part 13, and the system resource management part 14 may perform the processing performed by the system initial setting function 202, the UCS 67, the NCS 61, the mail transmission module 1100, and the SRM 69.

[Second Embodiment]

In the first embodiment, a description is given of a connection test in the case of obtaining user information from an LDAP server. The present invention is also applicable to a connection test in a file sharing protocol such as SMB (Server Message Block) or a file transfer protocol such as FTP (File Transfer Protocol).

Figure 51:
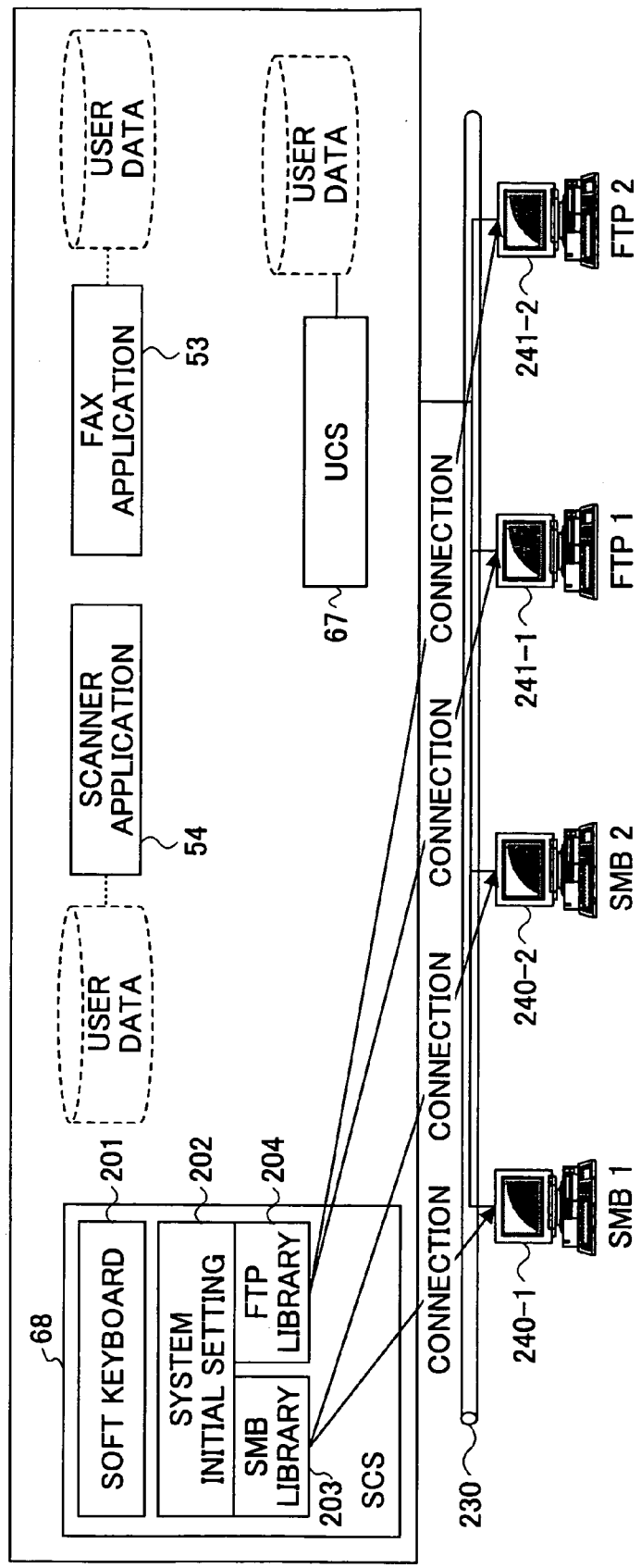
FIG. 51 is a diagram for illustrating a connection test in SMB or FTP according to a second embodiment of the present invention.
Figure 52:
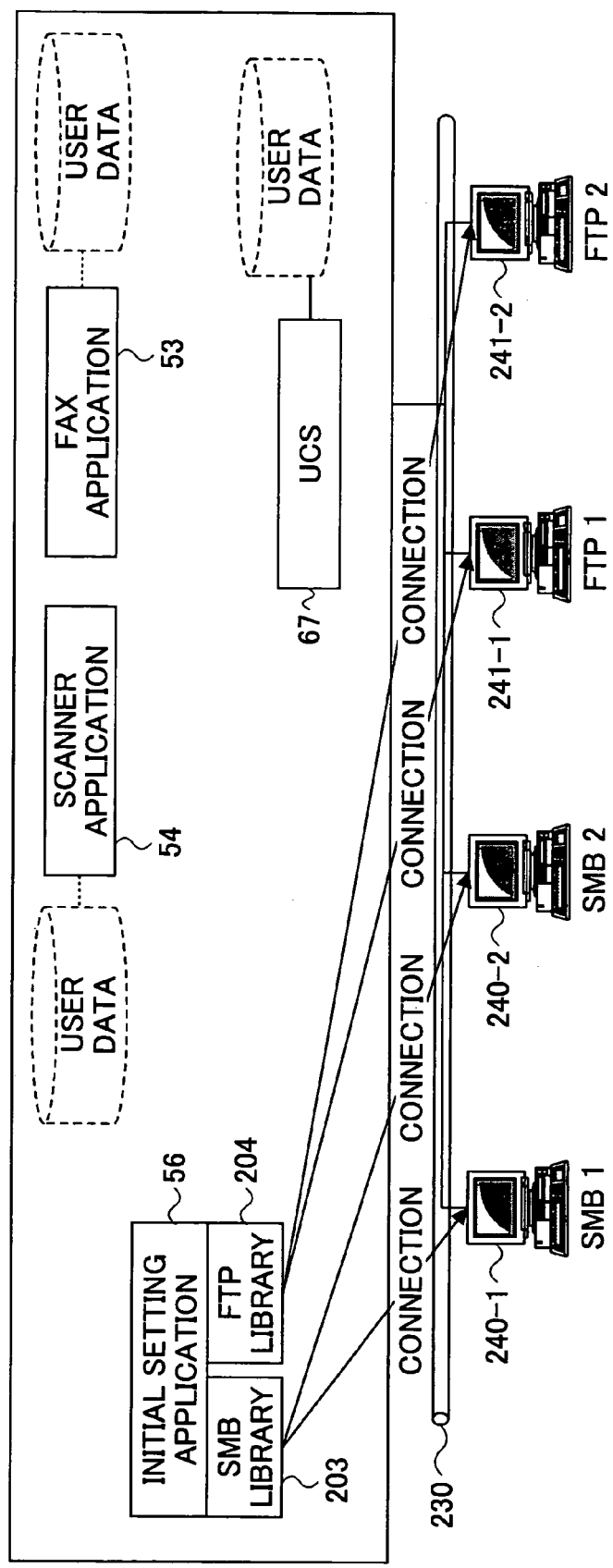
FIG. 52 is another diagram for illustrating the connection test in SMB or FTP according to the second embodiment of the present invention.

FIG. 51 is a diagram for illustrating a connection test in SMB or FTP. In FIG. 51, configuration parts unnecessary for the illustration are omitted. The connection test in SMB or FTP is conducted by the system initial setting function 202 of the SCS 68 using an SMB library 203 or an FTP library 204 based on an instruction from the operations panel 120 of the multi-function apparatus 31 or its external client 232-1 or 232-2. The connection test may be conducted by the initial setting application 56 having the same function as the system initial setting function 202 of the SCS 68 as shown in FIG. 52. Here, a description is given of the case where the connection test is conducted by the initial setting application 56.

Figure 53:
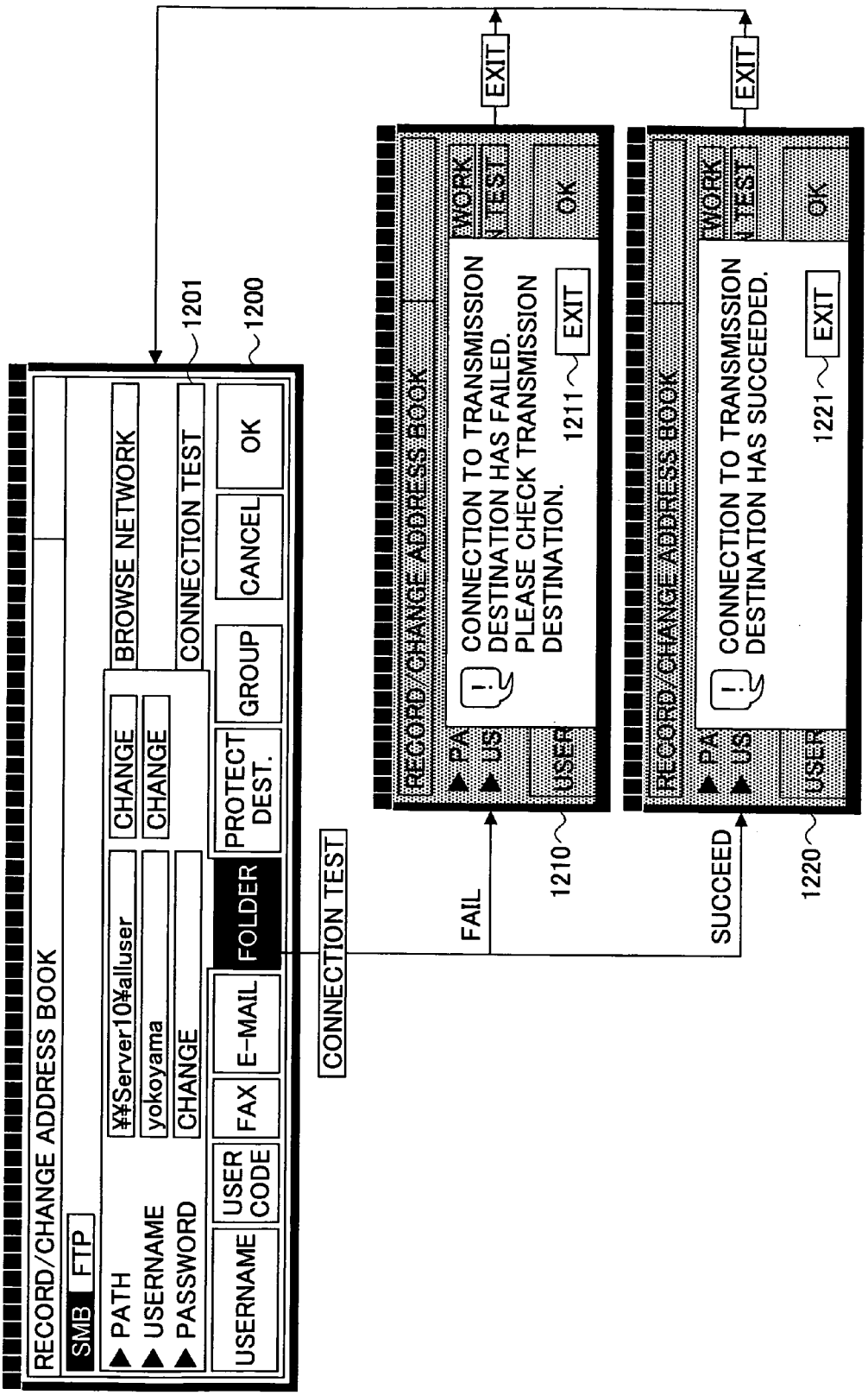
FIG. 53 is an image diagram for illustrating screens employed in the connection test in SMB or FTP according to the second embodiment of the present invention.

The connection test in SMB or FTP is conducted by the user recording connection destination (to which connection is established) information on a connection destination information recording screen 1200 shown in FIG. 53 and pressing a connection test (CONNECTION TEST) button 1201. Using the SMB library 203 or the FTP library 204, the initial setting application 56 conducts a connection test as in the case of the LDAP server information, and causes the result of the connection test to be displayed on the operations panel 120.

If the connection test succeeds, the initial setting application 56 causes a screen 1220 (FIG. 53) to be displayed on the operations panel 120. The screen 1220 includes a message indicating the success of connection to a transmission destination, such as "CONNECTION TO TRANSMISSION DESTINATION HAS SUCCEEDED." The user can return to the screen 1200 by pressing an EXIT button 1221 on the screen 1220.

If the connection test fails, the initial setting application 56 causes a screen 1210 (FIG. 53) to be displayed on the operations panel 120. The screen 1210 includes a message indicating the failure of connection to the transmission destination, such as "CONNECTION TO TRANSMISSION DESTINATION HAS FAILED." The user can return to the screen 1200 by pressing an EXIT button 1211 on the screen 1210.

Figure 54:
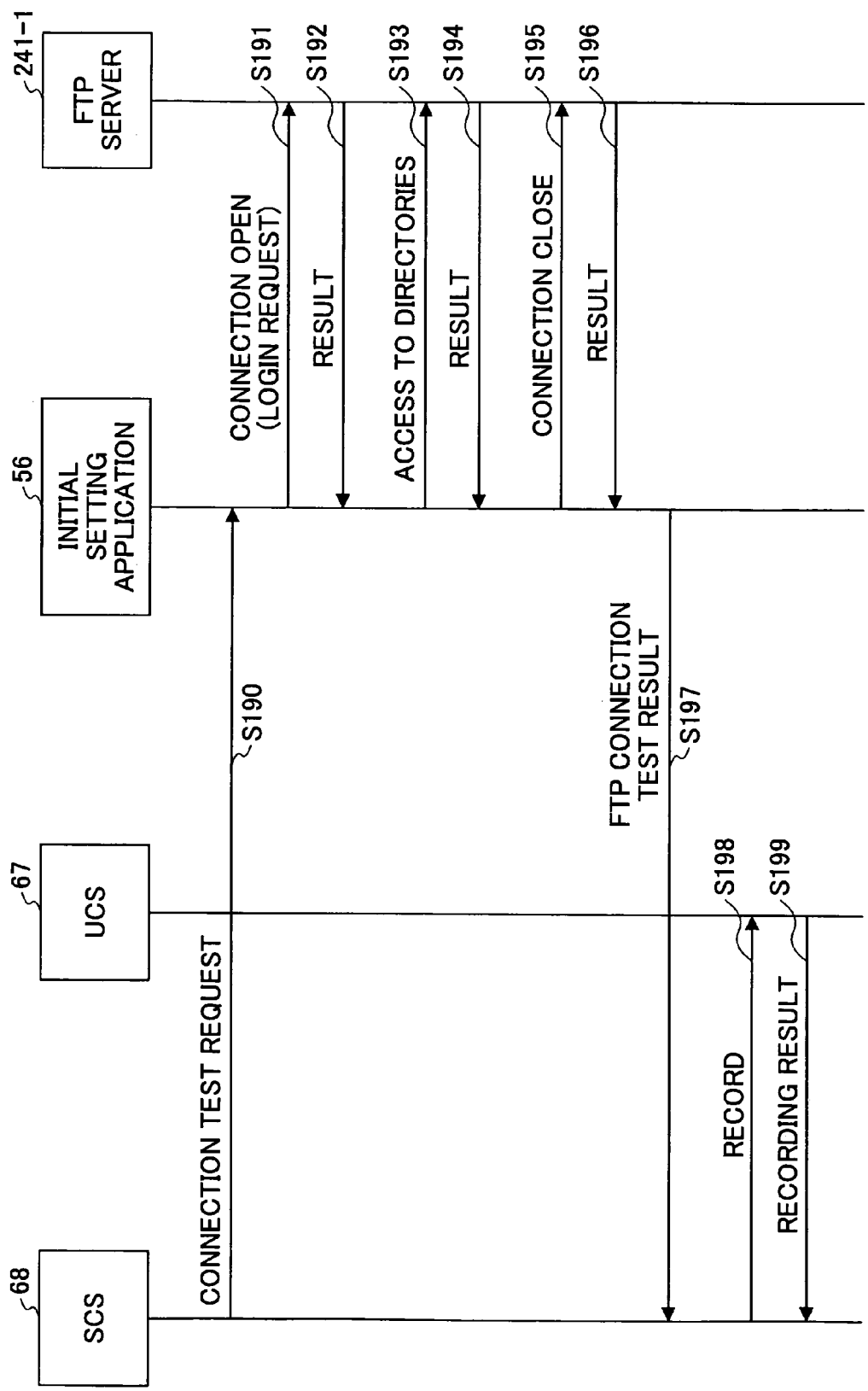
FIG. 54 is a sequence diagram showing a connection test in FTP according to the second embodiment of the present invention.

FIG. 54 is a sequence diagram showing a connection test in FTP. In step S190, the user operates the operations panel 120 to press the CONNECTION TEST button 1201 on the connection destination information recording screen 1200. When the CONNECTION TEST button 1201 is pressed, the SCS 68 makes a connection test request to the initial setting application 56.

Receiving the connection test request, in step S191, the initial setting application 56 makes a "connection open" request (a login request) to an FTP server 241-1 (FIG. 51) using the FTP library 204. Then, in step S192, the initial setting application 56 receives the result of the "connection open" request from the FTP server 241-1.

Next, in step S193, the initial setting application 56 makes access to directories in the FTP server 241-1. Then, in step S194, the initial setting application 56 receives the result of the access to the directories from the FTP server 241-1.

Next, in step S195, the initial setting application 56 makes a "connection close" request to the FTP server 241-1. Then, in step S196, the initial setting application 56 receives the result of the "connection close" request from the FTP server 241-1.

Next, in step S197, the initial setting application 56 supplies the result of the connection test received from the FTP server 241-1 to the SCS 68. The SCS 68 displays the supplied result of the connection test on the operations panel 120. The user can check the accuracy of the connection destination information to be recorded by checking the result of the connection test displayed on the operations panel 120.

If the user determines from the result of the connection test that the connection test has succeeded, the user operates the operations panel 120 to give an instruction to record the connection destination information entered on the connection destination information recording screen 1200 (FIG. 53). Then, in step S198, the SCS 68 makes a request to record the connection destination information to the UCS 67 based on the instruction from the user. Receiving the request to record the connection destination information from the system initial setting function 202 of the SCS 68, the UCS 67 records the connection destination information. In step S199, the system initial setting function 202 of the SCS 68 receives the result of the request to record the connection destination information.

The sequence diagram of a connection test in SMB is equal to that of the connection test in FTP of FIG. 54, and a description thereof is omitted. In addition to the "connection open" request, the access to directories, and the "connection close" request of steps S191 through S196 of FIG. 54, a server operating state, authentication, and the existence of directories can be used for the connection test.

In FIGS. 12C, 30C, 30D, 34, 47, and 48, the names indicated by reference numerals 422, 833, 834, and 903 (including FIRST NAME in FIG. 48) and some miscellaneous words are shown in English instead of Japanese for convenience of description.

The present invention is not limited to the specifically disclosed embodiments, and variations and modifications may be made without departing from the scope of the present invention.

The present application is based on Japanese priority patent applications No. 2003-056166, filed on Mar. 3, 2003, No. 2003-056167, filed on Mar. 3, 2003, No. 2004-036820, filed on Feb. 13, 2004, and No. 2004-036821, filed on Feb. 13, 2004, the entire contents of which are hereby incorporated by reference.

What is claimed is:

1. A method for an information processing apparatus to test a connection to an information storage server from which the information processing apparatus obtains information, the information storage server being used in common by one or more information processing apparatuses, the method comprising:
   simultaneously displaying an input for at least part of the connection information with a connection test input on a same screen;
   receiving a request for a connection test using connection information for establishing the connection to the information storage server from the same screen on which at least part of the connection information is entered;
   testing the connection to the information storage server based on the request for the connection test; and
   outputting a result of the connection test,
   wherein at least one connection test item, by which the connection with the information storage server is tested, is selected by a user in the request for the connection test, the connection test item defining a type of the connection test used in the connection with the information storage server,
   wherein the at least one connection test item includes use of the information stored in the information storage server.

2. The method as claimed in claim 1, wherein the entering of the connection information and the request for the connection test are received from a client connected directly or indirectly to the information processing apparatus obtaining the information from the information storage server.

3. The method as claimed in claim 1, wherein a level at which the connection to the information storage server is tested is set in the request for the connection test; and
   the connection test item is selected based on the set level in the request for the connection test.

4. The method as claimed in claim 1, wherein the connection to the information storage server is tested by repeating said simultaneously displaying, receiving, testing and outputting steps.

5. The method as claimed in claim 1, wherein the connection test checks sufficiency of entered items of the connection information; and
   said outputting outputs, as the result of the connection test, information as to whether the entered items of the connection information are sufficient and, if insufficient, information about a missing item of the connection information to be entered.

6. The method as claimed in claim 1, wherein the connection test determines an operating state of the information storage server; and
   said outputting outputs, as the result of the connection test, information as to whether the information storage server is in or out of operation.

7. The method as claimed in claim 1, wherein: the connection test determines accuracy of authentication information included in the connection information by having the information storage server perform authentication using the authentication information; and said outputting outputs, as the result of the connection test, information as to whether the authentication performed by the information storage server has succeeded or failed.

8. The method as claimed in claim 1, wherein the connection test conducts a search of the information storage server using a search condition included in the connection information, and thereby determines whether the information storage server is searchable; and said outputting outputs, as the result of the connection test, information as to whether the search has succeeded or failed.

9. The method as claimed in claim 1, wherein: the connection test conducts a search of the information storage server using a search condition included in the connection information, and thereby determines whether the information storage server is searchable; and said outputting outputs, as the result of the connection test, a result of the search or information showing a failure of the search.

10. The method as claimed in claim 1, wherein: the connection test conducts a search of the information storage server using a search condition included in the connection information, and thereby determines whether the information storage server is searchable; and said outputting outputs, as the result of the connection test, information retrieved from the information storage server, the information being converted into one or more character codes.

11. The method as claimed in claim 1, wherein: the connection test conducts a search of the information storage server using one or more optional search conditions included in the connection information, and thereby determines whether the information storage server is searchable; and said outputting outputs, as the result of the connection test, information showing the success of the search or one of the optional search conditions for which the search has failed.

12. The method as claimed in claim 1, wherein said receiving receives the request for the connection test from an input part of the information processing apparatus obtaining the information from the information storage server.

13. The method as claimed in claim 1, wherein said outputting outputs the result of the connection test to a display part or a printing part of the information processing apparatus obtaining the information from the information storage server.

14. The method as claimed in claim 1, wherein said outputting outputs the result of the connection test to a display part or a printing part of a client connected directly or indirectly to the information processing apparatus obtaining the information from the information storage server.

15. The method as claimed in claim 1, wherein said outputting composes an e-mail message from the result of the connection test, and transmits the e-mail message to a client connected directly or indirectly to the information processing apparatus obtaining the information from the information storage server.

16. The method as claimed in claim 1, wherein said outputting converts the result of the connection test into an image, attaches the image to an e-mail message, and transmits the e-mail message to a client connected directly or indirectly to the information processing apparatus obtaining the information from the information storage server.

17. A computer-readable recording medium storing a program for causing a computer to execute a method for an information processing apparatus to test a connection to an information storage server from which the information processing apparatus obtains information, the information storage server being used in common by a plurality of information processing apparatuses, the method comprising:

simultaneously displaying an input for at least part of the connection information with a connection test input on a same screen;

receiving a request for a connection test using connection information for establishing the connection to the information storage server from the same screen on which at least part of the connection information is entered;

testing the connection to the information storage server based on the request for the connection test; and outputting a result of the connection test, wherein at least one connection test item, which the connection with the information storage server is tested, is selected by a user in the request for the connection test, the connection test item defining a type of the connection test used in the connection with the information storage server, wherein the at least one connection test item includes use of the information stored in the information storage server.

18. An information processing apparatus obtaining information from an information storage server used in common by one or more information processing apparatus, comprising:

a displaying part simultaneously displaying an input for at least part of the connection information with a connection test input on a same screen;

a connection test request receiving part receiving a request for a connection test using connection information for establishing connection to the information storage server from a screen on which at least part of the connection information is entered;

a connection test conducting part testing the connection to the information storage server based on the request for the connection test; and a connection test result outputting part outputting a result of the connection test, wherein at least one connection test item, which the connection with the information storage server is tested, is selected by a user in the request for the connection test, the connection test item defining a type of the connection test used in the connection to with the information storage server, wherein the at least one connection test item includes use of the information stored in the information storage server.

19. A method for an image-forming apparatus to test a connection to an information storage server used in common by one or more image-forming apparatuses or information processing apparatuses, the image-forming apparatus including a hardware resource used in image formation, one or more programs performing processing related to the image formation, and a platform managing use of the hardware resource by the one or more programs, the method comprising:

simultaneously displaying an input for at least part of the connection information with a connection test input on a same screen;

receiving a request for a connection test using connection information for establishing the connection to the information storage server from the same screen on which at least part of the connection information is entered;

testing the connection to the information storage server using the connection information based on the request for the connection test; and outputting a result of the connection test, wherein at least one connection test item, which the connection with the information storage server is tested, is selected by a user in the request for the connection test, the connection test item defining a type of the connection test used in the connection to with the information storage server, wherein the at least one connection test item includes use of the information stored in the information storage server.

20. The method as claimed in claim 19, wherein the entering of the connection information and the request for the connection test are received from an operations panel included in the hardware resource of the image-forming apparatus testing the connection to the information storage server.

21. The method as claimed in claim 20, wherein: a connection information receiving part included in the platform receives the request for the connection test in said receiving; and a connection information management part included in the platform tests the connection to the information storage server based on the request for the connection test received by the connection information receiving part in said testing.

22. The method as claimed in claim 20, wherein: a connection information receiving part included in the one or more programs receives the request for the connection test in said receiving; and a connection information management part included in the platform tests the connection to the information storage server based on the request for the connection test received by the connection information receiving part in said testing.

23. The method as claimed in claim 20, wherein: a connection information receiving part included in the one or more programs receives the request for the connection test in said receiving; and the connection information receiving part tests the connection to the information storage server using a predetermined library in said testing.

24. The method as claimed in claim 20, wherein: a connection information receiving part included in the platform receives the request for the connection test in said receiving; and the connection information receiving part tests the connection to the information storage server using a predetermined library in said testing.

25. The method as claimed in claim 19, wherein the setting of the connection information and the request for the connection test are received from a client connected directly or indirectly to the image-forming apparatus testing the connection to the information storage server.

26. The method as claimed in claim 25, wherein: a connection information receiving part included in the platform receives the request for the connection test in said receiving; and a connection information management part included in the platform tests the connection to the information storage server based on the request for the connection test received by the connection information receiving part in said testing.

27. The method as claimed in claim 25, wherein: a connection information receiving part included in the one or more programs receives the request for the connection test in said receiving; and a connection information management part included in the platform tests the connection to the information storage server based on the request for the connection test received by the connection information receiving part in said testing.

28. The method as claimed in claim 25, wherein: a connection information receiving part included in the platform receives the request for the connection test in said receiving; and the connection information receiving part tests the connection to the information storage server using a predetermined library in said testing.

29. The method as claimed in claim 25, wherein: a connection information receiving part included in the one or more programs receives the request for the connection test in said receiving; and the connection information receiving part tests the connection to the information storage server using a predetermined library in said testing.

30. The method as claimed in claim 19, wherein a level at which the connection to the information storage server is tested is set in the request for the connection test; and the connection test item is selected based on the set level in the request for the connection test.

31. The method as claimed in claim 19, wherein the connection to the information storage server is tested by repeating said simultaneously displaying, receiving, testing, and outputting.

32. The method as claimed in claim 19, wherein the connection test checks sufficiency of entered items of the connection information; and said outputting outputs, as the result of the connection test, information as to whether the entered items of the connection information are sufficient and, if insufficient, information about a missing item of the connection information to be entered.

33. The method as claimed in claim 19, wherein the connection test determines and operating state of the information storage server; and said outputting outputs, as the result of the connection test, information as to whether the information storage server is in or out of operation.

34. The method as claimed in claim 19, wherein: the connection test determines accuracy of authentication information included in the connection information by having the information storage server perform authentication using the authentication information; and said outputting outputs, as the result of the connection test, information as to whether the authentication performed by the information storage server has succeeded or failed.

35. The method as claimed in claim 19, wherein the connection test conducts a search of the information storage server using a search condition included in the connection information, and thereby determines whether the information storage server is searchable; and said outputting outputs, as the result of the connection test, information as to whether the search has succeeded or failed.

36. The method as claimed in claim 19, wherein: the connection test conducts a search of the information storage server using a search condition included in the connection information, and thereby determines whether the information storage server is searchable; and said outputting outputs, as the result of the connection test, a result of the search or information showing a failure of the search.

37. The method as claimed in claim 19, wherein: the connection test conducts a search of the information storage server using a search condition included in the connection information, and thereby determines whether the information storage server is searchable; and said outputting outputs, as the result of the connection test, information retrieved from the information storage server, the information being converted into one or more character codes.

38. The method as claimed in claim 19, wherein: the connection test conducts a search of the information storage server using one or more optional search conditions included in the connection information, and thereby determines whether the information storage server is searchable; and said outputting outputs, as the result of the connection test, information showing the success of the search or one of the optional search conditions for which the search has failed.

39. The method as claimed in claim 19, wherein said outputting outputs the result of the connection test to a display part or a printing part of the image-forming apparatus testing the connection to the information storage server.

40. The method as claimed in claim 19, wherein said outputting outputs the result of the connection test to a display part or a printing part of a client connected directly or indirectly to the image-forming apparatus testing the connection to the information storage server.

41. The method as claimed in claim 19, wherein said outputting composes an e-mail message from the result of the connection test, and transmits the e-mail message to a client connected directly or indirectly to the image-forming apparatus testing the connection to the information storage server.

42. The method as claimed in claim 19, wherein said outputting converts the result of the connection test into an image, attaches the image to an e-mail message, and transmits the e-mail message to a client connected directly or indirectly to the image-forming apparatus testing the connection to the information storage server.

43. A computer-readable recording medium storing a program for causing a computer to execute a method for an image-forming apparatus to test a connection to an information storage server used in common by one or more image-forming apparatuses or information processing apparatuses, the image-forming apparatus including a hardware resource used in image formation, one or more programs performing processing related to the image formation, and a platform managing use of the hardware resource by the one or more programs, the method comprising:

simultaneously di shaving an input for at least part of the connection information with a connection test input on a same screen;

receiving a request for a connection test using connection information for establishing the connection to the information storage server from the same screen on which at least part of the connection information is entered;

testing the connection to the information storage server using the connection information based on the request for the connection test; and outputting a result of the connection test, wherein at least one connection test item, which the connection with the information storage server is tested, is selected by a user in the request for the connection test, the connection test item defining a type of the connection test used in the connection with the information storage server, wherein the at least one connection test item includes use of the information stored in the information storage server.

44. An image-forming apparatus including a hardware resource used in image formation, one or more programs performing processing related to the image formation, and a platform managing use of the hardware resource by the one or more programs, the image-forming apparatus comprising:

a displaying part simultaneously displaying an input for at least part of the connection information with a connection test input on a same screen;

a connection test request receiving part receiving a request for a connection test using connection information for establishing connection to an information storage server from a screen on which at least part of the connection information is entered, the information storage server being used in common by one or more image-forming apparatuses or information processing apparatuses;

a connection test conducting part testing the connection to the information storage server using the connection information based on the request for the connection test; and a connection test result outputting part outputting a result of the connection test, wherein at least one connection test item, which the connection with the information storage server is tested, is selected by a user in the request for the connection test, the connection test item defining a type of the connection test used in the connection with the information storage server, wherein the at least one connection test item includes use of the information stored in the information storage server.

* * * * *